(12) United States Patent
Barnes et al.

(10) Patent No.: US 11,935,342 B2
(45) Date of Patent: *Mar. 19, 2024

(54) DETECTING OF AUTOMATIC DRIVING

(71) Applicant: Avinew, Inc., Westlake Village, CA (US)

(72) Inventors: William Anderson Barnes, Los Angeles, CA (US); Randall C. Adams, Malibu, CA (US); Daniel R. Peate, Thousand Oaks, CA (US); Steven Anthony Bentz, Simi Valley, CA (US); G. Edward Combs, Agoura Hills, CA (US)

(73) Assignee: Avinew, Inc., Westlake Village, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/663,243

(22) Filed: May 13, 2022

(65) Prior Publication Data
US 2022/0270413 A1 Aug. 25, 2022

Related U.S. Application Data

(60) Continuation of application No. 16/871,393, filed on May 11, 2020, now Pat. No. 11,354,952, which is a
(Continued)

(51) Int. Cl.
*G07C 5/08* (2006.01)
*G06N 3/04* (2023.01)
*G06N 3/08* (2023.01)

(52) U.S. Cl.
CPC ............... *G07C 5/085* (2013.01); *G06N 3/04* (2013.01); *G06N 3/08* (2013.01)

(58) Field of Classification Search
CPC . G07C 5/085; G06N 3/04; G06N 3/08; G06N 3/042; G06N 5/01; G06N 5/025
See application file for complete search history.

(56) References Cited

U.S. PATENT DOCUMENTS 6,332,108 B1 * 12/2001 Hirasago ............ B60K 31/0008
701/96
7,177,749 B2 * 2/2007 Sekiguchi ........... B60W 30/165
701/96
(Continued)

FOREIGN PATENT DOCUMENTS

CN 108108750 A * 6/2018 ........... G06K 9/6256
DE 102013019202 8/2016

OTHER PUBLICATIONS

CN-108108750-A Translation (Year: 2018).*
(Continued)

*Primary Examiner* — Frederick M Brushaber
(74) *Attorney, Agent, or Firm* — MLO, a professional corp.

(57) ABSTRACT

Activation of an automatic driving feature in a vehicle is detected by evaluating sequential vehicle operation data against subtractive and additive heuristic rules that define a likelihood of an automatic driving feature having been engaged as a function of vehicle performance. The sequential vehicle operation data, which does not include an explicit indication of whether the automatic driving feature was engaged, is provided for time intervals of a trip made by the vehicle. Automatic driving information is generated, which provides an indication of whether the automatic driving feature was engaged during a subset of the time intervals.

15 Claims, 14 Drawing Sheets

Related U.S. Application Data division of application No. 16/560,153, filed on Sep. 4, 2019, now Pat. No. 10,650,623.

(60) Provisional application No. 62/732,956, filed on Sep. 18, 2018.

(56) References Cited

U.S. PATENT DOCUMENTS

| | | | | |
|---|---|---|---|---|
| 9,355,423 | B1* | 5/2016 | Slusar | G08G 1/0129 |
| 9,390,451 | B1* | 7/2016 | Slusar | G07C 5/0841 |
| 9,715,711 | B1* | 7/2017 | Konrardy | G07C 5/0816 |
| 9,940,676 | B1* | 4/2018 | Biemer | G07C 5/008 |
| 9,946,531 | B1* | 4/2018 | Fields | G07C 5/02 |
| 10,096,067 | B1* | 10/2018 | Slusar | G06Q 40/08 |
| 10,373,259 | B1* | 8/2019 | Konrardy | G06Q 40/08 |
| 10,449,856 | B2* | 10/2019 | Kojima | B60W 60/0059 |
| 10,783,586 | B1* | 9/2020 | Augustine | G06Q 40/08 |
| 2002/0046894 | A1* | 4/2002 | Seidel | F16H 59/0204 |
| | | | | 180/170 |
| 2010/0256867 | A1* | 10/2010 | Breuer | G07C 5/0891 |
| | | | | 348/149 |
| 2012/0303222 | A1* | 11/2012 | Cooprider | B60W 10/06 |
| | | | | 701/409 |
| 2015/0025917 | A1* | 1/2015 | Stempora | G02B 27/0093 |
| | | | | 705/4 |
| 2016/0171521 | A1* | 6/2016 | Ramirez | B60K 35/00 |
| | | | | 701/409 |
| 2017/0132708 | A1* | 5/2017 | Gordon | G06Q 40/08 |
| 2017/0261974 | A1* | 9/2017 | Ebe | B60W 50/14 |
| 2018/0039591 | A1* | 2/2018 | La Marca | G07C 5/0808 |
| 2018/0043905 | A1* | 2/2018 | Kim | B60W 10/18 |
| 2018/0127001 | A1* | 5/2018 | Ricci | B60W 30/10 |
| 2019/0193745 | A1* | 6/2019 | Golov | B60W 50/029 |
| 2019/0385461 | A1* | 12/2019 | Blomstrand | B60D 1/62 |
| 2020/0090426 | A1* | 3/2020 | Barnes | G06N 5/01 |

OTHER PUBLICATIONS

Laukkonen, Jeremy, "13 Advanced Driver Assistance Systems," Mar. 23, 2018, https://www.lifewire.com/advanced-driver-assistance-systems-534859?print.

Notice of Allowance and Fees dated Mar. 31, 2022 for U.S. Appl. No. 16/871,393.

Notice of Allowance dated Mar. 30, 2020 for U.S. Appl. No. 16/560,153.

Office Action dated Dec. 23, 2019 for U.S. Appl. No. 16/560,153.

* cited by examiner

| TIME (SECONDS) | 0.0 | 0.5 | 1.0 | 1.5 | 2.0 | 2.5 | 3.0 | 3.5 | 4.0 | 4.5 | 5.0 | 5.5 | 6.0 | 6.5 |
|---|---|---|---|---|---|---|---|---|---|---|---|---|---|---|
| SPEED (mph) | 38.05 | | 37.80 | | 36.94 | | 37.06 | | 37.59 | | 37.97 | | 36.99 | |
| ACCELERATION (mph/s) | | -0.25 | | -0.86 | | 0.12 | | 0.53 | | 0.38 | | -0.98 | | -1.99 |
| JERK (mph/s/s) | | | -0.61 | | 0.98 | | 0.41 | | -0.15 | | -1.36 | | -1.01 | |

| TIME (SECONDS) | 7.0 | 7.5 | 8.0 | 8.5 | 9.0 | 9.5 | 10.0 | 10.5 | 11.0 | 11.5 | 12.0 | 12.5 | 13.0 | 13.5 |
|---|---|---|---|---|---|---|---|---|---|---|---|---|---|---|
| SPEED (mph) | 35.00 | | 29.70 | | 26.89 | | 28.90 | | 35.42 | | 36.06 | | 36.03 | |
| ACCELERATION (mph/s) | | -5.30 | | -2.81 | | 2.01 | | 6.52 | | 0.64 | | -0.03 | | 0.50 |
| JERK (mph/s/s) | | | -3.31 | | 2.49 | | 4.82 | | 4.51 | | -5.88 | | -0.67 | | 0.49 |

| TIME (SECONDS) | 14.0 | 14.5 | 15.0 | 15.5 | 16.0 | 16.5 | 17.0 | 17.5 | 18.0 | 18.5 | 19.0 | 19.5 | 20.0 |
|---|---|---|---|---|---|---|---|---|---|---|---|---|---|
| SPEED (mph) | 36.53 | | 37.02 | | 37.44 | | 34.74 | | 33.65 | | 30.68 | | 27.33 |
| ACCELERATION (mph/s) | | 0.49 | | 0.42 | | -2.70 | | -1.09 | | -2.97 | | -3.35 | |
| JERK (mph/s/s) | 0.07 | | -0.11 | | -3.12 | | 1.61 | | -1.88 | | -0.38 | | |

FIG. 5

DETECTING OF AUTOMATIC DRIVING

CROSS-REFERENCE TO RELATED APPLICATIONS

This application is a continuation of U.S. patent application Ser. No. 16/871,393, filed May 11, 2020, which is a divisional of U.S. patent application Ser. No. 16/560,153, filed Sep. 4, 2019, which claims the benefit of U.S. Provisional Application No. 62/732,956, filed Sep. 18, 2018, all of which are incorporated by reference herein in their entirety.

BACKGROUND

Traditional automobile insurance premium pricing is based on aggregated statistical historical data to produce rating factors. The aggregated statistical historical data typically includes an insured person's driving record, credit-based insurance score, personal characteristics (age, gender, and marital status), vehicle type, garage location, vehicle use, previous claims, liability limits, and deductibles, among other information. Additionally, discounts on traditional automobile insurance premium pricing are available based on the presence of protection devices (like airbags or antilock brakes) in the vehicle, driving education courses taken by the insured person, and mileage driven by the vehicle, among other considerations. Furthermore, traditional automobile insurance premium pricing is a fixed cost, assessed annually and usually paid for in lump sums on an annual, semi-annual, or quarterly basis.

Usage Based Insurance (UBI), on the other hand, typically individualizes insurance premium pricing based on the mileage driven by the vehicle as determined by Global Positioning System (GPS) location data obtained for the vehicle. UBI, therefore, attempts to more accurately price insurance based on actual usage of the vehicle, since there is a correlation between claims made against insurance for accidents for a vehicle and the mileage driven by that vehicle. Additionally, recent developments in technology have increased the effectiveness and cost of using telematics devices installed in vehicles, thereby enabling insurers to capture not just how many miles an insured person actually drives, but how and when they drive too. The result has been the growth of several UBI variations, including Pay-As-You-Drive (PAYD), Pay-How-You-Drive (PHYD), Pay-As-You-Go, and Distance-Based Insurance.

The introduction of driver assistance technology, vehicle autopilot, and self-driving vehicles has generally reduced accident risks and claim and loss costs. Nevertheless, traditional and UBI automobile insurance premium pricing has generally not taken into consideration the risk and cost reduction resulting from the usage of advanced driver assistance systems (ADAS).

SUMMARY

In order to take into consideration driver assistance, autopilot, self-driving, or advanced driver assistance systems (ADAS) capabilities (referred to herein as "automatic driving features") for adjusting a price of an automobile insurance policy, an insurance pricing system needs to have information indicating when one or more of the automatic driving features have been activated during overall usage of the vehicles. However, direct or explicit information indicating whether an automatic driving feature is engaged is not always readily available or obtainable from such vehicles or computer server systems (e.g., typically owned or managed by the vehicle manufacturer, the vehicle seller, or a third party contractor) that are in communication with the vehicles. On the other hand, vehicle operation data (e.g., any appropriate combination of a speed of the vehicle, a power draw/consumption of the vehicle, a heading of the vehicle, and/or a location of the vehicle) is typically readily available or obtainable from the vehicles or the computer server systems. Therefore, in accordance with some embodiments, activation of usage of an automatic driving feature in a vehicle is detected by a system or method obtaining heuristic rules that define a likelihood of an automatic driving feature having been engaged as a function of sequential vehicle performance. Sequential vehicle operation data is provided related to a trip made by a vehicle that has the automatic driving feature. The sequential vehicle operation data includes an indication of operation of the vehicle during a sequence of time intervals of the trip, and the sequential vehicle operation data does not include an explicit indication of whether the automatic driving feature was engaged during any time intervals of the sequence of time intervals. Automatic driving information is generated for the vehicle by evaluating the sequential vehicle operation data against the heuristic rules. The automatic driving information provides an indication of whether the automatic driving feature was engaged during a subset of the time intervals.

In some embodiments, a system or method provides sequential vehicle operation data for a sequence of time intervals for a vehicle that has an automatic driving feature. The sequential vehicle operation data does not include an explicit indication of whether the automatic driving feature was engaged during any time intervals of the sequence of time intervals. First automatic driving information is initialized for the vehicle to indicate that the automatic driving feature was engaged during all of the time intervals. Second automatic driving information is generated for the vehicle by subtracting from the first automatic driving information a first portion of the time intervals for which the sequential vehicle operation data indicate operation of the vehicle outside of first specified operational ranges. The second automatic driving information provides an indication that the automatic driving feature was engaged during a first subset of the time intervals.

In some embodiments, some time intervals are identified for which the sequential vehicle operation data indicate operation of the vehicle within specified operational ranges that indicate disengagement of the automatic driving feature, and the automatic driving information is updated to indicate that the automatic driving feature was not engaged during these time intervals. In some embodiments, some time intervals are identified for which the sequential vehicle operation data indicate operation of the vehicle within specified operational ranges that indicate engagement of the automatic driving feature, and the automatic driving information is updated to indicate that the automatic driving feature was engaged during these time intervals. In some embodiments, heuristic rules indicative of a high probability of automatic or non-automatic driving are evaluated after heuristic rules indicative of a lower probability of automatic or non-automatic driving.

In some embodiments, some time intervals that immediately precede or follow a time interval for which the sequential vehicle operation data has been evaluated are treated the same as the evaluated time interval. In some embodiments, a relatively small group of non-automatic-driving time intervals (that is preceded and followed by relatively large groups of automatic-driving time intervals) is treated the same as the preceding and following groups of automatic-driving time intervals, and vice versa.

BRIEF DESCRIPTION OF THE DRAWINGS

FIG. 5 is a table of an example portion of vehicle operation data generated from the data of the graph in FIG. 4 for use in accordance with some embodiments.

DETAILED DESCRIPTION

Figure 1:
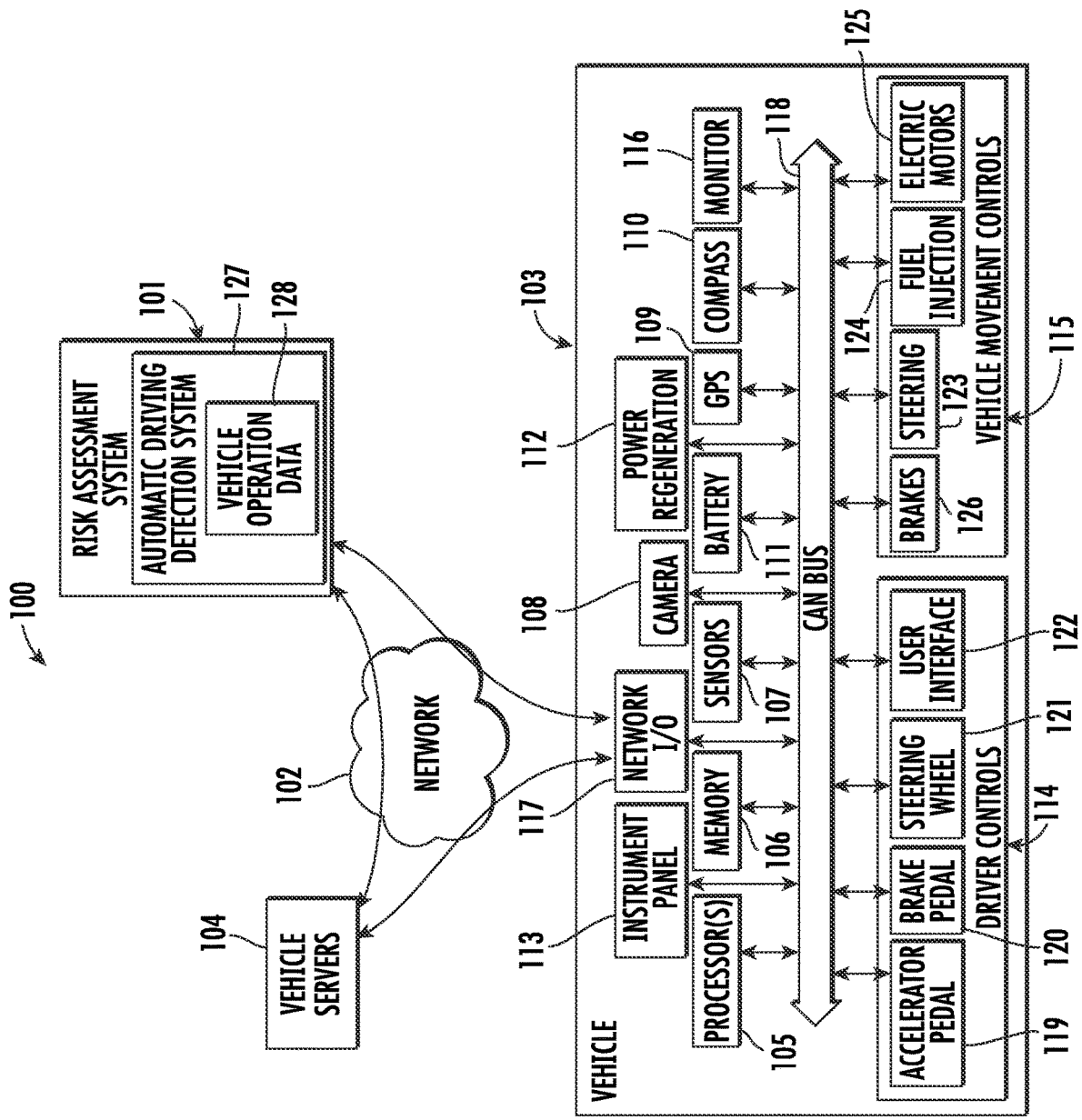
FIG. 1 is a simplified schematic diagram of an example vehicle risk minimization system, in accordance with some embodiments.

The computerization of vehicles, and the advanced driver assistance systems (ADAS) made possible thereby, have resulted in a large amount of data regarding vehicles and drivers (and routes) being generated, including real-time data. An example vehicle risk minimization system 100, as shown in FIG. 1, uses this data with a variety of features or capabilities related to reducing or managing the risk of loss or accident for such vehicles, in accordance with some embodiments. In general, the system 100 includes a computerized risk assessment system 101 that communicates (e.g., through a network 102) with multiple vehicles (e.g., a vehicle 103) and/or vehicle servers 104 to collect data (risk assessment data) regarding driver assistance system features (driver assistance system data) within the vehicles, the current drivers, operators or persons in charge (driver data) of the vehicles, and the routes or roads (route data) on which the vehicles are currently driving. In some embodiments, the vehicle risk minimization system 100 provides real-time vehicle risk feedback and/or predictive vehicle risk minimization recommendations to the driver, operator or user of the vehicle 103 to assist the driver in making decisions that could minimize the potential risk of loss or probability of being in an accident for the vehicle. In some embodiments, the vehicle risk minimization system 100 determines individualized and customized automobile insurance premium pricing for the vehicle either after each trip made by the vehicle or in real-time during each trip.

To enable some aspects of these features or capabilities, the vehicle risk minimization system 100 includes an automatic driving detection system 127, which detects usage of automatic driving features in vehicles (e.g., 103) that are monitored under the vehicle risk minimization system 100.

A conventional system, by contrast, provides a direct or explicit indication of whether an automatic driving feature is engaged. For example, a vehicle within a conventional system may simply generate a single bit of data, the value of which may directly or explicitly indicate that the automatic driving feature is engaged (e.g., a value "1") or is not engaged (e.g., a value "0"). However, some vehicle manufacturers or sellers refuse to make such direct or explicit data available to third parties or do not make this data available without a relatively high cost; thereby preventing third parties from developing applications that require such data. On the other hand, some vehicle manufacturers or sellers readily make other types of vehicle data available to third party developers for third party application development in order to encourage adoption of their technology and make their vehicles more enticing to customers. For example, some vehicle manufacturers or sellers provide a publicly available API (application programming interface) and/or smartphone apps, among other techniques, for obtaining vehicle operation data for a vehicle within their system, such as a speed of the vehicle, a power draw/consumption of the vehicle, a heading of the vehicle, and/or a location of the vehicle, along with a timestamp for each time interval within which this data is generated. Some embodiments of the present invention, therefore, enable the unconventional ability to detect (with a relatively high level of accuracy) whether the automatic driving feature is engaged in the absence of any such direct or explicit indication thereof. This ability has the benefit of being able to detect automatic driving without having to request direct or explicit data when such data is not available, or the cost of its access is too high. Instead, the readily available vehicle operation data is analyzed to detect automatic or non-automatic driving.

For each vehicle (e.g., 103) being monitored, the automatic driving detection system 127 receives and calculates vehicle operation data 128 including, for example, any appropriate combination of a speed of the vehicle 103, a power draw/consumption of the vehicle 103, a heading of the vehicle 103, and/or a location of the vehicle 103, along with a timestamp for each time interval within which this data is generated. The automatic driving detection system 127 receives the vehicle operation data 128 either directly from the vehicle 103 or from the vehicle servers 104 (which receive the vehicle operation data 128 from the vehicle). The automatic driving detection system 127 analyzes the vehicle operation data 128 to determine automatic driving information related to the total time and/or individual time intervals or periods that the vehicle 103 was in an automatic driving mode and/or a non-automatic driving mode throughout the overall time of a given trip made by the vehicle 103. The automatic driving information can then be used by the risk assessment system 101 to perform the above-mentioned features or capabilities related to reducing or managing the risk of loss or accident for the vehicle 103. Some embodiments of a system and method for detecting automatic driving and/or non-automatic driving (and, thereby, classifying the time intervals of a trip as automatic-driving time intervals and/or non-automatic-driving time intervals within the automatic driving information) are described below with reference to FIGS. 4-17.

In some embodiments, the risk assessment data is continually collected in real-time for ongoing current conditions or actions of or by each vehicle 103, driver, and route while the vehicle 103 is being operated. The risk assessment system 101 processes the risk assessment data with trained risk prediction models to determine a real-time prediction for the risk of loss that could occur due to the vehicle 103 being involved in an accident. The prediction for the risk of loss is a real-time prediction of the probability and severity of an accident for each potential type of accident at multiple time points or during multiple time intervals. The same real-time prediction for the risk of loss can generally be used in embodiments in which the real-time vehicle risk feedback and/or the predictive vehicle risk minimization recommendations are provided to the driver or automobile insurance premium pricing is determined for the vehicle.

For embodiments in which the real-time vehicle risk feedback is provided to the driver, the real-time vehicle risk feedback can be of one or more different feedback types. In some embodiments, for example, the risk assessment system 101 calculates a real-time risk score based on the driver's current driving performance (e.g., part of the driver data received from the vehicle 103) in combination with the rest of the risk assessment data. The real-time risk score generally indicates how well/poor, or how safely/dangerously, the driver is operating the vehicle 103. A higher/worse (or lower/better) real-time risk score indicates worse/poorer (or better) vehicle operation performance by the driver. Conversely, the real-time risk score may be characterized as, or inverted into, a real-time safety score, such that a higher/better (or lower/worse) real-time safety score indicates better (or worse/poorer) vehicle operation performance by the driver. The risk assessment system 101 may transmit the real-time risk/safety score (i.e., the real-time vehicle risk feedback) to the vehicle 103 for a user interface to display or present the score to the driver. The driver can then attempt to modify his/her driving performance to cause the real-time risk/safety score to improve, e.g., by turning on/off driver assistance system features, reducing the speed of the vehicle, reducing the frequency of lane changes, etc. The subsequent driver data received by the risk assessment system 101 from the vehicle 103 is then used by the risk assessment system 101 to recalculate or update the real-time risk/safety score, which is then presented to the driver again, so that the driver can see the changes in the real-time vehicle risk feedback showing the improvement or degradation in his/her driving performance. Alternatively, in some embodiments, the risk assessment system 101 determines a recommendation for vehicle-operation changes for the driver based on the real-time risk/safety score. For example, the risk assessment system 101 can calculate that if the driver were to turn on/off certain driver assistance system features, change the speed of the vehicle, change the frequency of lane changes, etc., then the driver's real-time risk/safety score would be likely to improve. Therefore, the risk assessment system 101 can transmit such a vehicle-operation change recommendation (i.e., the real-time vehicle risk feedback) to the vehicle 103 for display or presentation to the driver. If the driver then tries to improve the real-time risk/safety score or accepts the vehicle-operation change recommendation, then the insurance premium pricing for the vehicle can also be improved.

For embodiments in which the predictive vehicle risk minimization recommendations are provided to the driver, the risk assessment system 101 receives trip data for a starting point and a destination and optionally a time (e.g., now or a specific time in the future) for a trip that the driver intends to take with the vehicle. Conventional route-planning applications (e.g., Google Maps, MapQuest, etc.) generally use such trip data to determine the shortest route (based on time or distance) from the starting point to the destination. However, the shortest route is not necessarily the safest route. Therefore, the risk assessment system 101 uses the trip data, along with the risk assessment data (i.e., the driver assistance system data, the driver data, and the route data), to calculate the route with the lowest potential risk or the highest likelihood of safety. For example, the shortest route may include an old two-lane road that has been poorly maintained, such that the road has many bumps, dips, potholes, loose gravel on the shoulders, and barely visible lane markers, among other potential defects. A slightly longer route, on the other hand, may be a divided four-lane highway with a relatively smooth surface and recently painted lane markers. Additionally, the trip may happen to coincide with a heavy rainstorm that is centered over the shortest route. In this example, the risk assessment system 101 may calculate a lower risk of accident or potential for loss if the vehicle 103 were to be operated in a fully-self-driving mode or with an autopilot engaged for at least a portion of the trip via the longer (i.e., the safer) route that included the divided four-lane highway than under any driving conditions for the trip via the shorter (i.e., the more dangerous) route on the old two-lane road in the rain. The risk assessment system 101, thus, transmits the recommendation for the safer route (and optionally for using the fully-self-driving mode or the autopilot) to the vehicle 103 for display or presentation to the driver, so that the driver can make an informed decision regarding which route to take, e.g., faster/shorter but potentially more dangerous or slower/longer but potentially safer, and whether to engage the fully-self-driving mode or the autopilot. If the driver accepts the safer route recommendation with the fully-self-driving mode or the autopilot engaged (i.e., the predictive vehicle risk minimization recommendation), then the insurance premium pricing for the vehicle can also be improved, or lowered. In some embodiments, therefore, the safer route is also considered to be the cheapest, or lowest cost, route, due to an inverse relationship between the safety level of the route and the cost of the insurance premium pricing, i.e., greater safety is related to lower cost, and conversely greater risk is related to higher cost.

For embodiments that determine automobile insurance premium pricing, the vehicle risk minimization system 100 is considered to be an automobile insurance premium pricing system, and the risk assessment system 101 includes, or is in communication with (e.g., via the network 102), an insurance system that determines the premium pricing based on the risk assessment data. The risk assessment system 101 calculates the premium pricing based on the real-time risk of loss prediction for a premium payment time interval (e.g., daily, weekly, monthly, bi-monthly, quarterly, semi-annually, annually, etc.). Since the premium pricing results from a variety of data collected in real-time while the vehicle 103 is under operation, the premium pricing can change over time to directly reflect the real-world risk of loss for the vehicle 103. This technique for insurance premium pricing thereby provides an insurance policy cost that is highly individualized for each vehicle and driver, instead of the simple averaged fixed cost for all similarly-situated customers of traditional automobile insurance premium pricing or the only slightly more individualized pricing of typical Usage Based Insurance (UBI). Additionally, the automobile insurance premium pricing can be combined with the embodiments in which the real-time vehicle risk feedback and/or the predictive vehicle risk minimization recommendations are provided to the driver; thereby potentially increasing the safety of the vehicle 103, the driver and any passengers, as well as providing feedback that potentially helps the driver to decrease the cost of the automobile insurance premium pricing. In some embodiments, the real-time risk/safety score described above is calculated in terms of the automobile insurance premium pricing, and/or the safer route recommendation described above is based on the automobile insurance premium pricing.

The risk assessment system 101 generally represents one or more physical computer devices, such as web servers, rack-mounted computers, neural network artificial intelligence (AI) processors, database storage devices, network storage devices, desktop computers, laptop/notebook computers, etc. In some embodiments implemented at least partially in a cloud network, potentially with data synchronized across multiple geolocations, the risk assessment system 101 may be referred to as a cloud server. In some embodiments, the functions of the risk assessment system 101 are enabled in a single computer device. In more complex implementations, some of the functions of the risk assessment system 101 are distributed across multiple computer devices, whether within a single "server farm" facility or multiple physical locations. In some embodiments wherein the risk assessment system 101 represents multiple computer devices, some of the functions of the risk assessment system 101 are implemented in some of the computer devices, while other functions are implemented in other computer devices.

The risk assessment system 101 generally collects, stores and/or generates the risk assessment data (or data from which to generate the risk assessment data) and the trained risk prediction models for many vehicles (e.g., the vehicle 103) and multiple types of vehicles. In some embodiments, the risk assessment system 101 collects the risk assessment data directly from the vehicles, such as the vehicle 103, through the network 102. In some embodiments, the risk assessment system 101 collects the risk assessment data from the vehicle servers 104, which obtain data for forming the risk assessment data from the vehicles. In some embodiments, the risk assessment data is obtained from both the vehicles (e.g., the vehicle 103) and the vehicle servers 104 as appropriate.

The driver assistance system data included in the risk assessment data is data that describes features within the vehicle 103 that are commonly referred to as advanced driver assistance systems (ADAS), including fully self-driving and autopilot capabilities, as well as features for various levels of automatic driver-assistance that can be provided to aid the driver in a non-fully-self-driving vehicle. The driver assistance system data, thus, generally includes a list of the driver assistance system features (e.g., including automatic driving features), or the types thereof, available or installed within the vehicle 103 and a real-time information list for which of the driver assistance system features or types are currently actively engaged for controlling or assisting in the control of the vehicle 103 (i.e., the automatic driving information) at multiple time points or during multiple time intervals throughout the overall time of a given trip made by the vehicle 103. Some embodiments of a system and method for detecting automatic driving and/or non-automatic driving (and, thereby, generating the automatic driving information) are described below with reference to FIGS. 4-17. In some embodiments, the driver assistance system features include, but are not limited to, one or more of: autopilot, adaptive cruise control, adaptive light control, automatic braking, automatic parking, blind spot detection, collision avoidance systems, driver drowsiness detection, driver attention detection, driver-on-phone detection, GPS (Global Positioning System) navigation, hill descent control, intelligent speed adaptation, lane departure warning systems, night vision, and tire pressure monitoring, among others.

In some embodiments, the list of the driver assistance system features available or installed within the vehicle 103 is obtained by the risk assessment system 101 from the vehicle 103. In some embodiments, the make/model or an identifier of the vehicle 103 is obtained by the risk assessment system 101 from the vehicle 103, and then the risk assessment system 101 uses this information to obtain the list of the driver assistance system features available or installed within the vehicle 103 from the vehicle servers 104 or from a separate database of vehicles correlated with driver assistance system features. In some embodiments, the list of the driver assistance system features available or installed within the vehicle 103 can be obtained by the risk assessment system 101 only once, since these types of features typically do not change, but are usually permanent features of the vehicle 103. On the other hand, some types of driver assistance system features can be added to or removed from the vehicle 103 by adding or removing hardware components or software programming to or from the vehicle 103. In some embodiments, therefore, the list of the driver assistance system features available or installed within the vehicle 103 is obtained by the risk assessment system 101 at some point after every time the vehicle 103 is started.

Additionally, some types of the vehicle 103 that have completely self-driving capabilities allow the driver to take over at least some, if not all, manual control of the vehicle, either at the driver's discretion or only in certain situations. Also, some types of the vehicle 103 that have features for providing automatic assistance to the driver allow the driver to select which of these features are engaged at any given time, such as cruise control or an autopilot for long stretches of highway driving, among others. Therefore, in some embodiments, the real-time information list for which of the driver assistance system features are currently actively engaged (i.e., the automatic driving information) is obtained by the risk assessment system 101 from the vehicle 103. In some embodiments, an identifier of the vehicle 103 is obtained by the risk assessment system 101 from the vehicle 103, and then the risk assessment system 101 uses this information to obtain the automatic driving information from the vehicle servers 104. In some embodiments, however, the automatic driving information is not readily available or obtainable from the vehicles or the vehicle servers 104. In such embodiments, the risk assessment system 101 (via the automatic driving detection system 127) obtains and analyses the vehicle operation data 128 in order to detect time periods of automatic driving and/or non-automatic driving by the vehicle 103. Some embodiments of a system and method for detecting automatic driving and/or non-automatic driving (and, thereby, generating the automatic driving information) are described below with reference to FIGS. 4-17. In some embodiments, the automatic driving information is obtained or generated by the risk assessment system 101 at periodic time points or when triggered by a change in operating conditions (e.g., when the driver engages or disengages any of the driver assistance system features, when the vehicle 103 is started, when changes in route conditions are detected, etc.). The automatic driving information is obtained or generated at multiple time points or for multiple time intervals or periods throughout the overall time of a given trip made by the vehicle 103.

The driver data included in the risk assessment data generally includes an identification of the driver of the vehicle (driver ID data), a driving history of the driver (driver history data), and a real-time current driving performance of the vehicle 103 or the driver (driver-performance data of the automatic driving features of the vehicle 103 in the automatic driving mode and/or of the driver in the non-automatic driving mode) at multiple time points or during multiple time intervals. The driver ID data generally includes one or more of: the driver's name, driver license number, tax ID number, other alphanumeric designator for the driver, the age/birthdate of the driver, the gender of the driver, a work/residence address of the driver, and driver education and training courses taken by the driver, among other types of data. The driver ID data can be obtained by the risk assessment system 101 directly from the driver or the driver's representative when the driver registers for or requests a quote for an insurance policy. Most of the driver ID data can be obtained by the risk assessment system 101 only once, since most of this data typically does not change or does not change often. However, since some of this data can potentially change, some or all of the driver ID data may be obtained or updated by the risk assessment system 101 periodically, e.g., monthly, quarterly or yearly, as appropriate.

The driver history data generally includes police reports for driving violations and accidents, claims made against insurance for accidents, and other driving related events related to the driver. The driver history data may also include the dates on which each violation, accident or other event occurred, the age of the driver on that date, and the make/model or type of vehicle the driver was then operating. Since this type of data can change, although not usually very often, the risk assessment system 101 can obtain or update this data periodically, e.g., monthly, quarterly or yearly, as appropriate, either from the driver, the driver's representative, public records databases, insurance company databases, etc.

The driver-performance data generally includes data obtained from vehicle control, feedback and sensor subsystems of the vehicle 103 while the vehicle 103 is being operated in the automatic driving mode and/or the non-automatic driving mode. The driver-performance data, therefore, can include a variety of different types of information, including, but not limited to, speed data, power data, heading data, location data, acceleration data, deceleration data, stopping data, steering data, signaling data, lane change data, and/or data related to the driver's response to other vehicles resulting from real-time operation of the vehicle 103, as well as sensor data related to driver alertness, attentiveness, responsiveness, and use of passive restraining devices (e.g. seat and shoulder belts). Thus, the driver-performance data can include the vehicle operation data 128. Such data is indicative of how well or safely the driver operates the vehicle 103, how closely the driver pays attention to the route, road obstacles, traffic signs/signals, and other vehicles on the route, and whether the driver adjusts his or her driving habits to account for changing conditions (e.g., weather, day/night, school zones, construction zones, speed limits, traffic levels, etc.). Additionally, some of this data is also indicative of whether the vehicle 103 is being operated in the automatic driving mode and/or the non-automatic driving mode, as described below with reference to FIGS. 4-17. The driver-performance data can also include sensor data related to the number of passengers and their use of passive restraining devices, since other occupants of the vehicle 103, particularly occupants not properly restrained in their seats, can potentially distract the driver.

In some embodiments, the driver-performance data is generated by subsystems of the vehicle 103 in real-time while the vehicle 103 is being operated in the automatic driving mode (e.g., a fully-automatic self-driving mode in which the driver is relieved of all driving responsibilities or an autopilot mode in which the driver is supposed to maintain watch over the operation of the vehicle 103 and be ready to take over control when needed) or the non-automatic driving mode (e.g., a fully-manual driver-operated mode, or a partially-automatic/partially-manual driver-assistance mode). The fully-manual mode occurs when none of the driver assistance system features are currently actively engaged, and the driver exercises complete control over the movement controls of the vehicle 103. The partially-automatic/partially-manual mode occurs when one or more of the driver assistance system features is currently actively engaged, and the driver exercises control over at least one of the movement controls (e.g., via an accelerator pedal, brake pedal, steering wheel, etc.) of the vehicle 103. The partially-automatic/partially-manual mode can also occur when the vehicle 103 is being operated in the fully-automatic self-driving mode or the autopilot mode, but the driver interrupts one of these modes by exercising any level of control, however long or short, over any of the movement controls, e.g., to momentarily cause a speed change, direction change, or lane change that the fully-automatic self-driving mode or the autopilot mode would not otherwise make.

In some embodiments, the driver-performance data is generated by subsystems of the vehicle 103 at periodic time points sufficiently spaced to ensure an adequate real-time representation of the performance of the driver or of the automatic driving features of the vehicle 103, e.g., on the order of milliseconds, seconds or minutes. In some embodiments, this data is generated by subsystems of the vehicle 103 when triggered by certain events, such as when the driver changes the pressure on the accelerator or brake pedal, the driver changes the orientation of the steering wheel, the driver speaks (e.g., into a phone or to a voice-activated driver-vehicle interface), motion sensors of the vehicle 103 detect a bump/dip in the road, or another vehicle approaches the vehicle 103 within a certain distance, among other appropriate events or actions by the driver, the vehicle 103 or other vehicles.

In some embodiments, the subsystems of the vehicle 103 transmit the driver-performance data, including the vehicle operation data 128, through the network 102 to the risk assessment system 101, including to the automatic driving detection system 127, immediately after acquiring or generating this data if a wireless connection is available (e.g., via a cellular, WIFI, etc. connection). In some embodiments, the subsystems of the vehicle 103 transmit this data to the risk assessment system 101 at periodic time points, e.g., on the order of minutes, hours or days.

In some embodiments, the driver-performance data includes low-level raw unprocessed sensor and control subsystem data generated by the subsystems of the vehicle 103. In some embodiments, the driver-performance data includes processed data, such as higher-level indicators of the driver's or vehicle's performance generated from or based on the low-level raw unprocessed sensor and control subsystem data. In some embodiments, the subsystems of the vehicle 103 transmit the raw unprocessed driver-performance data to the risk assessment system 101, so that the risk assessment system 101 can process it to determine the indicators of the driver's performance. In some embodiments, one or both of the low-level unprocessed sensor and control subsystem data is compressed before transmission. In some embodiments, rather than transmitting the raw data, the subsystems of the vehicle 103 process this data to determine the indicators of the driver's or vehicle's performance and then transmit data representing the performance indicators to the risk assessment system 101.

The driver-performance data, or the indicators of the driving performance of the driver or the vehicle 103, generally include one or more of: the speed of the vehicle 103, the power draw/consumption of the vehicle 103, the heading of the vehicle 103, the location of the vehicle 103, how often and by how much the speed of the vehicle 103 exceeds speed limits (particularly in hazardous zones, e.g., construction zones and school zones), how quickly the driver accelerates or decelerates the vehicle 103, whether and how often the driver brings the vehicle 103 to a complete stop at stop signs/signals, how soon or quickly the driver accelerates the vehicle 103 after an external signal change from "stop" (e.g., red light) to "go" (e.g., green light), whether and how soon the driver activates turn signals prior to turning the vehicle 103 or changing lanes, whether and how often the driver has made an accidental lane change (e.g., by beginning to change lanes, but then aborting the lane change quickly), how often or how quickly the driver changes the orientation of the steering wheel, how often the driver changes the pressure on the accelerator or brake pedal, how often the driver changes lanes, how often the driver is not looking at the road, whether the driver observes and takes action to avoid other vehicles that exhibit erratic movement (e.g., frequent lane or direction changes of the other vehicle as if the other vehicle is operated by a drunk or incapacitated driver), how often the driver talks on a phone or to passengers, how often the driver asserts any type of manual control over the vehicle 103 when conditions indicate that automatic control would ordinarily be more preferable, how often the driver fails to accept manual control of the vehicle 103 when conditions indicate that automatic control would ordinarily be less preferable, among other performance-indicative actions or behaviors of the driver or the vehicle 103. In some embodiments, values for the driver performance indicators may be generated each time the driver performance data indicates a deviation from a preferred or optimal level of performance for each type of performance indicator. In some embodiments, a level of the values may indicate a severity or duration of the deviation.

The route data included in the risk assessment data generally includes a real-time current route traveled by the vehicle and a real-time current condition of the route at the current location of the vehicle 103 at multiple time points or during multiple time intervals. The current route can be determined based on location data (e.g., GPS data) received by the risk assessment system 101 from the vehicle 103 as correlated with known street map data. The current condition of the route can be determined from weather reports (e.g., for hot, cold, wet, dry, icy, foggy, etc.) from local or national weather tracking systems, time of day (e.g., for day or night), sensor data (e.g., from thermometers, moisture sensors, cameras, motion/vibration sensors, etc.) received from the vehicle 103 and other vehicles nearby or on the same route, traffic reports (e.g., for level of traffic), among other potential sources.

In various embodiments, since the vehicle 103 could potentially turn onto another route at any opportunity, the route data is generally updated periodically (e.g., milliseconds, seconds or minutes). In some embodiments, the route data is generally updated when triggered upon the occurrence of an event (e.g., when the speed or direction of the vehicle 103 changes by more than a predetermined amount).

In some embodiments, the systems of the vehicle 103 determine some or all of the route data and transmit this data to the risk assessment system 101 either as low-level raw unprocessed sensor and control subsystem data or as processed (or partially processed) higher-level data that represents the route conditions. In some embodiments, the risk assessment system 101 processes the route data from the various potential sources to generate the higher-level data that represents the current route and current route conditions.

The vehicle servers 104 generally represent one or more physical computer devices, such as web servers, rack-mounted computers, neural network artificial intelligence (AI) processors, database storage devices, network storage devices, desktop computers, laptop/notebook computers, etc. In some embodiments implemented at least partially in a cloud network, potentially with data synchronized across multiple geolocations, the vehicle servers 104 may be referred to as a cloud server. In some embodiments, the functions of the vehicle servers 104 are enabled in a single computer device. In more complex implementations, some of the functions of the vehicle servers 104 are distributed across multiple computer devices, whether within a single "server farm" facility or multiple physical locations. In some embodiments wherein the vehicle servers 104 represent multiple computer devices, some of the functions of the vehicle servers 104 are implemented in some of the computer devices, while other functions are implemented in other computer devices.

The vehicle servers 104 generally belong to or are operated on behalf of the manufacturers or sellers of vehicles (e.g., the vehicle 103) that have self-driving or advanced driver assistance systems. The vehicle servers 104 generally track, monitor or maintain various functions of the various different makes/models or types of the vehicle 103. For example, to continually improve the self-driving, autopilot, or driver-assistance capabilities of these vehicles, the vehicles communicate through the network 102 to provide operational data to the vehicle servers 104. The manufacturers collect and analyze this data in order to modify or update the self-driving, autopilot, or driver-assistance algorithms or subsystem designs used in current and future vehicles. The vehicle servers 104 also typically provide information to the vehicles to aid in ongoing self-driving, autopilot, or driver-assistance operations. The typical functions of the vehicle servers 104, in other words, collect and analyze much of the same types of data used for some or all of the risk assessment data, including the driver assistance system data, the driver data (including the vehicle operation data 128), and the route data. In some embodiments, therefore, the risk assessment system 101 obtains at least some of the risk assessment data from the vehicle servers 104, instead of from the vehicle 103.

The network 102 generally represents the physical infrastructure of any appropriate combination of communication systems. The network 102, therefore, generally includes a variety of wired and wireless communication networking devices for cell phone (3G, 4G, etc.) data communications, Internet transmissions (e.g., in an IP network), WiFi connections, etc. The communication with the vehicle 103 is typically via any appropriate wireless technology.

The illustrated vehicle 103 represents any one of multiple types of vehicles that have advanced driver assistance systems (ADAS). Different manufacturers of ADAS-capable vehicles may include various different components and combinations of components in different makes and models of ADAS-capable vehicles. Therefore, the components and subsystems shown for the vehicle 103 are provided for illustrative and explanatory purposes only. Other embodiments or examples may have different components, additional components, fewer components, and/or different combinations of components. In the illustrated example, the example components of the vehicle 103 generally include, but are not limited to, one or more processors 105, a computer memory 106, a variety of sensors 107, one or more cameras 108, a position location (e.g., GPS) device 109, a direction determination device (e.g., a compass) 110, a battery controller 111, a power regeneration controller 112, an instrument panel 113, a variety of driver controls 114, a variety of vehicle movement controls 115, a monitor 116, a network input/output (I/O) device 117, and a controller area network (CAN) bus 118, among other elements not shown for simplicity. The driver controls 114 generally include electronics for receiving input signals from the driver, e.g., accelerator pedal electronics 119, brake pedal electronics 120, steering wheel electronics 121, and user interface electronics 122. The vehicle movement controls 115 generally include electronics for controlling steering, propelling and stopping the vehicle 103, e.g., steering electronics 123, fuel injection electronics 124, electric motor electronics 125, and brake electronics 126, among others not shown for simplicity.

The components communicate with each other as appropriate through the CAN bus 118, which represents one or more component communication subsystems internal to the electronic control system of the vehicle 103. Although the communication lines between the CAN bus 118 and the other components are shown as bidirectional arrows, it is understood that some of the communications may be unidirectional, as appropriate for the needs and functions of some of the components. Additionally, the network I/O device 117 generally represents any appropriate electronics for transmitting and receiving network messages to and from the network 102 and to and from the risk assessment system 101 and/or the vehicle servers 104.

The computer memory 106 generally represents one or more RAM modules on one or more PCBs in one or more housings or enclosures. The computer memory 106 also generally represents or comprises any appropriate number or combination of physical mass storage devices, such as hard drives, optical drives, flash drives, etc. The computer memory 106 generally provides persistent storage (e.g., in a non-transitory computer readable medium) as well as run-time main electronic memory for the programs (e.g., computer-executable instructions) and data used in operation of the processor 105.

The processor 105 generally represents one or more application-specific integrated circuits (ASICs), FPGAs, special-purpose microprocessors, central processing units, graphics processors, and/or general-purpose microprocessors on one or more PCBs in one or more housings or enclosures. As a general-purpose microprocessor, when executing computer-executable instructions for performing any of the functions of the vehicle 103 and its components in cooperation with the computer memory 106, the processor 105 becomes a special purpose computer for performing the functions of the instructions. Among other functions, for example, control of the driver assistance system features via the vehicle movement controls 115 and responses to driver inputs from the driver controls 114 are managed in real-time by the processor 105. Additionally, activation/deactivation or engagement/disengagement of the driver assistance system features is handled by the processor 105 in conjunction with the computer memory 106.

The sensors 107 generally represent any appropriate combination of speedometers, multi-axis motion sensors, vibration sensors, multi-axis rotation sensors, proximity sensors, LIDAR, accelerometers, thermometers, barometers, weight sensors, light detectors, fuel gauges, power sensors, etc. The camera 108 generally represents any appropriate types of one or more electronic cameras with a field of view inside or outside the vehicle 103. The GPS device 109 generally represents any appropriate location-determination electronics used in generating data to determine the location of the vehicle 103. The compass 110 generally represents any appropriate heading- or direction-determination electronics used in generating data to determine the direction in which the vehicle 103 is aligned. The battery controller 111 generally represents any appropriate electronics for controlling or monitoring the charge level of the battery, the charge/discharge rate of the battery, and the condition of the battery. The power regeneration controller 112 generally represents any appropriate electronics for controlling or monitoring the regeneration of electrical power by motors/generators of the vehicle 103 in embodiments in which it is an electric or hybrid fuel/electric vehicle.

The sensors 107, the cameras 108, the GPS device 109, the compass 110, the battery controller 111, and the power regeneration controller 112 generally generate data related to movement, operation or conditions of the vehicle 103, the interior of the vehicle 103, the environment outside the vehicle 103, other nearby vehicles, the driver, any passengers in the vehicle 103, the route, road hazards, road signs/signals, etc. Therefore, the sensors 107, the cameras 108, the GPS device 109, the compass 110, the battery controller 111, and the power regeneration controller 112 generally represent monitoring components that generate some of the data for the risk assessment data, such as at least some of the driver data (including the vehicle operation data 128) and the route data, as well as feedback data for operation of the driver assistance system features, among other data.

The instrument panel 113 generally represents any appropriate electronic displays, lights, LEDs, gauges, etc. that provide vehicle operating information or vehicle component status to the driver, such as speed, compass heading, outside/inside temperature, tire pressure, fuel level, battery charge level, power regeneration efficiency, mileage, etc. The instrument panel 113 can, thus, provide information or instructions to the driver to aid the driver in improving the driving performance of the driver. The instrument panel 113 can also provide information and instructions to the driver for when to engage or disengage any of the driver assistance system features. Proper attention by the driver to the instrument panel 113, therefore, can result in improvements to the values for the driver performance indicators described above.

The accelerator pedal electronics 119 generally represent any appropriate electronic devices that monitor or receive driver input when the driver manipulates or applies pressure to the accelerator pedal. The brake pedal electronics 120 generally represent any appropriate electronic devices that monitor or receive driver input when the driver manipulates or applies pressure to the brake pedal. The steering wheel electronics 121 generally represent any appropriate electronic devices that monitor or receive driver input when the driver manipulates or turns the steering wheel. The user interface electronics 122 generally represent any appropriate electronic devices, such as buttons, switches, touch screens, etc. that monitor or receive driver input when the driver manipulates or activates any of these devices. The accelerator pedal electronics 119, brake pedal electronics 120, steering wheel electronics 121, and user interface electronics 122 (i.e., the driver controls 114) generally receive driver inputs indicative of actions taken by the driver and communicate the driver inputs to the processor 105 or other appropriate electronics for responding to driver actions when the driver is exercising any level of manual control over the movement of the vehicle 103. These components, therefore, provide at least some of the data for, or that is used to generate, some or all of the driver-performance data (including the vehicle operation data 128).

The steering electronics 123 generally represent any appropriate electronics for controlling the left/right steering or turning of the tires. The fuel injection electronics 124 generally represent any appropriate electronics for controlling the amount of fuel (e.g., gasoline, diesel, blended fuels, hydrogen, etc.) provided to the internal combustion engine of the vehicle 103 in embodiments in which it is a fuel-powered or hybrid fuel/electric vehicle. The electric motor electronics 125 generally represent any appropriate electronics for controlling the amount of electrical power provided to, or drawn by, the electrical motors of the vehicle 103 in embodiments in which it is an electric or hybrid fuel/electric vehicle. The brake electronics 126 generally represent any appropriate electronics for controlling the deceleration of the vehicle 103 via the brakes and/or the power regeneration subsystem. Therefore, the accelerator pedal electronics 119, brake pedal electronics 120, steering wheel electronics 121, and user interface electronics 122 receive control signals for controlling the movement of the vehicle 103 during self-driving mode, when the driver is exercising any level of manual control over the movement of the vehicle 103, or when any of the driver assistance system features override the driver's manual control. Thus, some of the driver-performance data (including the vehicle operation data 128) can potentially be obtained from these control signals when the driver is exercising any level of manual control over the movement of the vehicle 103.

In some embodiments, the monitor 116 generally represents any appropriate electronics for monitoring which one or more of the driver assistance system features is currently actively engaged. In some embodiments, the monitor 116 also represents any appropriate electronics for monitoring the driver controls 114 for the driver inputs indicative of actions taken by the driver. In some embodiments, the monitor 116 further represents any appropriate electronics for monitoring the sensors 107, the cameras 108, the GPS device 109, the compass 110, the battery controller 111, and the power regeneration controller 112 for other risk assessment data, such as some of the driver data and route data, among other data. Thus, the monitor 116 also represents any appropriate electronics for obtaining the vehicle operation data 128 or the raw data from the vehicle control, feedback and sensor subsystems of the vehicle 103 from which the vehicle operation data 128 can be determined by the automatic driving detection system 127.

In some embodiments, the monitor 116 represents an appropriate hardware electronic device for an after-market addition to the vehicle 103. In this case, the other components of the vehicle 103 are not originally intended to operate with the monitor 116, but the monitor 116 is added to the vehicle 103 by electrically connecting it to the CAN bus 118 so that the vehicle 103 can be used in the vehicle risk minimization system 100. The monitor 116, in this configuration, is able to obtain the above described data by "snooping," "sniffing," or copying certain types of data that is transmitted through the CAN bus 118. For example, data indicative of which of the driver assistance system features are currently actively engaged is typically presented on the CAN bus 118. Additionally, some or all of the other above described data for generating the driver-performance data is also communicated through the CAN bus 118. The monitor 116, therefore, can copy some or all of this type of data.

In some embodiments, the monitor 116 represents an appropriate hardware electronic device that is integrated into the control system of the vehicle 103 such the monitor 116 and any appropriate ones of the other components 105-126 can specifically address each other through the CAN bus 118. In this case, the monitor 116 can, not only snoop for data on the CAN bus 118, but can also directly communicate with any of the other components 105-126 via the CAN bus 118 to specifically request some or all of the above described data.

In some embodiments, the monitor 116 represents software installed in the computer memory 106 and run by the processor 105 or an appropriate combination of such software and additional hardware. Since some if not all of the data generated or used by the other components 105-126 of the vehicle 103 passes through or is manipulated by the processor 105 and the computer memory 106, the additional software installed for the monitor 116 can simply use the same data.

In some embodiments, the monitor 116 transmits the data that it obtains through the network I/O device 117, through the network 102, and to the risk assessment system 101 (including to the automatic driving detection system 127). In some embodiments, if the monitor 116 does not have access to the network I/O device 117, then the monitor 116 is equipped with or electronically connected to its own network I/O device for transmitting the data that it obtains through the network 102, and to the risk assessment system 101. In some embodiments, the monitor 116 can also receive data, instructions or updates from the risk assessment system 101.

Figure 2:
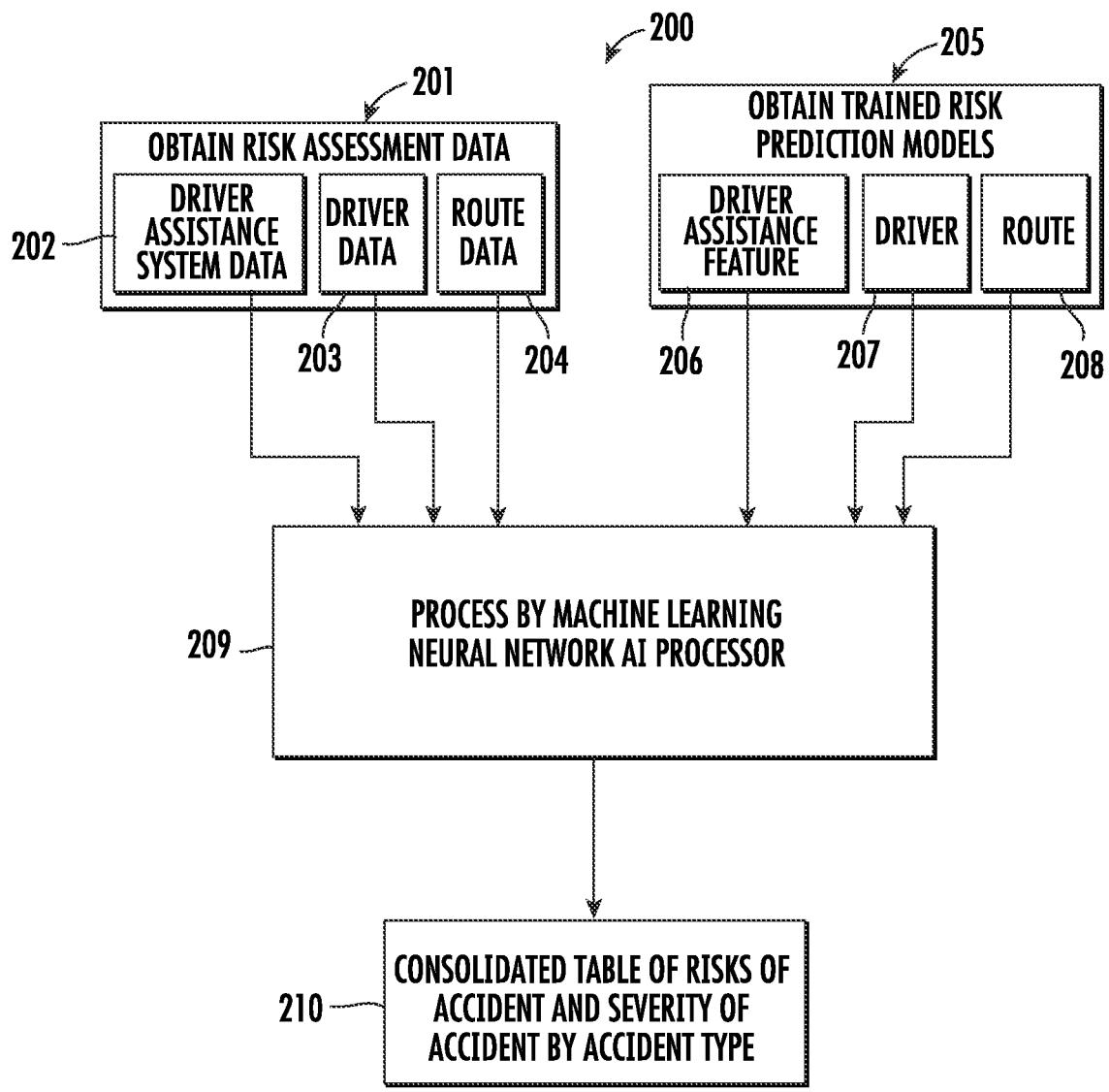
FIG. 2 is a simplified example workflow diagram for determining a real-time prediction for a risk of loss that could occur due to a vehicle being involved in an accident, in accordance with some embodiments.

FIG. 2 is a simplified example workflow diagram for a process 200 for the risk assessment system 101 to determine a real-time prediction for a risk of loss that could occur due to the vehicle 103 being involved in an accident, in accordance with some embodiments. The process 200 represents one or more programs, applications or routines for performing the functions described. The process 200 is shown for illustrative and explanatory purposes only. Other processes having different specific steps, combinations of steps, or order of steps are also within the scope of the subject matter herein. Additionally, in some embodiments, the process 200 represents computer readable instructions stored in a non-transient computer readable medium for controlling the function of a computer.

In some embodiments, the process 200 starts with the risk assessment system 101 obtaining (at 201) the risk assessment data, including driver assistance system data 202, driver data 203, and route data 204, as described above, for the vehicle 103 for a given time point or time interval. Additionally, the risk assessment system 101 obtains (at 205) trained risk prediction models including a driver assistance feature risk prediction model 206, a driver risk prediction model 207, and a route risk prediction model 208.

In some embodiments, the trained risk prediction models 206-208 include one or more databases of the loss risks of vehicle accidents organized by type of accident correlated with respect to various different combinations of the risk assessment data. The trained risk prediction models 206-208 are previously generated by processing historical data of types of accidents that have occurred and their severity in conjunction with available data regarding the vehicles, drivers and routes involved in the accidents for vehicles that had any type of driver assistance system features. The driver assistance feature risk prediction model 206, for example, generally correlates loss risks for various types of accidents with respect to various different combinations of data available for driver assistance system features that were available, active or engaged in the vehicles at the time of the accidents, e.g., similar to the above described driver assistance system data (e.g., including the automatic driving features and/or automatic driving information). The driver risk prediction model 207 generally correlates loss risks for various types of accidents with respect to various different combinations of data available for the drivers of the vehicles involved in the accidents, e.g., similar to the above described driver assistance feature data. The route risk prediction model 208 generally correlates loss risks for various types of accidents with respect to various different combinations of data available for the routes on which the accidents occurred, e.g., similar to the above described route data. The trained risk prediction models 206-208 are continually updated or modified with an ongoing accumulation of data for new accidents, new or updated driver assistance system features, new or updated monitoring components for generating the risk assessment data, new or updated route data, and new combinations thereof.

The driver assistance system features typically help the driver maintain control over the vehicle and prevent accidents. Therefore, it is usually preferable or advantageous for the driver to actively engage all available driver assistance system features in the vehicle 103, since doing so would likely reduce the probability of an accident and the risk of the resulting loss. The driver assistance feature risk prediction model 206, therefore, generally assigns lower loss risks for most of the types of accidents when more driver assistance system features are available and actively engaged in the vehicle 103. However, there are exceptions in which manual control by the driver is preferable to automatic control by some driver assistance system features, such as when the vehicle 103 is not on a well-defined or constructed roadway such that there are no indicators (e.g., lane stripes or street pavement) that an automatic steering or self-driving feature can use to keep the vehicle 103 on a desired track, or when heavy rain obscures sensors or cameras such that input data used to control the vehicle 103 is invalid or unreliable. In some embodiments, therefore, the correlations between the types of accidents and the various different combinations of the risk assessment data in the trained risk prediction models 206-208 take into consideration, not only whether any of the available driver assistance system features of the vehicle 103 are actively engaged according to the driver assistance system data 202, but also whether it was appropriate under the existing conditions indicated by the route data 204 to actively engage any of the available driver assistance system features. As driver assistance system features improve, however, the correlations between the types of accidents and whether it is appropriate to engage some of the driver assistance system features may change, so the trained risk prediction models 206-208 will be updated accordingly.

Additionally, a highly trained driver could potentially outperform driver assistance system features with respect to accident avoidance. In some embodiments, therefore, the correlations between the types of accidents and the various different combinations of the risk assessment data in the trained risk prediction models 206-208 take into consideration whether the driver data 203 for the vehicle 103 indicates that the driver has taken advanced driver safety courses for any type of route conditions in determining whether it was appropriate under the existing conditions indicated by the route data 204 to actively engage any of the available driver assistance system features.

In some embodiments, the risk assessment system 101 includes a machine learning neural network artificial intelligence (AI) processor that processes (at 209) in real-time the risk assessment data 202-204 with the trained risk prediction models 206-208 to produce a consolidated table 210 of risks of accidents and severity thereof for each accident type. In some embodiments, the real-time processing of the risk assessment data 202-204 with the trained risk prediction models 206-208 involves cross correlating or comparing each type of the risk assessment data (i.e., the driver assistance system data 202, the driver data 203, and the route data 204) with each type of the trained risk prediction models (e.g., the driver assistance feature risk prediction model 206, the driver risk prediction model 207, and the route risk prediction model 208), as may be appropriate.

In some embodiments, the consolidated table 210 represents a real-time prediction of the probability of an accident (and its probable severity) by accident type. The probable severity for each type of accident generally includes the probable level of damage or injury to the vehicle 103, other vehicles, the driver and passengers of the vehicle 103, the driver and passengers of other vehicles, property inside the vehicle 103 or other vehicles, property near the vehicle 103 or other vehicles, among others. The types of accident generally include, but are not limited to, the vehicle 103 rear-ending another vehicle, the vehicle 103 being rear-ended by another vehicle, the vehicle 103 side-swiping another vehicle, the vehicle 103 being side-swiped by another vehicle, the vehicle 103 side-swiping a bicyclist, the vehicle 103 running head-on into a stationary object, the vehicle 103 backing into a stationary object, the vehicle 103 rolling over during a turn, among other types of accidents.

The process 200 is repeated for the vehicle 103 for multiple time points or time intervals (e.g., separated or defined on the order of milliseconds, seconds, minutes or hours, etc.) when the vehicle 103 is being operated during an overall time period (e.g., monthly, bi-monthly, quarterly, semi-annually, annually, etc.). In some embodiments, the overall time period is the time period for which the insurance policy pricing is to be determined. The process 200 is also performed for each driver of the vehicle 103, since many such vehicles may be shared by multiple people, e.g., family members, co-workers, etc. Multiple consolidated tables 210 for the multiple time points or time intervals are thus generated representing overall loss risk due to accident for the overall time period. The multiple consolidated tables 210 (i.e., the overall loss risk) are then used to calculate the real-time vehicle risk feedback, the predictive vehicle risk minimization recommendations, and/or the current or next insurance policy premium pricing amount.

Figure 3:
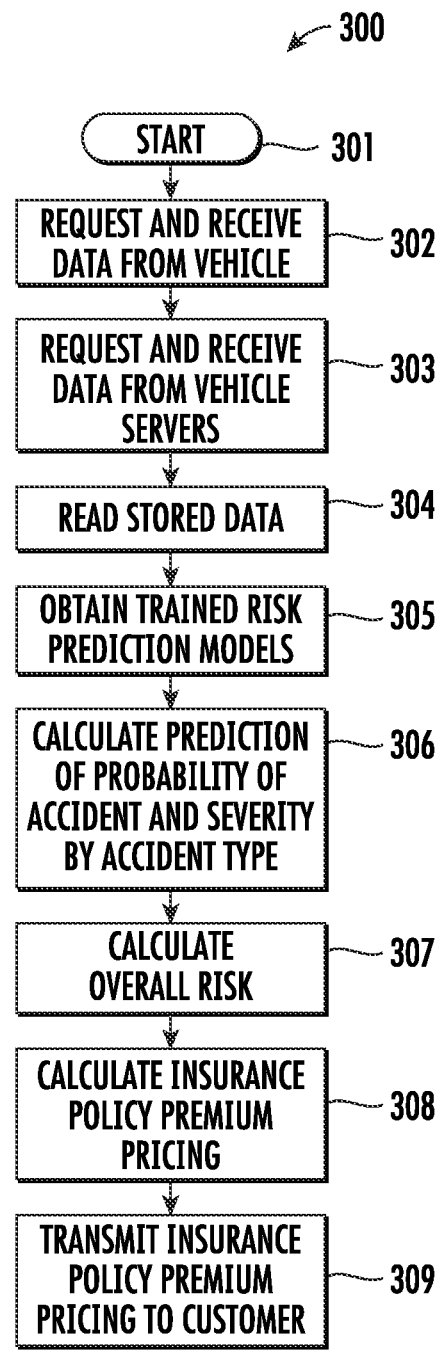
FIG. 3 is a simplified flowchart for an example process for determining automobile insurance premium pricing, in accordance with some embodiments.

FIG. 3 is a simplified flowchart for an example process 300 by the risk assessment system 101 for determining automobile insurance premium pricing, in accordance with some embodiments. The process 300 represents one or more programs, applications or routines for performing the functions described. The process 300 is shown for illustrative and explanatory purposes only. Other processes having different specific steps, combinations of steps, or order of steps are also within the scope of the subject matter herein. Additionally, in some embodiments, the process 300 represents computer readable instructions stored in a non-transient computer readable medium for controlling the function of a computer.

In some embodiments, upon starting the process 300 (at 301), the risk assessment system 101 requests and receives (at 302, 303, 304) the risk assessment data as described above (including obtaining the vehicle operation data 128 and generating the automatic driving information). For example, some of the data is obtained (at 302) from the vehicle 103 as described above. In some embodiments, the risk assessment system 101 does not need to request the data, since the vehicle 103 continually transmits new data as it is acquired or generated therein. In which case, the data is stored in a database of records until the risk assessment system 101 reads it. Additionally, some of the data is obtained (at 303) is obtained from the vehicle servers 104 as described above. Furthermore, some of the data described above does not require frequent updating, so it can be stored in the database of the risk assessment system 101 and read (at 304) when needed.

In some embodiments, the risk assessment system 101 obtains (at 305) the trained risk prediction models described above. In some embodiments, the risk assessment system 101 always maintains a complete set of the trained risk prediction models, so the risk assessment system 101 does not have to "obtain" it. Instead, the trained risk prediction models are simply updated within the database of the risk assessment system 101 as warranted.

Based on the risk assessment data and the trained risk prediction models, the risk assessment system 101 calculates (at 306) a real-time prediction of the probability of the vehicle 103 being involved in an accident and the probable severity thereof by each accident type. The risk assessment system 101, thus, generates one or more of the consolidated tables 210 of risks of accidents and severity thereof for each accident type at the multiple time points or time intervals as described above. Based on the prediction of the probability of the vehicle 103 being involved in an accident and the probable severity thereof for each accident type, the risk assessment system 101 calculates (at 307) the overall risk of loss due to an accident for the vehicle 103 for an overall time period. Based on the overall risk of loss, the risk assessment system 101 calculates (at 308) the automobile insurance premium pricing for the vehicle 103. The automobile insurance premium pricing is typically for the next billing period (e.g., monthly, quarterly, semi-annually, annually, etc.) for the customer that owns, or is financially responsible for the insurance payments of, the vehicle 103. However, in some embodiments, the automobile insurance premium pricing may be retroactively applied to the overall time period during which the risk assessment data was generated. The risk assessment system 101 then causes the automobile insurance premium pricing to be transmitted (at 309) to the customer, whereby it is also then presented to the customer for review, approval and payment.

The process 300, thus, results in an automobile insurance premium pricing for the customer that is highly individualized and customized for the vehicle 103 and/or the driver (s) thereof. The automobile insurance premium pricing changes on a billing-period-to-billing-period (e.g., month-to-month, etc.) basis as the driving performance of the driver changes (i.e., improves or worsens) or the amount of time that the driver uses the driver assistance system features actively engaged changes (i.e., increases or decreases). Additionally, if the vehicle 103 is not driven during an overall time period, then the resulting automobile insurance premium pricing is zero or minimal.

For embodiments in which the real-time vehicle risk feedback is provided to the driver, a process similar to the process 300 is performed, except that after step 306, the process proceeds to calculate the real-time risk/safety score based on the prediction of the probability of the vehicle 103 being involved in an accident and the probable severity thereof by each accident type. Additionally, the calculation of the real-time risk/safety score is repeated for different potential vehicle-operation change recommendations. The real-time risk/safety score and/or any vehicle-operation change recommendation is then transmitted to the vehicle 103 for display or presentation to the driver.

For embodiments in which the predictive vehicle risk minimization recommendations are provided to the driver for a trip, a process similar to the process 300 is performed, except that only the route data (e.g., weather, construction zones, day/night conditions, etc.) of the risk assessment data potentially needs to be real-time data, and the process starts by receiving the starting point, destination and (optionally) time data for the trip. Additionally, steps 302-306 are repeated for each potential route and for different combinations of driver assistance system features available within the vehicle 103, so that the prediction of the probability of the vehicle 103 being involved in an accident and the probable severity thereof is calculated for each potential route and for different combinations of the driver assistance system features. Additionally, the automatic driving information for other drivers or vehicles that have taken a trip via the same route (or route segment) can be used to determine a best or safest route, since a route on which drivers have engaged automatic driving features more often may be a safer route than a route on which drivers have engaged automatic driving features less often. The calculated results or risk/safety recommendations for the potential routes (including which of the available driver assistance system features are recommended to be engaged) are transmitted to the vehicle 103 for display or presentation to the driver. Additionally, in some embodiments, after the vehicle 103 has begun the trip, this process is repeated, so that the risk/safety recommendations for alternative routes (including which of the available driver assistance system features or automatic driving features are recommended to be engaged) are continually updated based on the current location of the vehicle 103, the destination for the trip, and the risk assessment data (as obtained in real-time).

Detecting Automatic Driving

FIGS. 4-17 illustrate some aspects of embodiments of the system and method ("automatic driving detection method") for detecting when a vehicle (e.g., 103) is engaged in automatic driving and/or non-automatic driving (and, thereby, generating the automatic driving information). The system and method are generally embodied in the automatic driving detection system 127 (FIG. 1). The automatic driving detection system 127 may be part of the risk assessment system 101 (as shown), of the vehicles (e.g., 103), of a separate subsystem (not shown), or distributed across these elements as appropriate.

Direct information explicitly stating whether an automatic driving feature is engaged at any time during a trip is not always readily available from a vehicle (e.g., 103) or from a server that is in communication with the vehicle 103. However, some manufacturers and/or sellers of vehicles 103 that have automatic driving features allow for relatively easy or inexpensive access to other types of data related to the vehicles, such as operational data of the vehicles, either during or after the trip. Therefore, the system and method represent an improvement that enables determination of whether an automatic driving feature was engaged at any time during a trip based on vehicle operation data (generated during operation of a vehicle that has such a feature) in the absence of direct information explicitly stating whether it was engaged.

A set of heuristics, or heuristic rules, have been developed that define a likelihood of an automatic driving feature of a vehicle (e.g., 103) having been engaged (or not engaged) as a function of sequential vehicle performance. The vehicle performance is indicated by or based on sequential vehicle operation data related to a trip made by the vehicle. The automatic driving information is generated according to actions triggered by the heuristic rules in response to analysis of the sequential vehicle operation data.

The sequential vehicle operation data includes a variety of different types of data that provide an indication of operation of the vehicle during a sequence of time intervals of the trip. The sequential vehicle operation data does not include a direct or explicit indication of whether the automatic driving feature was engaged during any of the time intervals of the sequence.

In some embodiments, the sequential vehicle operation data generally includes primary operation data, such as: a speed of the vehicle 103, a heading of the vehicle 103, a power consumption of the vehicle 103, and/or a location (e.g., GPS data) of the vehicle 103, during each time interval of the trip. The time intervals are of any appropriate length of time, e.g., one second, a fraction of a second, or multiple seconds, typically as designed by the vehicle manufacturer and/or developer. The sequential vehicle operation data also generally includes a timestamp for each time interval along with, or as part of, the primary operation data. The primary operation data is generally data that is generated by the vehicle 103 for each time interval of the trip. However, if some of the primary data is missing for any of the time intervals, then it is considered acceptable to fill in the missing primary data by interpolating from the primary data for the immediately preceding and immediately following time intervals, or the closest preceding and following time intervals, for which the primary data is not missing. In this situation, therefore, the primary operation data includes received or available primary operation data and generated primary operation data.

Additionally, the sequential vehicle operation data further generally includes secondary operation data. The secondary operation data is generally data that is calculated from the primary operation data for the speed, the heading, and the power consumption of the vehicle 103. For example, acceleration (i.e., the rate of change of speed, or the first derivative of speed) and jerk (i.e., the rate of change of acceleration, or the first derivative of acceleration, or the second derivative of speed) are secondary operation data based on or calculated from the primary operation data for the speed of the vehicle 103. Additionally, "turn" (i.e., the rate of change of heading, or the first derivative of heading) and "whip" (i.e., the rate of change of turn, or the first derivative of turn, or the second derivative of heading) are terms used herein for secondary operation data based on or calculated from the primary operation data for the heading of the vehicle 103. Furthermore, "intensity" (i.e., the rate of change of power consumption, or the first derivative of power consumption) is a term used herein for secondary operation data based on or calculated from the primary operation data for the power consumption of the vehicle 103. A second derivative of power consumption, as well as third or higher derivatives of the primary operation data, could also be calculated.

For example, given the primary operation data for the speed S1 and S2 of the vehicle 103 during any two adjacent or consecutive time intervals (e.g., with interval time T), the acceleration A is calculated as: $A=(S2-S1)/T$. The point in time for the calculated acceleration may be considered as the halfway or middle point between the points in time (e.g., the timestamp) of the two time intervals for the speed data. Alternatively, the time interval for the calculated acceleration may be treated as being from the middle of the first of the two time intervals for the speed data to the middle of the second one. Furthermore, given the calculated secondary operation data for the acceleration A1 and A2 of the vehicle 103 during any two adjacent or consecutive time intervals (e.g., with interval time T), the jerk J is calculated as: $J=(A2-A1)/T$. The point in time for the calculated jerk may be considered as the halfway or middle point between the points in time of the two time intervals for the calculated acceleration data. Alternatively, the time interval for the calculated jerk may be treated as being from the middle of the first of the two time intervals for the calculated acceleration data to the middle of the second one. Similar calculations can be done for the first and second derivatives of the primary operation data for the heading and the power consumption of the vehicle 103. Also, although the examples used herein to describe the system and method for detecting when the vehicle 103 is engaged in automatic driving and/or non-automatic driving (and, thereby, generating the automatic driving information) were generated or developed using the types of primary and secondary operation data described herein, it is understood that the present invention is not necessarily so limited (except where specifically stated in the claims) but is also applicable to the use of additional or other types of vehicle operation data.

Figure 4:
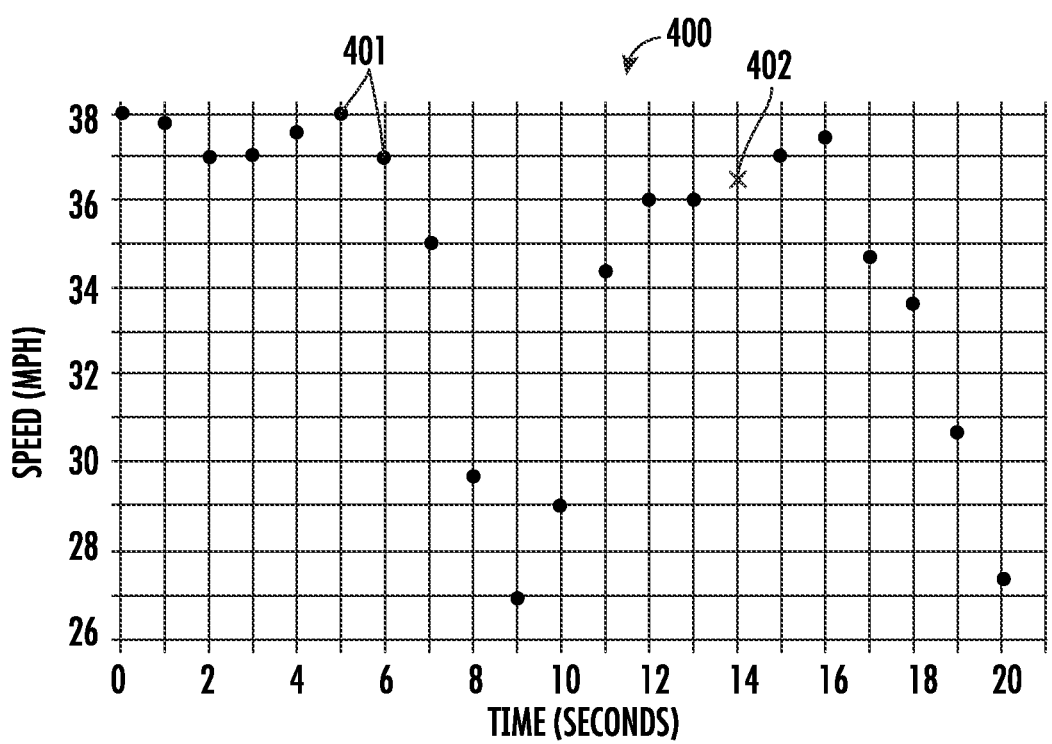
FIG. 4 is a graph of an example portion of vehicle operation data for use in accordance with some embodiments.

An example set of data for a portion of the primary operation data and of the secondary operation data for an example time period of 20 one-second time intervals is shown in FIGS. 4 and 5. This example data, as well as the example graphs and example flowcharts shown in FIGS. 6-16, were generated or developed using electric test vehicles made by Tesla, Inc.

The Tesla vehicles generally have automatic driving features known as the Tesla autopilot advanced safety and convenience features ("Tesla autopilot feature" or "autopilot feature" herein). These features are designed to assist the driver with some of the driving to steer, accelerate and brake the vehicle automatically. The Tesla autopilot feature also includes the ability to warn the driver of some potential collision conditions, as well as some other abilities. The Tesla autopilot feature is not considered to be a fully-automatic self-driving feature, since the driver is expected to remain aware of the operation of the vehicle at all times and to take over manual control of the vehicle in situations that are too difficult for autopilot to handle. Nevertheless, autopilot can generally handle all driving operations within specified ranges of operating parameters or driving conditions for ordinary highway driving on a road with well-marked lanes, as well as other limited-case driving situations. Thus, the Tesla autopilot feature is considered herein to be an example of an automatic driving feature, and driving with the Tesla autopilot feature engaged is considered herein to be an example of an automatic driving mode (also called an autopilot mode) at times when the driver is not exercising manual control. Additionally, driving in autopilot mode (i.e., autopilot engaged and in control of the vehicle) is generally considered to be safer than driving in manual mode (i.e., autopilot not engaged) under the appropriate driving conditions for the road, the time of day/night, the weather, or other considerations. Therefore, some of the features or capabilities of the vehicle risk minimization system 100 described above can use the automatic driving information related to the total time and/or individual time intervals or periods that the vehicle 103 was in autopilot mode (an automatic driving mode) and/or non-autopilot mode (a non-automatic driving mode) throughout the overall time of a given trip made by the vehicle 103.

Although the examples used herein to describe the system and method for detecting when the vehicle 103 is engaged in automatic driving and/or non-automatic driving (and, thereby, generating the automatic driving information) were generated or developed using the Tesla vehicles as the test vehicles, it is understood that the present invention is not necessarily so limited, except where specifically stated in the claims. Thus, the present invention is applicable to other automatic driving features and the electric, gas, fuel cell, and/or hybrid vehicles that incorporate such features.

FIG. 4 generally shows a graph 400 of a portion of an example sequential vehicle operation data generated during a test run of one of the test vehicles (e.g., 103) for use in accordance with some embodiments. The graph 400 shows the primary operation data for the speed (in mph—miles per hour) of the test vehicle plotted versus the time (for 1-second time intervals). (In some embodiments, speed may be indicated in kph—kilometers per hour. Thus, any reference to mph herein may also refer to kph, or the equivalent speed in kph, if appropriate.) Black dots 401 represent the speed data that was generated by and/or received via the test vehicle, and an "x" at 402 (for the time interval at 14 seconds) represents missing data that was filled in by interpolating between the next closest preceding data point (for the time interval at 13 seconds) and following data point (for the time interval at 15 seconds). Similar graphs can be produced for the other primary operation data mentioned above.

FIG. 5 generally shows a table 500 of a portion of an example sequential vehicle operation data generated from the data of the graph in FIG. 4 for use in accordance with some embodiments. The table 500 shows a dataset for the primary operation data for the speed that was generated by and/or received via the test vehicle for each of the one-second time intervals, as well as the interpolated data (surrounded by a dashed oval) for the time interval at 14 seconds. Additionally, the table 500 shows the secondary operation data for the acceleration and jerk in accordance with the calculations mentioned above. Similar tables or datasets can be produced for the other primary and secondary operation data mentioned above. These datasets of the sequential vehicle operation data are then used with the heuristic rules to determine the automatic driving information.

The heuristic rules generally use the various types of data of the sequential vehicle operation data in a variety of ways to trigger a variety of actions that have been developed experimentally by comparing actual direct or explicit automatic driving test data with results of the analysis according to the heuristic rules and then varying some or all of the heuristic rules until a high percentage accuracy is obtained from the analysis according to the heuristic rules. The direct or explicit automatic driving test data was obtained by installing a monitoring unit in the test vehicles attached to one or more of the onboard computers thereof. The direct or explicit automatic driving test data generated by the monitoring unit provided an explicit indication of whether the automatic driving feature (e.g., the autopilot feature) was engaged during the test runs.

The heuristic rules were generally developed by observing graphs of the various types of primary and secondary operation data in the sequential vehicle operation data in conjunction with the direct or explicit automatic driving test data in order to determine possible conditions under which automatic driving and/or non-automatic driving are likely to have occurred. In this manner, certain values for some of the primary and secondary operation data were determined either to be indications of automatic driving when they are within specified operational ranges (or conditions) delineated by the heuristic rules or to be indications of non-automatic driving when they are outside of the specified operational ranges (or conditions) delineated by the heuristic rules (or vice versa, depending on how the heuristic rules are defined). Thus, some of the heuristic rules are considered to be "additive" heuristic rules, because the results of processing these heuristic rules generally add time intervals (or interval segments or interval groups) of automatic driving to the automatic driving information (or subtracts time intervals of non-automatic driving from the automatic driving information). On the other hand, some of the heuristic rules are considered to be "subtractive" heuristic rules, because the results of processing these heuristic rules generally subtract time intervals (or interval segments or interval groups) of automatic driving from the automatic driving information (or add time intervals of non-automatic driving to the automatic driving information).

In general, subtracting or trimming non-automatic-driving time intervals from the automatic driving information is considered to be equivalent to converting automatic-driving time intervals into non-automatic-driving time intervals within the automatic driving information. Additionally, adding automatic-driving time intervals to the automatic driving information is considered to be equivalent to converting non-automatic-driving time intervals into automatic-driving time intervals within the automatic driving information.

In some embodiments, the automatic driving detection method starts with an assumption that the automatic driving feature was engaged during all of the time intervals, interval groups or interval segments for the entire trip, i.e., all of the time intervals of the trip are initially classified as automatic-driving time intervals within the automatic driving information. Therefore, subtractive heuristic rules are generally processed before the additive heuristic rules. However, there is also a general assumption of a level of confidence (or a level of likelihood of accuracy) for each heuristic rule relative to the other heuristic rules, so that some heuristic rules may have a higher likelihood of being a correct indication of either engagement or disengagement of the automatic driving feature than some other heuristic rules may have. Therefore, some subtractive heuristic rules may be considered to test for a very high likelihood of disengagement of the automatic driving feature, so these high-likelihood subtractive heuristic rules are generally processed after any additive heuristic rules that are considered to test for a likelihood of engagement that is lower than the likelihood of disengagement. In general, additive and subtractive heuristic rules considered to test for a higher likelihood of either engagement or disengagement of the automatic driving feature are processed after additive and subtractive heuristic rules considered to test for a lower likelihood of either engagement or disengagement, so that an error resulting from processing a lower-likelihood heuristic rule can potentially be corrected by a subsequent processing of a higher-likelihood heuristic rule.

Some of the heuristic rules involve the value of just one of the primary or secondary operation data considered alone. For example, for some of the types of data, the value thereof was determined to indicate either automatic driving or non-automatic driving (depending on the nature of the data) when the value exhibited a certain characteristic, such as the value being above or below a certain maximum or minimum limit or threshold, or the value being between upper and lower limits. As another example, for some of the types of data, the value thereof was determined to indicate either automatic driving or non-automatic driving (depending on the nature of the data) when the value exhibited more than one certain characteristic.

Additionally, some of the heuristic rules involve the values of more than one of the primary and/or secondary operation data. For example, for some of the types of data, when the value of one of the types of data exhibited a first characteristic and the value of another of the types of data exhibited a second characteristic, then the combination of the two characteristics was determined to be an indication of either automatic driving or non-automatic driving (depending on the nature of the data). In another example, for some of the types of data, when the value of one of the types of data exhibited a certain relationship relative to the value of another of the types of data, then this relationship between the values of the two types of data was determined to be an indication of either automatic driving or non-automatic driving (depending on the nature of the data).

Furthermore, some of the heuristic rules define interval segments or interval groups of one or more time interval for which the certain value(s) or the certain characteristic(s) must occur in order to trigger an action. For example, for some of the heuristic rules, it was sufficient for the value of the one or more of the primary and/or secondary operation data to have the certain value(s) or exhibit the certain characteristic(s) for an interval segment of only one time interval in order to indicate either automatic driving or non-automatic driving (depending on the nature of the data). On the other hand, for some of the heuristic rules, the one or more of the primary and/or secondary operation data had to have the certain value(s) or exhibit the certain characteristic(s) for an interval segment of multiple consecutive time intervals in order to indicate either automatic driving or non-automatic driving (depending on the nature of the data). Additionally, for some of the heuristic rules, the one or more of the primary and/or secondary operation data had to have the certain value(s) or exhibit the certain characteristic(s) a certain number of times within a certain time period or for an interval segment of a certain number of consecutive time intervals in order to indicate either automatic driving or non-automatic driving (depending on the nature of the data).

Additionally, some of the heuristic rules involve one or more characteristics of an interval segment, interval group, or time interval in relation to one or more characteristics of one or more other interval segments, interval groups, or time intervals. For example, some heuristic rules may trigger an action regarding an interval segment, interval group, or time interval that depends on a characteristic of that interval segment, interval group, or time interval in relation to one or more characteristics of immediately preceding and/or immediately following interval segments, interval groups, or time intervals.

Additionally, the actions that are triggered by the heuristic rules generally affect the interval segment, interval group, or time interval currently under analysis, because the heuristic rules generally provide an indication of automatic driving or non-automatic driving for that interval segment, interval group, or time interval. However, other actions that are triggered by the heuristic rules may also affect the interval segments, interval groups, or time intervals that immediately precede and/or immediately follow the interval segment, interval group, or time interval currently under analysis, because the heuristic rules may also generally provide an indication of either automatic driving or non-automatic driving for those interval segments, interval groups, or time intervals too.

Some of the heuristic rules are generally considered to define a strong or high likelihood or highest-probability of either automatic driving or non-automatic driving. Other heuristic rules are generally considered to define a weak or low likelihood of either automatic driving or non-automatic driving. Therefore, in some embodiments, the system and method for detecting when the vehicle 103 is engaged in automatic driving and/or non-automatic driving (and, thereby, generating the automatic driving information) generally processes the heuristic rules considered to define a weaker or lower likelihood of either automatic driving or non-automatic driving before processing the heuristic rules considered to define a stronger or higher likelihood thereof. In this manner, the results of processing the heuristic rules considered to define a stronger or higher likelihood of either automatic driving or non-automatic driving are less likely to be overruled or reversed by actions triggered by the heuristic rules considered to define a weaker or lower likelihood of either automatic driving or non-automatic driving. In some embodiments, therefore, the order in which the heuristic rules are processed can affect the percent accuracy of the resulting automatic driving information.

The graphs and flowcharts of FIGS. 6-15 illustrate some examples of the heuristic rules, how they are generated, and how they are used in the system and method for detecting when the vehicle 103 is engaged in automatic driving and/or non-automatic driving (and, thereby, generating the automatic driving information with the time intervals of the trip classified as either automatic-driving time intervals or non-automatic-driving time intervals). Since the example heuristic rules were developed using vehicles that have the Tesla autopilot feature, the example heuristic rules are readily applicable to such vehicles. However, the design of other automatic driving features for other types, makes or models of vehicles will likely encounter many of the same issues that affected the design of the Tesla autopilot feature. Therefore, the example heuristic rules, and the example system and process that implement them, are generally considered to be also applicable to such other vehicles.

Figure 6:
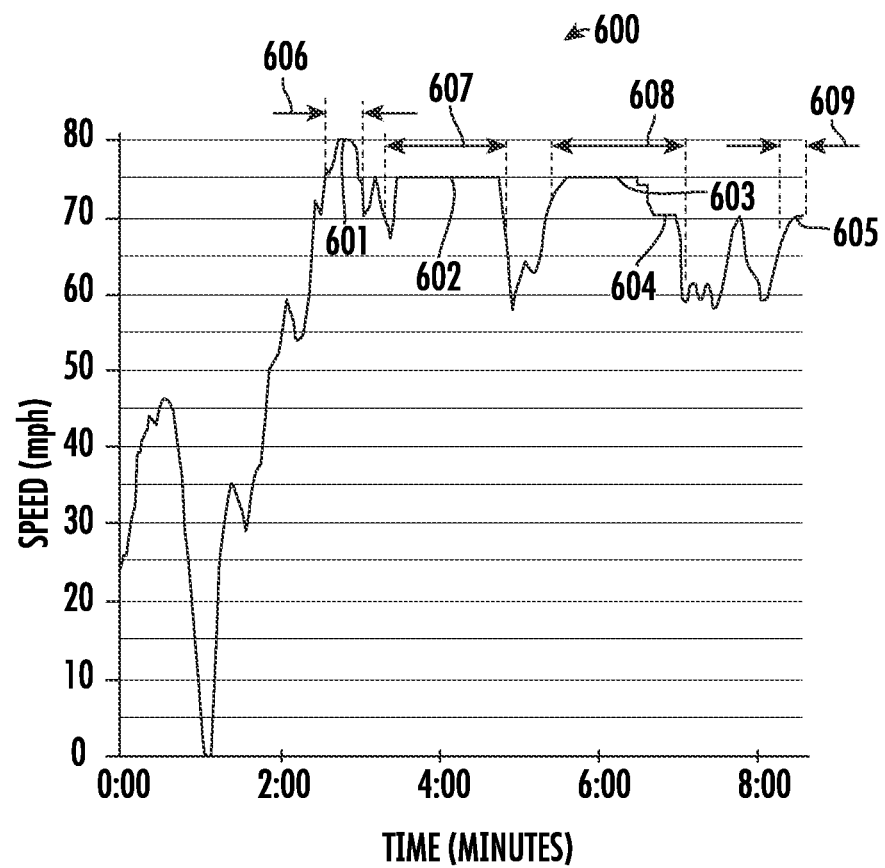
FIGS. 6-10 show graphs of example portions of vehicle operation data for use in accordance with some embodiments.

FIG. 6 shows a graph 600 of the primary operation data for the speed (in mph) of the test vehicle versus time for a set of time intervals for an approximately 8.5-minute portion of a trip made by the test vehicle. The speed was seen to change between 0 and 80 mph during this portion of the trip. Notably, there are some sections, referred to herein as speed plateaus 601-605, during which the vehicle maintained a constant speed for some amount of time. It has been determined that a speed plateau (not including at 0 mph) can be a good indicator that the vehicle is in an automatic driving mode, because humans do not typically maintain perfect control over speed. Instead, a human tends to change the pressure applied to the accelerator pedal or allow the speed to change on uphill or downhill slopes. Automatic driving features, however, tend to ensure that speed remains constant at a value selected by the driver or required by a posted speed limit, even on uphill or downhill slopes, unless traffic or road conditions require such change. Additionally, even when the traffic or road conditions require a change in speed, automatic driving features generally return the vehicle to the selected speed value at the earliest opportunity. Furthermore, even though conventional cruise control features are not considered herein to be an automatic driving feature, since the driver must maintain control of steering when cruise control is active, the test vehicles did not have a cruise control feature separate from the autopilot feature, so a speed plateau would not have indicated a conventional cruise control mode. Additionally, the autopilot feature of the test vehicles generally does not allow for a selected speed value that is relatively low, e.g., at about 40 mph or less. Instead, the autopilot feature is considered primarily useful at the higher speeds of normal highway driving and slows the vehicle down to the lower speeds only when required, e.g., for heavy traffic, traffic lights, slow speed zones, etc.

In some embodiments, therefore, one or more of the heuristic rules delineate a specified operational range for a speed plateau that is indicative of engagement or disengagement of the automatic driving feature, i.e., automatic driving mode or non-automatic driving mode, depending on how the heuristic rules are defined. For example, in some embodiments, a heuristic rule for a speed plateau (an "8-sec speed plateau heuristic rule") delineating a specified operational range that includes a duration having a minimum magnitude of longer than 8 seconds (e.g., 8 one-second time intervals), optionally including a combination with a second specified operational range of a speed value being greater than a minimum of about 42 mph, has been developed to indicate engagement of the automatic driving feature during the interval segment that includes these time intervals. Additionally, in some embodiments, this heuristic rule also indicates engagement of the automatic driving feature during the interval segments, interval groups, or time intervals (e.g., for an interval length of about 9 seconds) that immediately precede and/or immediately follow the interval segment with the speed plateau. In other words, a duration of a speed plateau that is within a specified operational range of more than 8 seconds, or is outside of a specified operational range of 0-8 seconds, is indicative of engagement of the automatic driving feature during the interval segment that includes these time intervals, as well as during the specified interval length for the immediately preceding and/or immediately following interval segments, interval groups, or time intervals. As another example, in some embodiments, a heuristic rule for a speed plateau (an "11-sec speed plateau heuristic rule") delineating a specified operational range that includes a duration having a magnitude of 11 seconds or more (e.g., 11 or more one-second time intervals), optionally including a combination with a second specified operational range of a speed value greater than a minimum of about 42 mph, has also been developed as a strong indicator (i.e., one of the highest-probability) of engagement of the automatic driving feature during the interval segment that includes these time intervals. In other words, a duration of a speed plateau that is within a specified operational range of more than 11 seconds, or is outside of a specified operational range of 0-11 seconds, is indicative of engagement of the automatic driving feature during the interval segment that includes these time intervals. Some embodiments may include additional or alternative heuristic rules for speed plateaus or use specific values that are different from the example values given above for the magnitude of the duration of the speed plateau (e.g., within a range of about 15-20 seconds), the minimum speed for the speed plateau (e.g., within a range of about 30-40 mph), and/or the interval length of the immediately preceding and/or immediately following interval segments, interval groups, or time intervals (e.g., within a range of about 3-5 seconds). If multiple speed plateau heuristic rules are used, then the points at which the heuristic rules are processed within the overall automatic driving detection method may depend (but not necessarily) on the relative likelihood of correctly indicating engagement or disengagement of the automatic driving feature for each heuristic rule.

Furthermore, a duration of a speed plateau that is lower than the example magnitude values given above is not necessarily an indication of disengagement of the automatic driving feature, since it is quite possible for driving conditions to lead the automatic driving feature to maintain a speed plateau for a short time. Therefore, the speed plateau heuristic rules generally indicate engagement, rather than disengagement, of the automatic driving feature. These heuristic rules are, thus, considered to be additive heuristic rules, since the results are intended to add time intervals of automatic driving to the automatic driving information (or to convert time intervals of non-automatic driving into time intervals of automatic driving). If any of these time intervals had previously been subtracted from the automatic driving information (or had previously been indicated as non-automatic-driving time intervals in the automatic driving information), then processing of the speed plateau heuristic rules would add these time intervals back into the automatic driving information (or would convert them to automatic-driving time intervals). (However, an alternative embodiment could subtract time intervals of non-automatic driving from the automatic driving information.)

In some embodiments, both the 8-sec speed plateau heuristic rule (a first- or low-likelihood speed plateau heuristic rule) and the 11-sec speed plateau heuristic rule (a second- or high-likelihood speed plateau heuristic rule) are used in the system and method for detecting when the vehicle 103 is engaged in automatic driving and/or non-automatic driving (and, thereby, generating the automatic driving information). However, since the 11-sec speed plateau heuristic rule is considered to be a strong indicator (high-likelihood) of engagement of the automatic driving feature and the 8-sec speed plateau heuristic rule is considered to be not as strong an indicator (low-likelihood), the 11-sec speed plateau heuristic rule is processed late, and the 8-sec speed plateau heuristic rule is processed early, in the overall automatic driving detection method. In this manner, although both of these speed plateau heuristic rules add many of the same time intervals (or interval segments or interval groups) of automatic driving to the automatic driving information, some of the results of the 8-sec speed plateau heuristic rule may be likely to be overruled or reversed by the subsequent processing of other heuristic rules that may define indicators of disengagement of the automatic driving feature. This overruling or reversal by the subsequent processing of other heuristic rules is considered appropriate, since the other heuristic rules may be stronger (or at least roughly equivalent) indicators of disengagement, than the 8-sec speed plateau heuristic rule is an indicator of engagement, of the automatic driving feature. On the other hand, the results of processing the 11-sec speed plateau heuristic rule (occurring at or near the end of the overall automatic driving detection method) are less likely to be overruled or reversed by subsequently processed heuristic rules and are more likely to overrule or reverse previously processed heuristic rules; which is considered appropriate, since the 11-sec speed plateau heuristic rule is considered to be a relatively stronger indicator than are most other heuristic rules of engagement of the automatic driving feature. Additionally, the processing of the 11-sec speed plateau heuristic rule may return some of the time intervals of automatic driving to the automatic driving information that had been added by the processing of the 8-sec speed plateau heuristic rule, but which were subtracted by subsequent processing of other heuristic rules before the processing of the 11-sec speed plateau heuristic rule.

For the example in FIG. 6, the first speed plateau 601 has a duration of about 9 seconds, the second speed plateau 602 has a duration of about 74 seconds, the third speed plateau 603 has a duration of about 54 seconds, the fourth speed plateau 604 has a duration of about 15 seconds, and the fifth speed plateau 605 has a duration of at least 9 seconds (but may have been more, since it may have been cut off). In some embodiments, since each of these speed plateaus 601-605 has a duration longer than 8 seconds, processing of the 8-sec speed plateau heuristic rule will add these interval segments to (or retain within, or convert non-automatic-driving time intervals to automatic-driving time intervals within) the automatic driving information. Additionally, in some embodiments, the immediately preceding and immediately following interval segments, interval groups, or time intervals (e.g., for a duration of about 9 seconds) are treated the same as the interval segments with the speed plateaus are treated, thereby affecting a larger portion of the overall time intervals for the trip as indicated by dimension lines 606-609. In some embodiments, the processing of the 8-sec speed plateau heuristic rule occurs relatively early in the overall automatic driving detection method, so it is possible that subsequent processing of other heuristic rules might subtract or remove some of the time intervals (within the dimension lines 606-609) affected by the 8-sec speed plateau heuristic rule. However, since the speed plateaus 602, 603 and 604 (and maybe 605) have durations longer than 11 seconds, later processing of the 11-sec speed plateau heuristic rule will add any time intervals of the speed plateaus 602, 603 and 604 (and maybe 605) back in to (or retain within, or convert non-automatic-driving time intervals to automatic-driving time intervals within) the automatic driving information that had been subtracted by the intervening processing of other heuristic rules after processing the 8-sec speed plateau heuristic rule. In this manner, the 8-sec speed plateau heuristic rule allows for a more liberal indication of automatic driving for some of the time intervals in the automatic driving information, which can potentially be corrected by intervening processing of other heuristic rules, before the 11-sec speed plateau heuristic rule results in a more certain indication of automatic driving for some of these time intervals.

Figure 7:
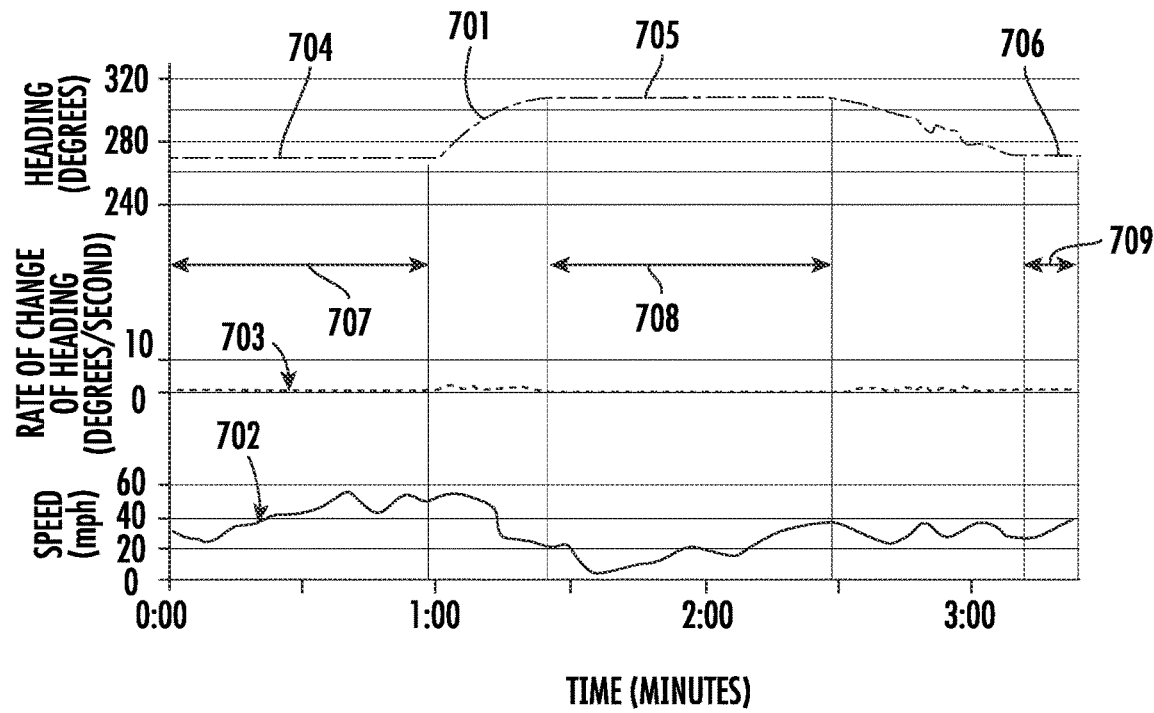
Figure 8:
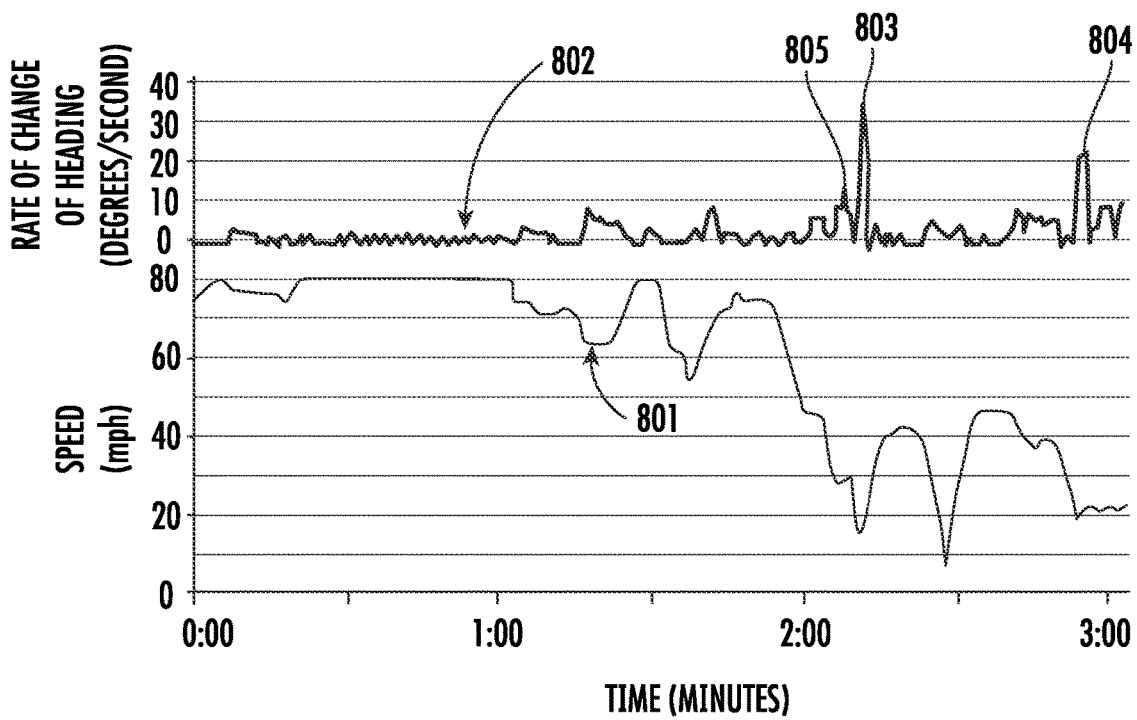

FIGS. 7 and 8 provide illustrations for example heuristic rules related to a heading or a rate of change of heading (i.e., a turn rate) of the vehicle. FIG. 7 shows graphs of the primary operation data for the heading (heading graph 701—with azimuth degree value 0-360°) and the speed (speed graph 702—in mph) and the secondary operation data for the rate of change of the heading (heading change graph 703—in degrees/second) for a test vehicle vs time for a set of time intervals for an approximately 3.5-minute portion of a trip made by the test vehicle. The speed graph 702 shows the speed varying between about 5 and 55 mph, the heading graph 701 shows the heading changing from about 269° to about 308° and then to about 270°, and the heading change graph 703 shows the rate of change of the heading varying between about 0-2 degrees/second during this portion of the trip for FIG. 7. FIG. 8, on the other hand, shows graphs of the primary operation data for the speed (speed graph 801) and the secondary operation data for the rate of change of the heading (heading change graph 802) for a test vehicle vs the time for a set of time intervals for an approximately 3-minute portion of a trip made by the test vehicle. The speed graph 801 shows the speed varying between about 8 and 80 mph and the heading change graph 802 shows the rate of change of the heading varying between about 0-35 degrees/second during this portion of the trip for FIG. 8.

Notably, there are some sections in FIG. 7, referred to herein as heading plateaus 704-706, during which the vehicle maintained a constant heading for some amount of time. It has been determined that a heading plateau can be a good indicator that the vehicle is in an automatic driving mode, because humans do not typically maintain perfect control over heading. A human tends to change the location of the vehicle side-to-side within a lane, so the heading may change slightly, even on a straight road segment. On the other hand, an automatic driving feature generally uses frequent sensor feedback to keep the vehicle at about the same relative location within the lane with less deviation than is typical for a human.

In some embodiments, therefore, one or more of the heuristic rules delineate a specified operational range for a heading plateau that is indicative of engagement or disengagement of the automatic driving feature, i.e., automatic driving mode or non-automatic driving mode, depending on how the heuristic rules are defined. For example, a heuristic rule for a heading plateau (a "17-sec heading plateau heuristic rule") delineating a specified operational range that includes a duration having a minimum magnitude of longer than 17 seconds (e.g., 17 one-second time intervals) has been developed to indicate engagement of the automatic driving feature during the interval segment that includes these time intervals. Additionally, in some embodiments, this heuristic rule also indicates engagement of the automatic driving feature during the interval segments, interval groups, or time intervals (e.g., for an interval length of about 2 seconds) that immediately precede and/or immediately follow the interval segment with the heading plateau. In other words, a duration of a heading plateau that is within a specified operational range of more than 17 seconds, or is outside of a specified operational range of 0-17 seconds, is indicative of engagement of the automatic driving feature during the interval segment that includes these time intervals, as well as during the specified interval length for the immediately preceding and/or immediately following interval segments, interval groups, or time intervals. Some embodiments may include additional or alternative heuristic rules for heading plateaus or use specific values that are different from the example values given above for the magnitude of the duration of the heading plateau (e.g., within a range of about 17 or more seconds) and/or the interval length of the immediately preceding and/or immediately following interval segments, interval groups, or time intervals (e.g., within a range of about 0-2 seconds). If multiple heading plateau heuristic rules are used, then the points at which the heuristic rules are processed within the overall automatic driving detection method may depend (but not necessarily) on the relative likelihood of correctly indicating engagement or disengagement of the automatic driving feature for each heuristic rule.

Furthermore, a duration of a heading plateau that is lower than the example magnitude value given above is not necessarily an indication of disengagement of the automatic driving feature, since it is quite possible for driving conditions to lead the automatic driving feature to maintain a heading plateau for a short time. Therefore, the heading plateau heuristic rule generally indicates engagement, rather than disengagement, of the automatic driving feature. This heuristic rule is, thus, considered to be an additive heuristic rule, since the results are intended to add time intervals of automatic driving to the automatic driving information (or to convert time intervals of non-automatic driving into time intervals of automatic driving). If any of these time intervals had previously been subtracted from the automatic driving information (or had previously been indicated as non-automatic-driving time intervals in the automatic driving information), then processing of the heading plateau heuristic rule would add these time intervals back into the automatic driving information (or would convert them to automatic-driving time intervals). (However, an alternative embodiment could subtract time intervals of non-automatic driving from the automatic driving information.)

For the example in FIG. 7, the first heading plateau 704 has a duration of at least 56 seconds (but may have been more, since it may have been cut off), the second heading plateau 705 has a duration of about 60 seconds, and the third heading plateau 706 has a duration of at least 9 seconds (but may have been more, since it may have been cut off). In some embodiments, since the first and second heading plateaus 704 and 705 (and maybe the third heading plateau 706) have durations longer than 17 seconds, processing of the 17-sec heading plateau heuristic rule will add these interval segments to (or retain within, or convert non-automatic-driving time intervals to automatic-driving time intervals within) the automatic driving information. Additionally, in some embodiments, the immediately preceding and immediately following interval segments, interval groups, or time intervals (e.g., for a duration of about 2 seconds) are treated the same as the interval segments with the heading plateaus are treated, thereby affecting a larger portion of the overall time intervals for the trip as indicated by dimension lines 707-709.

In FIG. 8, there are some points in the heading change graph 802 at which the rate of change of the heading was relatively large, referred to herein as heading change spikes 803, 804 and 805. On the other hand, there are no such heading change spikes shown in the heading change graph 703 in FIG. 7. It has been determined that large heading change spikes can be a good indicator that the vehicle is not in an automatic driving mode (i.e., in a non-automatic driving mode), because some automatic driving features are typically programmed to make turns relatively smoothly or gradually, except in the relatively rare event that the automatic driving feature has to avoid an obstacle or hazard that appeared or occurred too suddenly for the driver to take control of the vehicle in time to avoid the obstacle or hazard. Therefore, a large heading change spike is more likely to indicate non-automatic driving, and a greater heading change spike generally indicates a greater likelihood of non-automatic driving. Additionally, some automatic driving features cannot make a turn that is greater than a certain number of degrees, such as a 90° turn or a 180° U-turn. These automatic driving features are typically considered to be primarily useful for highway driving involving relatively gradual heading changes for curves of the roadway, lane changes, highway exits/entrances, and the like. These automatic driving features, thus, instruct the driver to take over control when large turns are required, such as for driving through a residential neighborhood with many intersecting streets laid out in a grid pattern, among other situations.

In some embodiments, therefore, one or more of the heuristic rules delineate a specified operational range for heading change spikes that are indicative of engagement or disengagement of the automatic driving feature, i.e., automatic driving mode or non-automatic driving mode, depending on how the heuristic rules are defined. For example, in some embodiments, a heuristic rule for a heading change spike (a "first heading change spike heuristic rule") delineating a specified operational range that includes a rate of change of the heading having a magnitude of more than 30 degrees/second (e.g., a heading change of more than 30° in a one-second time interval) has been developed to indicate disengagement of the automatic driving feature during the interval segment that includes these time intervals. Additionally, in some embodiments, the first heading change spike heuristic rule also indicates disengagement of the automatic driving feature during the interval segments, interval groups, or time intervals (e.g., for an interval length of about 15-110 seconds) that immediately precede and/or immediately follow the interval segment with the heading change spike. In other words, a rate of change of heading that is outside of a specified operational range of 0-30 degrees/second, or is within a specified operational range of more than 30 degrees/second, is indicative of disengagement of the automatic driving feature during the interval segment that includes these time intervals, as well as during the specified interval length for the immediately preceding and/or immediately following interval segments, interval groups, or time intervals. In another example, in some embodiments, a heuristic rule for a heading change spike (a "second heading change spike heuristic rule") delineating a specified operational range that includes a rate of change of the heading having a magnitude of more than 20 degrees/second (e.g., a heading change of more than 20° in a one-second time interval) has been developed to indicate disengagement of the automatic driving feature during the interval segment that includes these time intervals. Additionally, in some embodiments, the second heading change spike heuristic rule also indicates disengagement of the automatic driving feature during the interval segments, interval groups, or time intervals (e.g., for an interval length of about 8-25 seconds) that immediately precede and/or immediately follow the interval segment with the heading change spike. In other words, a rate of change of heading that is outside of a specified operational range of 0-20 degrees/second, or is within a specified operational range of more than 20 degrees/second, is indicative of disengagement of the automatic driving feature during the interval segment that includes these time intervals, as well as during the specified interval length for the immediately preceding and/or immediately following interval segments, interval groups, or time intervals. In another example, in some embodiments, a heuristic rule for a heading change spike (a "third heading change spike heuristic rule") delineating a specified operational range that includes a rate of change of the heading having a magnitude of more than 11 degrees/second (e.g., a heading change of more than 11° in a one-second time interval) has been developed to indicate disengagement of the automatic driving feature during the interval segment that includes these time intervals. Additionally, in some embodiments, the third heading change spike heuristic rule also indicates disengagement of the automatic driving feature during the interval segments, interval groups, or time intervals (e.g., for an interval length of about 7-8 seconds) that immediately precede and/or immediately follow the interval segment with the heading change spike. In other words, a rate of change of heading that is outside of a specified operational range of 0-11 degrees/second, or is within a specified operational range of more than 11 degrees/second, is indicative of disengagement of the automatic driving feature during the interval segment that includes these time intervals, as well as during the specified interval length for the immediately preceding and/or immediately following interval segments, interval groups, or time intervals. (The designation of the above heading change spike heuristic rules as "first," "second" and "third" does not necessarily indicate the order in which these heuristic rules are processed in the overall automatic driving detection method.) Some embodiments may include additional or alternative heuristic rules for heading change spikes or use specific values that are different from the example values given above for the magnitudes of the rate of change of the heading (e.g., within a range of about 20 or more degrees/second) and/or the interval lengths of the immediately preceding and/or immediately following interval segments, interval groups, or time intervals (e.g., within a range of about 8-25 seconds). If multiple heading change spike heuristic rules are used, then the points at which the heuristic rules are processed within the overall automatic driving detection method may depend (but not necessarily) on the relative likelihood of correctly indicating engagement or disengagement of the automatic driving feature for each heuristic rule.

Furthermore, a rate of change of the heading that is lower than any of the example magnitude values given above is not necessarily an indication of engagement of the automatic driving feature, since a human does not always make sharp turns. Therefore, the heading change spike heuristic rules generally indicate disengagement, rather than engagement, of the automatic driving feature. These heuristic rules are, thus, considered to be subtractive heuristic rules, since the results are intended to subtract time intervals of automatic driving from the automatic driving information (or to convert time intervals of automatic driving into time intervals of non-automatic driving). If any of these time intervals had previously been added to the automatic driving information (or had previously been indicated as automatic-driving time intervals in the automatic driving information), then processing of the heading change spike heuristic rules would subtract these time intervals back out of the automatic driving information (or would convert them to non-automatic-driving time intervals). (However, an alternative embodiment could add time intervals of non-automatic driving to the automatic driving information.)

For the example in FIG. 7, even during the heading changes between the heading plateaus 704/705 and 705/706, the rate of change of the heading (as shown by the heading change graph 703) was no more than about 2 degrees/second, which is a relatively gradual heading change that does not indicate disengagement (or may indicate engagement) of the automatic driving feature. On the other hand, for the example in FIG. 8, the first heading change spike 803 has a magnitude of about 34 degrees/second, the second heading change spike 804 has a magnitude of about 23 degrees/second, and the third heading change spike 805 has a magnitude of about 13 degrees/second. In some embodiments, since all of the heading change spikes 803, 804 and 805 have a magnitude greater than 11 degrees/second, processing of the third heading change spike heuristic rule will subtract these interval segments from (or convert automatic-driving time intervals to non-automatic-driving time intervals within, or retain as non-automatic-driving time intervals within) the automatic driving information. Additionally, in some embodiments, the immediately preceding and immediately following interval segments, interval groups, or time intervals (e.g., for a duration of about 7-8 seconds before and/or after the points at which the heading change graph 802 crosses 11 degrees/second) are treated the same as the interval segments with the heading change spikes are treated, thereby affecting a larger portion of the overall time intervals for the trip. In addition, in some embodiments, since the heading change spikes 803 and 804 have a magnitude greater than 20 degrees/second, processing of the second heading change spike heuristic rule will subtract these interval segments from (or convert automatic-driving time intervals to non-automatic-driving time intervals within, or retain as non-automatic-driving time intervals within) the automatic driving information. Additionally, in some embodiments, the immediately preceding and immediately following interval segments, interval groups, or time intervals (e.g., for a duration of about 8-25 seconds before and/or after the points at which the heading change graph 802 crosses 20 degrees/second) are treated the same as the interval segments with the heading change spikes are treated, thereby affecting a larger portion of the overall time intervals for the trip. Furthermore, in some embodiments, since the heading change spike 803 has a magnitude greater than 30 degrees/second, processing of the first heading change spike heuristic rule will subtract these interval segments from (or convert automatic-driving time intervals to non-automatic-driving time intervals within, or retain as non-automatic-driving time intervals within) the automatic driving information. Additionally, in some embodiments, the immediately preceding and immediately following interval segments, interval groups, or time intervals (e.g., for a duration of about 15-110 seconds before and/or after the points at which the heading change graph 802 crosses 30 degrees/second) are treated the same as the interval segments with the heading change spikes are treated, thereby affecting a larger portion of the overall time intervals for the trip.

Figure 9:
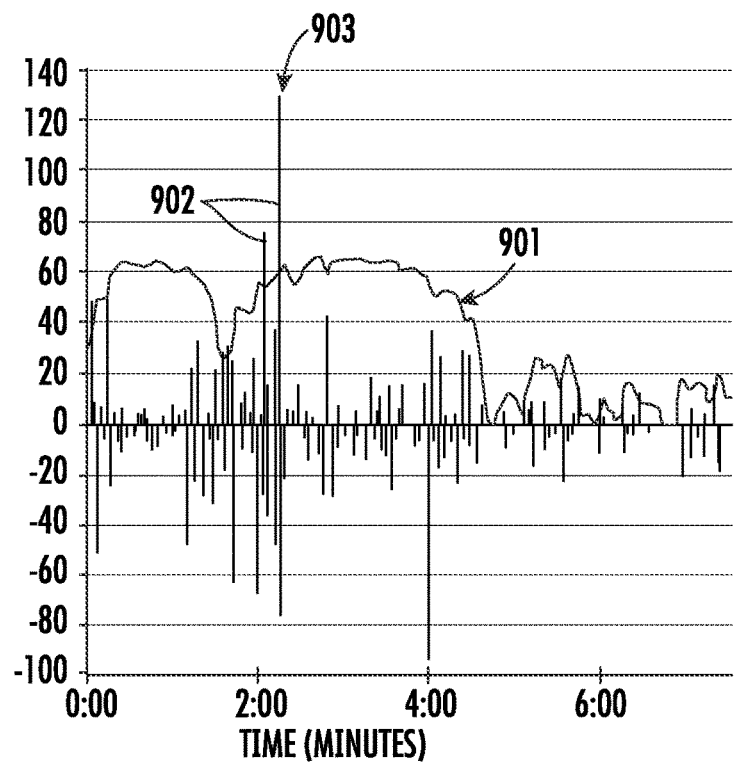

FIG. 9 provides an illustration for example heuristic rules related to the values of multiple types of vehicle operation data relative to each other within the same time interval, interval group or interval segment. This example uses the vehicle operation data for the speed and the intensity (i.e., the rate of change of power consumption, or the first derivative of power consumption) of the vehicle within the same time interval to determine an intensity-to-speed ratio.

FIG. 9 shows graphs of the primary operation data for the speed (speed graph 901—in mph) and the secondary operation data for the intensity (intensity bar graph 902—in Wh/mile/sec (watt hours per mile per second)) for a test vehicle vs time for a set of time intervals for an approximately 7.5-minute portion of a trip made by the test vehicle. Each bar of the intensity bar graph 902 generally represents the calculated intensity (i.e., an intensity spike) for approximately one time interval. The speed graph 901 shows the speed varying between about 0 and 65 mph, and the intensity bar graph 902 shows the intensity varying between about −92 and 125 Wh/mile/sec during this portion of the trip for FIG. 9. The positive values for the intensity bar graph 902 generally represent time intervals when power is being applied from the vehicle's battery to the motors, and the negative values for the intensity bar graph 902 generally represent time intervals when power is being regenerated from the braking system to the battery.

Notably, there is a time interval (at 903) in FIG. 9 during which the value of the intensity (in Wh/mile/sec) was considerably greater than the value of the speed (in mph), thereby resulting in a relatively large intensity-to-speed ratio. It has been determined that a relatively large intensity-to-speed ratio can be a reasonably good indicator of whether the vehicle is in an automatic driving mode, because automatic driving features tend to ensure that the vehicle operates relatively smoothly, i.e., with relatively gradual changes in operation or a tendency to seek a power level of zero. A human, on the other hand, is much more likely to cause sudden or abrupt changes in vehicle operation. A relatively large intensity-to-speed ratio generally represents a relatively sudden or abrupt change in vehicle operation and, thus, a non-automatic driving mode.

In some embodiments, therefore, one or more of the heuristic rules delineate a specified operational range for an intensity-to-speed ratio that is indicative of engagement or disengagement of the automatic driving feature, i.e., automatic driving mode or non-automatic driving mode, depending on how the heuristic rules are defined. (In some embodiments, only positive intensity values are used, since these types of heuristic rules may apply only to acceleration. However, other embodiments may be developed for braking and may use negative intensity values.) For example, in some embodiments, a heuristic rule for an intensity-to-speed ratio (an "intensity-to-speed ratio heuristic rule") delineating a specified operational range that includes an intensity-to-speed ratio having a magnitude of more than about 1.8-2 (e.g., a ratio of the intensity in Wh/mile/sec to the speed in mph) has been developed to indicate disengagement of the automatic driving feature during the interval segment that includes these time intervals. Additionally, in some embodiments, the intensity-to-speed ratio heuristic rule also indicates disengagement of the automatic driving feature during the interval segments, interval groups, or time intervals (e.g., for an interval length of about 7-30 seconds) that immediately precede and/or immediately follow the interval segment with the large intensity-to-speed ratio. In other words, an intensity-to-speed ratio that is outside of a specified operational range of 0 to about 1.8-2, or is within a specified operational range of more than 1.8-2, is indicative of disengagement of the automatic driving feature during the interval segment that includes these time intervals, as well as during the specified interval length for the immediately preceding and/or immediately following interval segments, interval groups, or time intervals. Additionally, some embodiments may include additional or alternative heuristic rules for the intensity-to-speed ratio or use specific values that are different from the example values given above for the magnitudes of the intensity-to-speed ratio (e.g., within a range of about 1.8 or greater) and/or the interval lengths of the immediately preceding and/or immediately following interval segments, interval groups, or time intervals (e.g., within a range of about 10-30 seconds). If multiple intensity-to-speed ratio heuristic rules are used, then the points at which the heuristic rules are processed within the overall automatic driving detection method may depend (but not necessarily) on the relative likelihood of correctly indicating engagement or disengagement of the automatic driving feature for each heuristic rule.

Furthermore, an intensity-to-speed ratio that is lower than any of the example magnitude values given above is not necessarily an indication of engagement of the automatic driving feature, since a human does not always cause sudden or abrupt changes in vehicle operation. Therefore, intensity-to-speed ratio heuristic rules generally indicate disengagement, rather than engagement, of the automatic driving feature. These heuristic rules are, thus, considered to be subtractive heuristic rules, since the results are intended to subtract time intervals of automatic driving from the automatic driving information (or to convert time intervals of automatic driving into time intervals of non-automatic driving). If any of these time intervals had previously been added to the automatic driving information (or had previously been indicated as automatic-driving time intervals in the automatic driving information), then processing of intensity-to-speed ratio heuristic rules would subtract these time intervals back out of the automatic driving information (or would convert them to non-automatic-driving time intervals). (However, an alternative embodiment could add time intervals of non-automatic driving to the automatic driving information.)

For the example in FIG. 9, the intensity was about 125 Wh/mile/sec and the speed was about 59 mph for the time interval at 903. These values give an intensity-to-speed ratio of about 2.1. In some embodiments, therefore, processing of the intensity-to-speed ratio heuristic rule will subtract this time interval or interval segment at 903 from (or convert automatic-driving time intervals to non-automatic-driving time intervals within, or retain as non-automatic-driving time intervals within) the automatic driving information. Additionally, in some embodiments, the immediately preceding and immediately following interval segments, interval groups, or time intervals (e.g., for a duration of about 7-30 seconds before and/or after the time interval at 903 having the large intensity-to-speed ratio are treated the same as this time interval is treated, thereby affecting a larger portion of the overall time intervals for the trip.

Figure 10:
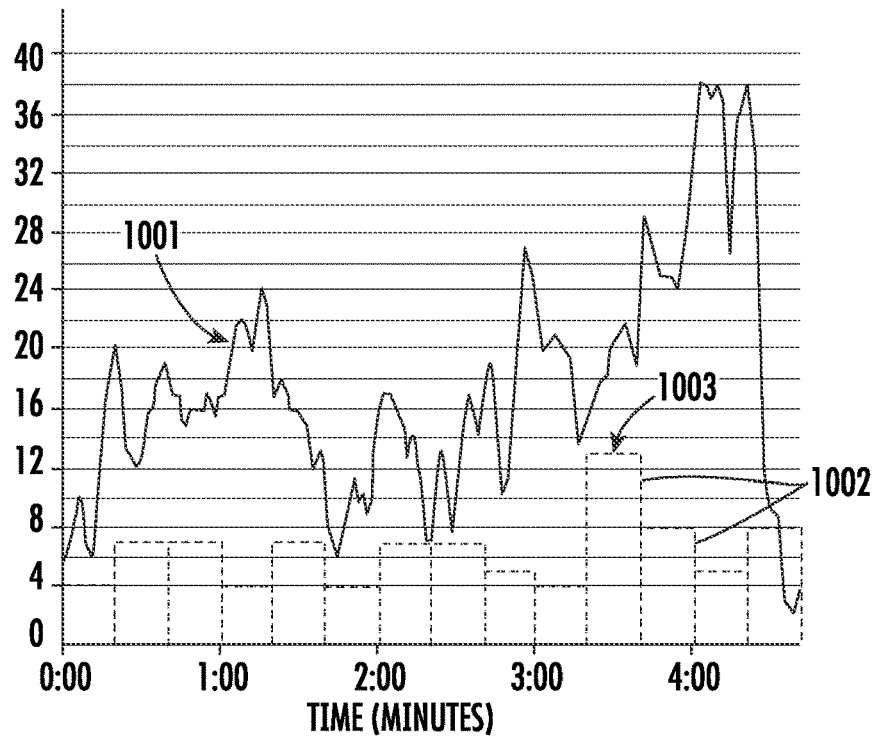

FIG. 10 provides an illustration for example heuristic rules related to the values of one or more of the primary and/or secondary operation data having a certain value or exhibiting a certain characteristic for an interval segment of multiple consecutive time intervals. This example uses the vehicle operation data for the intensity (i.e., the rate of change of power consumption, or the first derivative of power consumption) of the vehicle within an interval segment of multiple consecutive time intervals.

FIG. 10 shows graphs of the primary operation data for the speed (speed graph 1001—in mph) and the secondary operation data for the number of intensity spikes (i.e., the counted number of time intervals in which power consumption changed) within interval segments or groups that have a specified duration (intensity spike count bar graph 1002) for a test vehicle vs the time for a set of time intervals for an approximately 4.67-minute portion of a trip made by the test vehicle. Thus, each bar of the intensity spike count bar graph 1002 generally represents the counted number of time intervals for which an intensity spike occurred during each interval segment. The speed graph 1001 shows the speed varying between about 2 and 38 mph, and the intensity spike count bar graph 1002 shows the counted number of intensity spikes per interval segment varying between about 4 and 13, during this portion of the trip for FIG. 10.

In the illustrated embodiment, each interval segment (for which the intensity spikes are counted) starts at the end of the preceding interval segment, so that the interval segments do not overlap, and each intensity spike is counted in only one interval segment. However, in some alternative embodiments, each interval segment (for which the intensity spikes are counted) starts before the end of a preceding interval segment, so that each interval segment overlaps one or more (preceding or following) other interval segments, and each intensity spike is counted in more than one interval segment.

Notably, there is an interval segment or group (at 1003) in FIG. 10 during which counted number of intensity spikes was relatively large. It has been determined that a relatively large number of intensity spikes within an interval segment of a certain length can be a reasonably good indicator of whether the vehicle is in an automatic driving mode, because automatic driving features tend to ensure that the vehicle operates relatively smoothly, i.e., with relatively few changes in the level of power consumption or a tendency to seek a power level near zero. A human, on the other hand, is much more likely to cause sudden or abrupt changes in vehicle operation due to changing the pressure on the accelerator pedal and/or the brake pedal. A relatively large number of intensity spikes within an interval segment of a certain length generally represents a relatively sudden or abrupt change in vehicle operation and, thus, a non-automatic driving mode.

In some embodiments, therefore, one or more of the heuristic rules delineate a specified operational range for number of intensity spikes (within an interval segment of a certain length) that is indicative of engagement or disengagement of the automatic driving feature, i.e., automatic driving mode or non-automatic driving mode, depending on how the heuristic rules are defined. For example, in some embodiments, a heuristic rule for an intensity spike count (an "intensity spike count heuristic rule") delineating a specified operational range that includes number of intensity spikes having a magnitude of more than about 11 within an interval segment with a duration of about 20 seconds has been developed to indicate disengagement of the automatic driving feature during the interval segment that includes these time intervals. Additionally, in some embodiments, the intensity spike count heuristic rule also indicates disengagement of the automatic driving feature during the interval segments, interval groups, or time intervals (e.g., for an interval length of about 20-32 seconds) that immediately precede the beginning of the 20-second interval segment and/or immediately follow the ending of the 20-second interval segment with the large intensity spike count. In other words, an intensity spike count that is outside of a specified operational range of 0 to about 11, or is within a specified operational range of more than 11, is indicative of disengagement of the automatic driving feature during the interval segment that includes the high count, as well as during the specified interval length for the immediately preceding and/or immediately following interval segments, interval groups, or time intervals. Additionally, some embodiments may include additional or alternative heuristic rules for the intensity spike count or use specific values that are different from the example values given above for the magnitudes of the intensity spike count (e.g., within a range of about 12 or more), the duration of the interval segment for each intensity spike count (e.g., within a range of about 20 or fewer seconds), and/or the interval lengths of the immediately preceding and/or immediately following interval segments, interval groups, or time intervals (e.g., within a range of about 32 or fewer seconds). If multiple intensity spike count heuristic rules are used, then the points at which the heuristic rules are processed within the overall automatic driving detection method may depend (but not necessarily) on the relative likelihood of correctly indicating engagement or disengagement of the automatic driving feature for each heuristic rule.

Furthermore, an intensity spike count that is lower than any of the example magnitude values given above is not necessarily an indication of engagement of the automatic driving feature, since a human does not always cause sudden or abrupt changes in vehicle operation. Therefore, intensity spike count heuristic rules generally indicate disengagement, rather than engagement, of the automatic driving feature. These heuristic rules are, thus, considered to be subtractive heuristic rules, since the results are intended to subtract time intervals of automatic driving from the automatic driving information (or to convert time intervals of automatic driving into time intervals of non-automatic driving). If any of these time intervals had previously been added to the automatic driving information (or had previously been indicated as automatic-driving time intervals in the automatic driving information), then processing of intensity spike count heuristic rules would subtract these time intervals back out of the automatic driving information (or would convert them to non-automatic-driving time intervals). However, an alternative embodiment could add time intervals of non-automatic driving to the automatic driving information.

For the example in FIG. 10, the intensity spike count was about 13 for the 20-second interval segment at 1003. In some embodiments, therefore, processing of the intensity spike count heuristic rule will subtract the time intervals of the interval segment at 1003 from (or convert automatic-driving time intervals to non-automatic-driving time intervals within, or retain as non-automatic-driving time intervals within) the automatic driving information. Additionally, in some embodiments, the immediately preceding and immediately following interval segments, interval groups, or time intervals (e.g., for a duration of about 20-32 seconds before and/or after the interval segment at 1003 having the large intensity spike count are treated the same as this time interval is treated, thereby affecting a larger portion of the overall time intervals for the trip.

In addition to the heuristic rules described above with respect to FIGS. 6-10, other heuristic rules have also been developed.

For example, it has been determined that a vehicle driver will typically exercise manual control over the vehicle during a first (or initial or beginning) portion of most trips. Therefore, a first-trip-portion heuristic rule has been developed that defines the first portion (e.g., for an interval segment or group with about 1-2 minutes of time intervals) of any trip as being in non-automatic driving mode. The first-trip-portion heuristic rule is considered to be another example of a subtractive heuristic rule. Processing of the first-trip-portion heuristic rule, thus, subtracts the time intervals of the first portion of a trip from (or converts automatic-driving time intervals to non-automatic-driving time intervals within, or retains as non-automatic-driving time intervals within) the automatic driving information. The first-trip-portion heuristic rule generally accounts for the fact that most trips do not occur in such a way that the vehicle proceeds to ordinary highway driving soon after starting the trip. Instead, the driver typically has to manually maneuver the vehicle through a garage, a driveway, a parking lot, and/or a residential or business neighborhood before reaching a highway (where automatic driving features are usually most useful and appropriate).

Additionally, in another example, it has been determined that a vehicle driver will typically exercise manual control over the vehicle during a last, final or end portion of most trips. Therefore, a last-trip-portion heuristic rule has been developed that defines the last portion (e.g., for an interval segment or group with about 1-3 minutes of time intervals) of any trip as being in non-automatic driving mode. The last-trip-portion heuristic rule is considered to be another example of a subtractive heuristic rule. Processing of the last-trip-portion heuristic rule, thus, subtracts the time intervals of the last portion of a trip from (or converts automatic-driving time intervals to non-automatic-driving time intervals within, or retains as non-automatic-driving time intervals within) the automatic driving information. The last-trip-portion heuristic rule generally accounts for the fact that most trips do not occur in such a way that the vehicle proceeds to the end of the trip soon after leaving ordinary highway driving. Instead, the driver typically has to manually maneuver the vehicle through a residential or business neighborhood, a parking lot, a driveway, and/or a garage after leaving a highway (where automatic driving features are usually most useful and appropriate) and before the trip finally ends.

In another example, it has been determined that automatic driving features typically do not accelerate a vehicle very quickly or excessively, except in relatively rare events, but even then the automatic driving feature may be likely to instruct the driver to assume control of the vehicle for such events. A human, on the other hand, is more likely to accelerate rapidly, sometimes just for fun, but also when traffic conditions require it. Therefore, one or more maximum-acceleration heuristic rules have been developed that delineate a specified operational range for the acceleration of the vehicle (during any time interval) that is indicative of engagement or disengagement of the automatic driving feature, i.e., automatic driving mode or non-automatic driving mode, depending on how the heuristic rules are defined. For example, a specified operational range that includes a value for the acceleration having a magnitude of more than about 9 mph per second indicates disengagement of the automatic driving feature during the time interval. Additionally, in some embodiments, the maximum-acceleration heuristic rule also indicates disengagement of the automatic driving feature during the interval segments, interval groups, or time intervals (e.g., for an interval length of about 3-15 seconds) that immediately precede and/or immediately follow the time interval with the excessive acceleration. In other words, an acceleration value that is outside of a specified operational range of 0 to about 9 mph per second, or is within a specified operational range of more than about 9 mph per second, is indicative of disengagement of the automatic driving feature during the time interval that includes the high acceleration, as well as during the specified interval length for the immediately preceding and/or immediately following interval segments, interval groups, or time intervals.

In another example, it has been determined that automatic driving features typically do not jerk (change acceleration of) a vehicle very quickly or excessively, except in relatively rare events, but even then the automatic driving feature may be likely to instruct the driver to assume control of the vehicle for such events. A human, on the other hand, is more likely to jerk the vehicle rapidly, e.g., when traffic conditions require it. Therefore, one or more maximum-jerk heuristic rules have been developed that delineate a specified operational range for the jerk of the vehicle (during any time interval) that is indicative of engagement or disengagement of the automatic driving feature, i.e., automatic driving mode or non-automatic driving mode, depending on how the heuristic rules are defined. For example, a specified operational range that includes a value for the jerk having a magnitude of more than about 9 mph per second per second indicates disengagement of the automatic driving feature during the time interval. Additionally, in some embodiments, the maximum-jerk heuristic rule also indicates disengagement of the automatic driving feature during the interval segments, interval groups, or time intervals (e.g., for an interval length of about 3-15 seconds) that immediately precede and/or immediately follow the time interval with the excessive jerk. In other words, a jerk value that is outside of a specified operational range of 0 to about 9 mph per second per second, or is within a specified operational range of more than about 9 mph per second per second, is indicative of disengagement of the automatic driving feature during the time interval that includes the high jerk, as well as during the specified interval length for the immediately preceding and/or immediately following interval segments, interval groups, or time intervals.

In another example, it has been determined that some automatic driving features typically do not permit an excessive speed, e.g., a speed of the vehicle over a maximum allowable limit, such as a posted speed limit or a maximum advisable speed (e.g., calculated based on road conditions, weather, time of day/night, and/or a posted speed limit), except in relatively rare events, but even then the automatic driving feature may be likely to instruct the driver to assume control of the vehicle for such events. A human, on the other hand, is more likely to exceed a posted or advisable speed limit. Therefore, one or more maximum-speed heuristic rules have been developed that delineate a specified operational range for the maximum speed of the vehicle (during any time interval) that is indicative of engagement or disengagement of the automatic driving feature, i.e., automatic driving mode or non-automatic driving mode, depending on how the heuristic rules are defined. For example, a specified operational range that includes a value for the maximum speed having a magnitude of more than about 85 mph, or more than about 10 mph over a maximum allowable limit indicates disengagement of the automatic driving feature during the time interval. Additionally, in some embodiments, the maximum-speed heuristic rule also indicates disengagement of the automatic driving feature during the interval segments, interval groups, or time intervals (e.g., for an interval length of about 3-15 seconds) that immediately precede and/or immediately follow the time interval with the excessive speed. In other words, a speed value that is outside of a specified operational range of 0 to about 80 mph (or about 10 mph over a maximum allowable limit), or is within a specified operational range of more than about 80 mph (or about 10 mph over a maximum allowable limit), is indicative of disengagement of the automatic driving feature during the time interval that includes the high speed, as well as during the specified interval length for the immediately preceding and/or immediately following interval segments, interval groups, or time intervals.

In another example, it has been determined that some automatic driving features typically set the speed of the vehicle at a value that is a multiple of 5 mph or kph. A human, on the other hand, is more likely to drive at almost any speed value. Therefore, a 5 mph-speed heuristic rule has been developed that delineates a specified operational range for the speed of the vehicle (during any time interval) that is indicative of engagement or disengagement of the automatic driving feature, i.e., automatic driving mode or non-automatic driving mode, depending on how the heuristic rule is defined. For example, a specified operational range that includes a value for the speed having a magnitude that is a multiple of 5 mph indicates engagement of the automatic driving feature during the time interval. In other words, a speed value that is within a specified operational range of a multiple of 5 mph is indicative of engagement of the automatic driving feature during the time interval that includes the multiple of 5 mph speed.

In another example, it has been determined that some automatic driving features typically do not permit excessive power consumption, e.g., a power consumption of the vehicle over a maximum allowable limit, except in relatively rare events, but even then the automatic driving feature may be likely to instruct the driver to assume control of the vehicle for such events. A human, on the other hand, is more likely to press the accelerator pedal excessively, resulting in high power consumption. Therefore, one or more maximum-power heuristic rules have been developed that delineate a specified operational range for the maximum power consumption of the vehicle (during any time interval) that is indicative of engagement or disengagement of the automatic driving feature, i.e., automatic driving mode or non-automatic driving mode, depending on how the heuristic rules are defined. For example, a specified operational range that includes a value for the maximum power consumption having a magnitude of more than about 160 Wh/mile (watt hours per mile) indicates disengagement of the automatic driving feature during the time interval. Additionally, in some embodiments, the maximum-power heuristic rule also indicates disengagement of the automatic driving feature during the interval segments, interval groups, or time intervals (e.g., for an interval length of about 3-25 seconds) that immediately precede and/or immediately follow the time interval with the excessive power consumption. In other words, a power consumption value that is outside of a specified operational range of 0 to about 160 Wh/mile, or is within a specified operational range of more than about 160 Wh/mile, is indicative of disengagement of the automatic driving feature during the time interval that includes the high power consumption, as well as during the specified interval length for the immediately preceding and/or immediately following interval segments, interval groups, or time intervals.

In another example, it has been determined that regenerative braking by some automatic driving features is different in some ways from regenerative braking without the automatic driving feature. For example, some automatic driving features cause a negative value for power consumption (i.e., power regeneration to the battery) only when actively applying the brakes. In other words, some automatic driving features do not have an equivalent of a "coasting" feature, which occurs during manual driving when the driver releases the accelerator pedal but does not apply the brake pedal. In a typical gas-powered vehicle, this situation generally results in a small amount of slowing (relatively low deceleration) of the vehicle by the gas engine. This deceleration can typically be sensed by the driver. In some electric (or hybrid gas/electric) vehicles, this relatively low deceleration when coasting (in non-automatic mode when the driver is not activating either the accelerator pedal or brake pedal) is generally imitated or approximated by the vehicle control system applying a small amount of power regeneration, i.e., a negative power consumption. In so doing, coasting in an electric vehicle can give the driver generally the same small slowing sensation that the driver typically feels when coasting in a gas-powered vehicle. In the test vehicles, this situation can generally be detected when the power consumption changes from a positive value (indicating that the driver was pressing the accelerator pedal to apply power to the motors) to a negative value between about −19 and about −27 Wh/mile (indicating that the driver has released the accelerator pedal without pressing the brake pedal) while the acceleration is between about −3 to 0 mph per second (indicating a relatively low deceleration). Therefore, one or more coast-regeneration heuristic rules have been developed that delineate specified operational ranges for the power consumption and the acceleration (during a sequence of time intervals or an interval segment) that are indicative of engagement or disengagement of the automatic driving feature, i.e., automatic driving mode or non-automatic driving mode, depending on how the heuristic rules are defined. For example, a specified operational range that includes a positive value for the power consumption in a first time interval followed by a second time interval for which the power consumption is between −19 and about −27 Wh/mile and the acceleration is between about −3 to 0 mph per second indicates disengagement of the automatic driving feature during these time intervals. Additionally, in some embodiments, the coast-regeneration heuristic rule also indicates disengagement of the automatic driving feature during the interval segments, interval groups, or time intervals (e.g., for an interval length of about 5-20 seconds) that immediately precede and/or immediately follow the first and second time intervals.

In another example, one or more regenerative-breaking heuristic rules have been developed that delineate specified operational ranges for the power consumption (during an interval segment) and the duration of the interval segment that are indicative of engagement or disengagement of the automatic driving feature, i.e., automatic driving mode or non-automatic driving mode, depending on how the heuristic rules are defined. For example, a specified operational range that includes a value for the power consumption having a magnitude between about −22 and −27 Wh/mile and a value for the duration of the interval segment (during which the power consumption is within this range) of more than about 6 seconds indicates that the vehicle is using regenerative breaking for an extended period of time, which further indicates disengagement of the automatic driving feature during the time interval. Alternatively, the regenerative-breaking heuristic rule may be considered to be a negative power plateau heuristic rule, since a relatively constant power consumption value within the above range for the above duration may indicate non-automatic driving. Additionally, in some embodiments, the regenerative-breaking heuristic rule also indicates disengagement of the automatic driving feature during the interval segments, interval groups, or time intervals (e.g., for an interval length of about 12 seconds) that immediately precede and/or immediately follow the first and second time intervals.

In another example, after the processing of other subtractive and additive heuristic rules, the automatic driving information may appear to indicate a series of groups of time intervals in which groups of the time intervals for which the automatic driving information indicates that the automatic driving feature was engaged (automatic-driving interval groups) alternate with groups of time intervals for which the automatic driving information indicates that the automatic driving feature was not engaged (i.e., non-automatic-driving interval groups). In other words, at this point within the process of generating the automatic driving information, some of the non-automatic-driving interval groups may be found within an overall context surrounded by automatic-driving interval groups, and some of the automatic-driving interval groups may be found within an overall context surrounded by non-automatic-driving interval groups. The conditions of this surrounding context have been determined to provide an additional potential indication of whether the time intervals of some of these interval groups have been properly classified as either automatic-driving time intervals and/or non-automatic-driving time intervals.

Consideration of the context of interval groups is generally deemed appropriate because, although a driver may sometimes need to exercise manual control for a short time within an overall period of automatic driving, this situation is not very common, because a period of automatic driving tends to be a relatively long and continuous section of a trip. Additionally, sometimes a driver may put the vehicle in automatic driving mode for a short time within an overall period of non-automatic driving, but this too is not very common. Instead, a short time of apparent automatic driving mode within an overall period of non-automatic driving is more likely to simply be a further period of non-automatic driving, but with relatively low variability by the driver. In other words, these contextual considerations may mitigate the results of potentially overly aggressive subtractive or additive heuristic rules.

Therefore, one or more additive contextual heuristic rules have been developed that delineate a specified operational range for the lengths (or durations) of a non-automatic-driving interval group and its preceding and following automatic-driving interval groups that is indicative of whether the time intervals of the non-automatic-driving interval group have been properly classified as non-automatic-driving time intervals. For example, an indication of engagement of the automatic driving feature during the time intervals of an interval group (that has been classified at this point as non-automatic-driving) is provided by a specified operational range that includes a value for the length of the non-automatic-driving interval group having a magnitude that is about 50-90 seconds or less and a value for the lengths of the immediately preceding and following automatic-driving interval groups having a magnitude that is about 30-120 seconds or more. Additionally, one or more subtractive contextual heuristic rules have also been developed that delineate a specified operational range for the lengths (or durations) of an automatic-driving interval group and its preceding and following non-automatic-driving interval groups that is indicative of whether the time intervals of the automatic-driving interval group have been properly classified as automatic-driving time intervals. For example, an indication of disengagement of the automatic driving feature during the time intervals of an interval group (that has been classified at this point as automatic-driving) is provided by a specified operational range that includes a value for the length of the automatic-driving interval group having a magnitude that is about 60 seconds or less and a value for the lengths of the immediately preceding and following non-automatic-driving interval groups having a magnitude that is about 55 seconds or more.

In another example, after the processing of other subtractive, additive, and contextual heuristic rules, any remaining relatively short automatic-driving interval groups are likely to be in error. Therefore, one or more short-auto heuristic rules have been developed that delineate a specified operational range for a minimum length (or duration) for the automatic-driving interval groups. For example, an indication of disengagement of the automatic driving feature during the time intervals of an interval group (that has been classified at this point as automatic-driving) is provided by a specified operational range that includes a value for the length of the automatic-driving interval group having a magnitude that is about 10 seconds or less. Processing of the short-auto heuristic rule will trim the time intervals of this interval group from the automatic driving information. In some embodiments, this 10-second short-auto heuristic rule is considered to be one of the highest-probability heuristic rules.

In another example, one or more power plateau heuristic rules have been developed that delineate specified operational ranges for a relative plateau of the power consumption or the average power consumption (e.g., as calculated for each time interval based on the power consumption for a certain number of time intervals before and/or after the calculated time interval) and the duration of the interval segment over which the power plateau or average-power plateau is maintained. The specified operational ranges for the power plateau or average-power plateau are indicative of engagement or disengagement of the automatic driving feature, i.e., automatic driving mode or non-automatic driving mode, depending on how the heuristic rules are defined. For example, a specified operational range that includes a value for the power consumption or running average power consumption (e.g., calculated over an interval segment of about 7 seconds) having a magnitude that fluctuates +/−2 Wh/mile or less (i.e., a relative plateau) within a range of about −20 and −30 Wh/mile and a value for the duration of the interval segment (during which the power plateau or average-power plateau within this range is maintained) of about 5 seconds or more is generally a strong indication of engagement of the automatic driving feature during the interval segment. Additionally, in some embodiments, the power plateau heuristic rule also indicates engagement of the automatic driving feature during the interval segments, interval groups, or time intervals (e.g., for an interval length of about 3-20 seconds) that immediately precede and/or immediately follow the interval segment (during which the power plateau or average-power plateau within the above range is maintained).

In another example, one or more zero intensity plateau heuristic rules have been developed that delineate specified operational ranges for a plateau of the intensity, the duration of the interval segment over which the intensity plateau is maintained, and optionally the speed of the vehicle during this interval segment. The specified operational ranges for the intensity plateau are indicative of engagement or disengagement of the automatic driving feature, i.e., automatic driving mode or non-automatic driving mode, depending on how the heuristic rules are defined. For example, specified operational ranges that include a value for the intensity having a magnitude of 0 Wh/mile/sec, a value for the duration of the interval segment (during which the intensity plateau at this magnitude is maintained) of about 7 seconds or more, and a speed of the vehicle of more than about 40 mph are generally a strong indication of engagement of the automatic driving feature during the interval segment. Additionally, in some embodiments, the zero intensity plateau heuristic rule also indicates engagement of the automatic driving feature during the interval segments, interval groups, or time intervals (e.g., for an interval length of about 3-15 seconds) that immediately precede and/or immediately follow the interval segment (during which the intensity plateau at this magnitude is maintained).

In another example, one or more location heuristic rules have been developed that delineate specified operational ranges for the location of the vehicle (e.g., based on the GPS data). The specified operational ranges in this case provide locations of roads or road segments where it is known that automatic driving features cannot be used, either because of road conditions or government requirements. Time intervals or time segments for a portion of a trip that occurred within such locations are generally subtracted from the automatic driving information or classified as non-automatic driving time intervals within the automatic driving information.

FIGS. 11-15 show simplified flowcharts for example portions of processes by the automatic driving detection system 127 for detecting automatic driving using some of the heuristic rules described above, in accordance with some embodiments. The processes represent one or more programs, applications or routines for performing the functions described. Additionally, in some embodiments, the processes represent computer readable instructions stored in a non-transient computer readable medium for controlling the function of a computer. The processes are shown for illustrative and explanatory purposes only. Other processes or portions of processes having different specific steps, combinations of steps, or order of steps are also within the scope of the subject matter herein. For example, the specific heuristic rules applied by these flowcharts and the illustrated order in which they are applied represent just one example that has been found to result in a relatively high percent accuracy for the generated automatic driving information for the test vehicles that were used to generate the heuristic rules and these processes. Other embodiments can use a different combination of heuristic rules, different specified operational ranges delineated by the heuristic rules, different heuristic rules, and/or a different order in which the heuristic rules are applied, depending on the applicability of each heuristic rule to the type of vehicle for which the sequential vehicle operation data is under analysis and the relative level of confidence in the likelihood that each heuristic rule provides a correct indication of either engagement or disengagement of the automatic driving feature of the vehicle.

Figure 11:
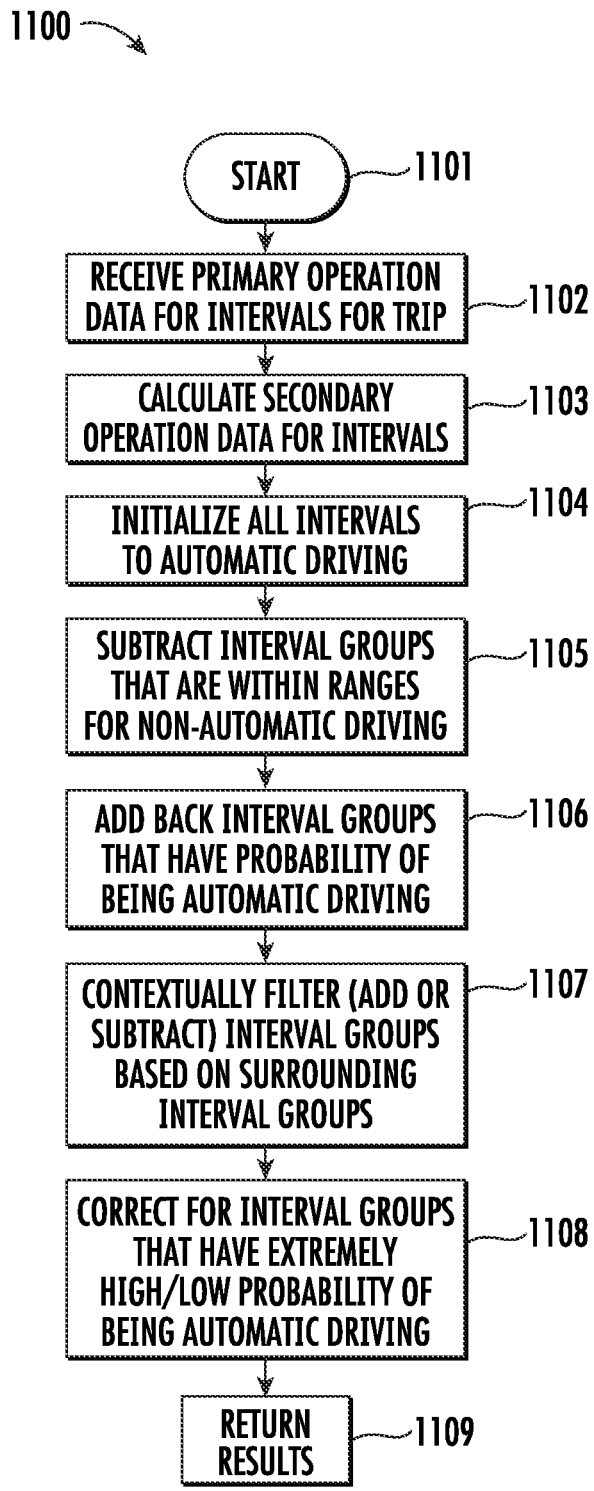
FIGS. 11-15 show simplified flowcharts for example portions of processes for detecting automatic driving, in accordance with some embodiments.

FIG. 11 shows a flowchart of an example simplified process 1100 for an overall automatic driving detection method to generate the automatic driving information for a vehicle by evaluating the sequential vehicle operation data (for the time intervals of a trip made by the vehicle) against a set of the heuristic rules, so that the automatic driving information provides an indication of whether the automatic driving feature was engaged during a subset of the time intervals, in accordance with some embodiments. The process 1100 starts with the assumption that the automatic driving feature was engaged during all of the time intervals, interval groups or interval segments for the entire trip, as mentioned above. Then the process makes multiple sets of passes through the sequential vehicle operation data to generate the automatic driving information. For example, after initialization of the automatic driving information, the process liberally or aggressively trims out potential non-automatic-driving time intervals by processing a variety of subtractive heuristic rules having various levels of confidence in their applicability. Then the process corrects for time intervals indicated by some additive heuristic rules as being properly within specifications for automatic driving mode. Then the process considers the overall context of groups of potential automatic-driving time intervals and non-automatic-driving time intervals. Then the process further corrects for time intervals for which there is an extremely high confidence in the applicability of some heuristic rules.

In some embodiments, upon starting the process 1100 (at 1101), the automatic driving detection system 127 receives (at 1102) the primary operation data (and fills in any missing portions of the primary operation data as described above) for the time intervals of a trip of a vehicle as described above. At 1103, the automatic driving detection system 127 calculates the secondary operation data as described above. At this point, the automatic driving detection system 127 has received or generated the vehicle operation data 128. Additionally, the automatic driving detection system 127 will have obtained the heuristic rules that define a likelihood of an automatic driving feature having been engaged as a function of sequential vehicle performance. At 1104, the automatic driving detection system 127 initializes all of the time intervals to indicate automatic driving mode or to be classified as automatic driving in the automatic driving information.

At 1105, the automatic driving detection system 127 makes a first set of passes through the sequential vehicle operation data to process some of the subtractive heuristic rules, as described below with reference to FIG. 12. Any one or more of the above described subtractive heuristic rules may be used. Thus, the automatic driving detection system 127 identifies a first portion of the time intervals for which the sequential vehicle operation data indicates operation of the vehicle within first specified operational ranges (delineated by the heuristic rules) that are indicative of non-automatic driving, or disengagement of the automatic driving feature. (Alternatively, the automatic driving detection system 127 identifies a first portion of the time intervals for which the sequential vehicle operation data indicate operation of the vehicle outside of first specified operational ranges that are indicative of engagement of the automatic driving feature.) The automatic driving detection system 127 then updates the automatic driving information to indicate that the automatic driving feature was not engaged during these time intervals by subtracting these time intervals or interval groups from within the automatic driving information. (Alternatively, this may be considered to generate subsequent automatic driving information that provides an indication that the automatic driving feature was engaged during a subset of the time intervals of the automatic driving information.)

At 1106, the automatic driving detection system 127 makes a second set of passes through the sequential vehicle operation data to process some of the additive heuristic rules, as described below with reference to FIG. 13. Any one or more of the above described additive heuristic rules may be used. Thus, the automatic driving detection system 127 identifies a second portion of the time intervals for which the sequential vehicle operation data indicates operation of the vehicle within second specified operational ranges (delineated by the heuristic rules) that are indicative of automatic driving, or engagement of the automatic driving feature. (Alternatively, the automatic driving detection system 127 identifies a second portion of the time intervals for which the sequential vehicle operation data indicate operation of the vehicle outside of second specified operational ranges that are indicative of disengagement of the automatic driving feature.) The automatic driving detection system 127 then updates the automatic driving information to indicate that the automatic driving feature was engaged during these time intervals by adding these time intervals or interval groups (to the extent that they may have been previously removed) to the automatic driving information. (Alternatively, this may be considered to generate another subsequent automatic driving information that provides an indication that the automatic driving feature was engaged during another subset of the time intervals of the automatic driving information.) In general, the probability of the second portion of time intervals being in automatic driving mode is likely to be higher than the probability of the first portion of time intervals being in non-automatic driving mode, so any time intervals in the second portion that had been removed at 1105 as part of the first portion will be added back at 1106.

At 1107, the automatic driving detection system 127 makes a set of passes through the automatic driving information to process some of the contextual heuristic rules, as described below with reference to FIG. 14. Any one or more of the above described contextual heuristic rules may be used. Thus, the automatic driving detection system 127 contextually filters (adding or subtracting) the interval groups based on the surrounding (preceding and/or following) interval groups.

At 1108, the automatic driving detection system 127 makes a set of passes through the sequential vehicle operation data and/or the automatic driving information to process some of the heuristic rules that have the highest probability of correctly indicating either engagement or disengagement of the automatic driving feature of the vehicle, as described below with reference to FIG. 15. Any one or more of the above described strong indicator or high probability heuristic rules may be used. Thus, the automatic driving detection system 127 makes a correction by adding interval groups that have an extremely high probability of being automatic driving (or extremely low probability of being non-automatic driving) and/or subtracting interval groups that have an extremely high probability of being non-automatic driving (or extremely low probability of being automatic driving).

At 1109, the automatic driving detection system 127 returns the results of the analysis, i.e., the completed automatic driving information, to whatever system or server that requested the analysis, e.g., another element of the risk assessment system 101, for automobile insurance premium pricing, risk/safety recommendations, alternative route recommendations, automatic driving feature engagement recommendations, etc.

Figure 12:
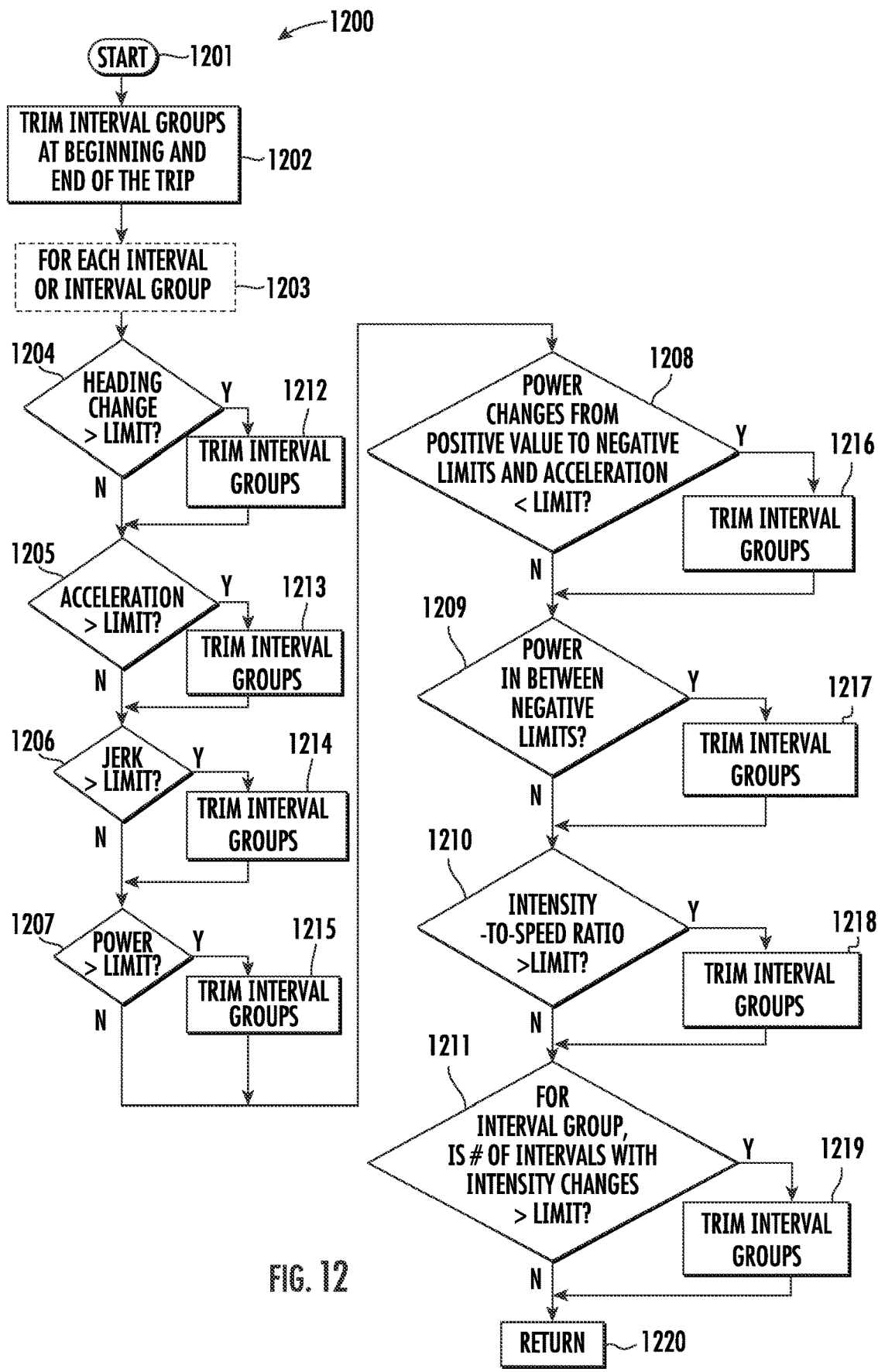

FIG. 12 shows a flowchart of an example simplified process 1200 for evaluating the sequential vehicle operation data (for the time intervals of a trip made by the vehicle) against a set of the subtractive heuristic rules, as mentioned above for 1105 in FIG. 11, in accordance with some embodiments. The above described heuristic rules for determining when to subtract (or trim) time intervals or interval groups from (or convert automatic-driving time intervals to non-automatic-driving time intervals within, or retain as non-automatic-driving time intervals within) the automatic driving information and how much to trim (or convert) may be applied rather liberally or aggressively in order to ensure that most, if not all, of the non-automatic-driving time intervals are correctly trimmed (or converted). As a result of this liberal or aggressive trimming, several of the time intervals that should be classified as automatic-driving time intervals may be incorrectly classified as non-automatic-driving time intervals. However, subsequent processing of the additive heuristic rules generally corrects most, if not all, of these incorrect classifications.

In process 1200, the automatic driving detection system 127 makes the first set of passes through the sequential vehicle operation data to process some of the subtractive heuristic rules that have been determined to be appropriate for a particular make or model of vehicle or type of automatic driving feature. Thus, any one or more of the above described subtractive heuristic rules, and others that may be developed, may be used in the process 1200.

In some embodiments, more than one of the same subtractive heuristic rule (using different values for the specified operational ranges delineated therein) may be used. If more than one of the same heuristic rule is used, then they may be processed together in a sequence uninterrupted by the processing of other subtractive heuristic rules, or they may be dispersed throughout the process 1200 and handled at any appropriate point therein.

In some embodiments, upon starting the process 1200 (at 1201), the automatic driving detection system 127 trims (at 1202) the appropriate time intervals or interval groups from the automatic driving information for the beginning and/or end of the trip, e.g., processing of the first-trip-portion heuristic rule and/or the last-trip-portion heuristic rule, as described above.

As indicated by 1203, each of the next example steps 1204-1219 is processed for each time interval or interval group. Each of the example steps 1204-1211 applies one or more of the subtractive heuristic rules described above.

Additionally, each of the example steps 1212-1219 trims the appropriate time intervals or interval groups if the conditions of the subtractive heuristic rules have been met by the sequential vehicle operation data. The order of the example steps 1204-1219 generally does not matter, since all of heuristic rules processed by the steps 1204-1219 are subtractive. Additionally, in some embodiments, the process 1200 steps through each time interval and processes all of the heuristic rules for that time interval before stepping to the next time interval, so that all of the heuristic rules are processed for one time interval at a time. In some embodiments, the process 1200 steps through each heuristic rule and processes all of the time intervals for that heuristic rule before stepping to the next heuristic rule, so that all of the time intervals are processed for one heuristic rule at a time.

Example step 1204 represents processing of one or more of the heading change spike heuristic rules described above. In other words, if the amount of the heading change in one second (or in any one time interval) is greater than a specified maximum limit (a value in the specified operation range delineated by the heading change spike heuristic rule), then the automatic driving detection system 127 trims (at 1212) the appropriate time intervals or interval groups from the automatic driving information, as described above.

Example step 1205 represents processing of one or more of the maximum-acceleration heuristic rules described above. In other words, if the amount of the acceleration in one second (or in any one time interval) is greater than a specified maximum limit (a value in the specified operation range delineated by the maximum-acceleration heuristic rule), then the automatic driving detection system 127 trims (at 1213) the appropriate time intervals or interval groups from the automatic driving information, as described above.

Example step 1206 represents processing of one or more of the maximum-jerk heuristic rules described above. In other words, if the amount of the jerk in one second (or in any one time interval) is greater than a specified maximum limit (a value in the specified operation range delineated by the maximum-jerk heuristic rule), then the automatic driving detection system 127 trims (at 1214) the appropriate time intervals or interval groups from the automatic driving information, as described above.

Example step 1207 represents processing of one or more of the maximum-power heuristic rules described above. In other words, if the amount of the power consumption in one second (or in any one time interval) is greater than a specified maximum limit (a value in the specified operation range delineated by the maximum-power heuristic rule), then the automatic driving detection system 127 trims (at 1215) the appropriate time intervals or interval groups from the automatic driving information, as described above.

Example step 1208 represents processing of one or more of the coast-regeneration heuristic rules described above. In other words, if the power consumption in one second (or in any one time interval) is positive, the power consumption in the following second (or following time interval) is within negative limits (upper and lower negative values in the specified operation range delineated by the maximum-power heuristic rule), and the acceleration is less than a limit (another value in the specified operation range), then the automatic driving detection system 127 trims (at 1216) the appropriate time intervals or interval groups from the automatic driving information, as described above.

Example step 1209 represents processing of one or more of the regenerative-breaking heuristic rules described above. In other words, if the power consumption throughout a given period of time (or a minimum duration of an interval segment in the specified operation range delineated by the regenerative-breaking heuristic rule) is between negative limits (upper and lower negative values in the specified operation range), then the automatic driving detection system 127 trims (at 1217) the appropriate time intervals or interval groups from the automatic driving information, as described above.

Example step 1210 represents processing of one or more of the intensity-to-speed ratio heuristic rules described above. In other words, if the ratio of the intensity (in Wh/mile/sec) to the speed (in mph) is greater than a limit (a value in the specified operation range delineated by the intensity-to-speed ratio heuristic rule), then the automatic driving detection system 127 trims (at 1218) the appropriate time intervals or interval groups from the automatic driving information, as described above.

Example step 1211 represents processing of one or more of the intensity spike count heuristic rules described above. In other words, within an interval segment or group of a given length, if the counted number of time intervals in which power consumption changed is greater than a limit (a value in the specified operation range delineated by the intensity spike count heuristic rule), then the automatic driving detection system 127 trims (at 1219) the appropriate time intervals or interval groups from the automatic driving information, as described above.

After processing all of the time intervals with all of the subtractive heuristic rules that are appropriate at this point, the automatic driving detection system 127 will have identified a first portion of the time intervals for which the sequential vehicle operation data indicates operation of the vehicle within first specified operational ranges (delineated by the heuristic rules) that are indicative of non-automatic driving, or disengagement of the automatic driving feature. (Alternatively, the automatic driving detection system 127 will have identified a first portion of the time intervals for which the sequential vehicle operation data indicate operation of the vehicle outside of first specified operational ranges that are indicative of engagement of the automatic driving feature.) The automatic driving detection system 127 will also have updated the automatic driving information to indicate that the automatic driving feature was not engaged during these time intervals by subtracting these time intervals or interval groups from within the automatic driving information or classifying these time intervals as non-automatic-driving time intervals within the automatic driving information. (Alternatively, this may be considered to generate subsequent or intermediate version of the automatic driving information that provides an indication that the automatic driving feature was engaged during a subset of the time intervals of the automatic driving information.) The automatic driving detection system 127 returns (at 1220) the resulting intermediate version of the automatic driving information to the process 1100 for further processing of subsequent heuristic rules.

Figure 13:
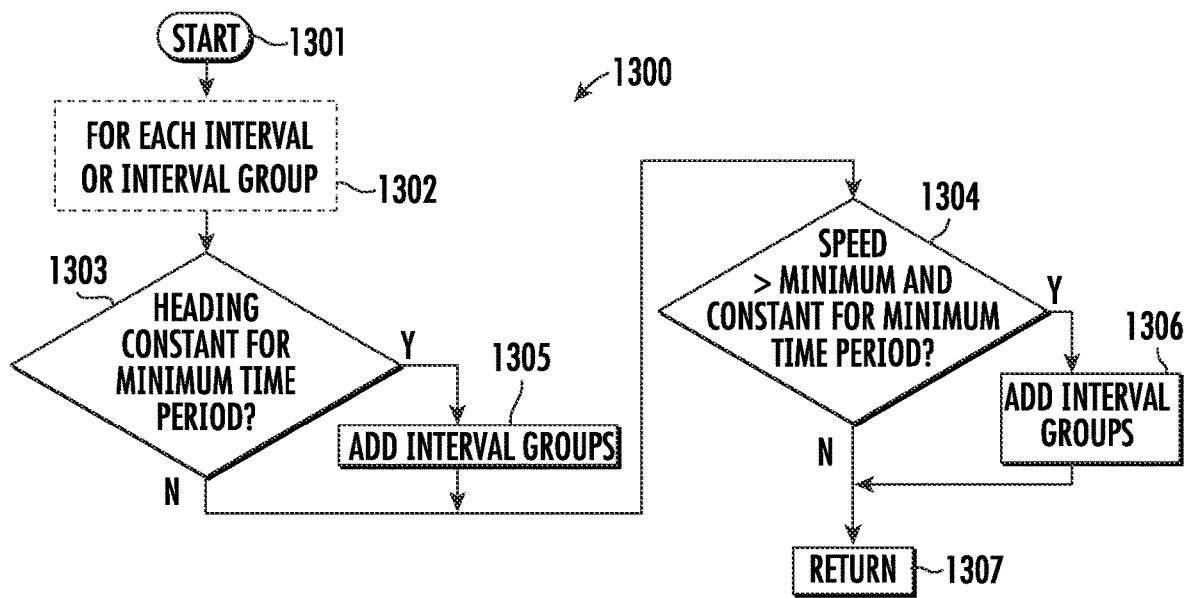

FIG. 13 shows a flowchart of an example simplified process 1300 for evaluating the sequential vehicle operation data (for the time intervals of a trip made by the vehicle) against a set of the additive heuristic rules, as mentioned above for 1106 in FIG. 11. The above described heuristic rules for determining when to add time intervals or interval groups to (or convert non-automatic-driving time intervals to automatic-driving time intervals within, or retain as automatic-driving time intervals within) the automatic driving information and how much to add (or convert) may be applied less liberally or aggressively than the previous subtractive heuristic rules were applied in order to ensure that it is likely that only automatic-driving time intervals that were incorrectly trimmed are added back (or converted). However, some time intervals might be incorrectly added back, and some time intervals might be incorrectly not added back. Nevertheless, the processing of the additive heuristic rules generally improves the overall percent accuracy of the automatic driving information. Additionally, subsequent processing of other heuristic rules generally improves the percent accuracy even more.

In process 1300, the automatic driving detection system 127 makes the second set of passes through the sequential vehicle operation data to process some of the additive heuristic rules that have been determined to be appropriate for a particular make or model of vehicle or type of automatic driving feature. Thus, any one or more of the above described additive heuristic rules, and others that may be developed, may be used in the process 1300.

In some embodiments, more than one of the same additive heuristic rule (using different values for the specified operational ranges delineated therein) may be used. If more than one of the same heuristic rule is used, then they may be processed together in a sequence uninterrupted by the processing of other additive heuristic rules, or they may be dispersed throughout the process 1300 and handled at any appropriate point therein.

In some embodiments, upon starting the process 1300 (at 1301), and as indicated by 1302, each of the next example steps 1303-1306 is processed for each time interval or interval group. Each of the example steps 1303-1304 applies one or more of the additive heuristic rules described above. Additionally, each of the example steps 1305-1306 adds the appropriate time intervals or interval groups if the conditions of the additive heuristic rules have been met by the sequential vehicle operation data. The order of the example steps 1303-1306 generally does not matter, since all of heuristic rules processed by the steps 1303-1306 are additive. Additionally, in some embodiments, the process 1300 steps through each time interval and processes all of the heuristic rules for that time interval before stepping to the next time interval, so that all of the heuristic rules are processed for one time interval at a time. In some embodiments, the process 1300 steps through each heuristic rule and processes all of the time intervals for that heuristic rule before stepping to the next heuristic rule, so that all of the time intervals are processed for one heuristic rule at a time.

Example step 1303 represents processing of one or more of the heading plateau heuristic rules described above. In other words, if the value of the heading throughout a given minimum period of time (or a minimum duration of an interval segment in the specified operation range delineated by the heading plateau heuristic rule) is relatively constant for at least the interval segment, then the automatic driving detection system 127 adds (at 1305) the appropriate time intervals or interval groups to the automatic driving information, as described above.

Example step 1304 represents processing of one or more of the speed plateau heuristic rules described above. In other words, if the value of the speed throughout a given minimum period of time (or a minimum duration of an interval segment in the specified operation range delineated by the speed plateau heuristic rule) is relatively constant for at least the interval segment, then the automatic driving detection system 127 adds (at 1306) the appropriate time intervals or interval groups to the automatic driving information, as described above.

After processing all of the time intervals with all of the additive heuristic rules that are appropriate at this point, the automatic driving detection system 127 will have identified a second portion of the time intervals for which the sequential vehicle operation data indicates operation of the vehicle within second specified operational ranges (delineated by the heuristic rules) that are indicative of automatic driving, or engagement of the automatic driving feature. (Alternatively, the automatic driving detection system 127 will have identified a second portion of the time intervals for which the sequential vehicle operation data indicate operation of the vehicle outside of first specified operational ranges that are indicative of disengagement of the automatic driving feature.) The automatic driving detection system 127 will also have updated the automatic driving information to indicate that the automatic driving feature was engaged during these time intervals by adding these time intervals or interval groups to the automatic driving information or classifying (or reclassifying) these time intervals as automatic-driving time intervals within the automatic driving information. (Alternatively, this may be considered to generate another subsequent or intermediate version of the automatic driving information that provides an indication that the automatic driving feature was engaged during another subset of the time intervals of the automatic driving information.) The automatic driving detection system 127 returns (at 1307) the resulting intermediate version of the automatic driving information to the process 1100 for further processing of subsequent heuristic rules.

Figure 14:
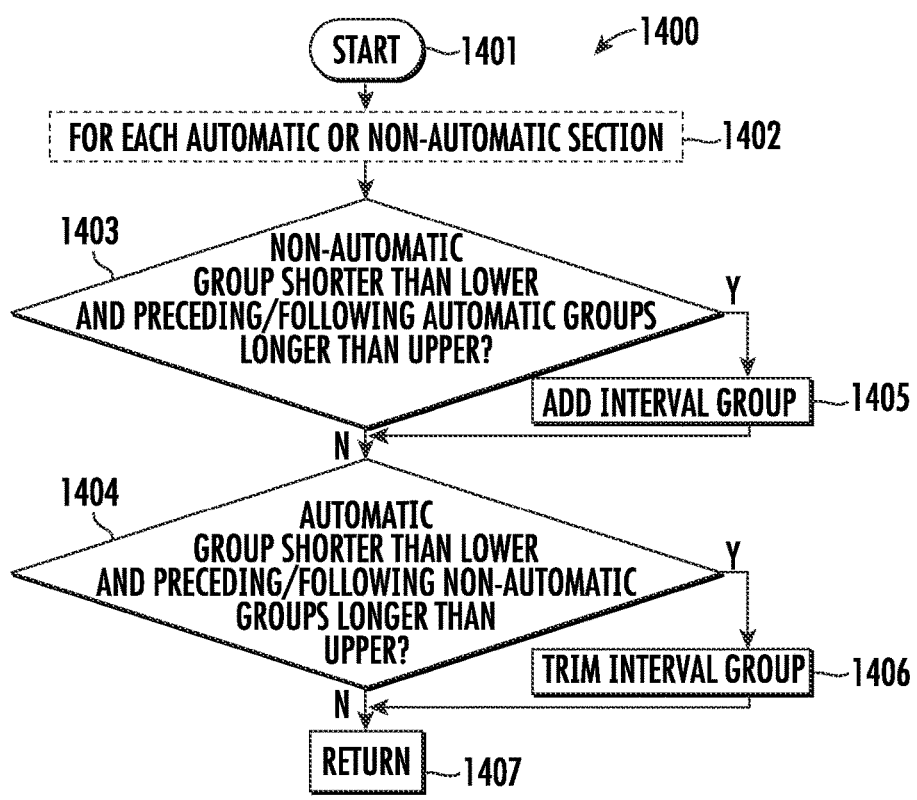

FIG. 14 shows a flowchart of an example simplified process 1400 for evaluating or filtering the sequential vehicle operation data or the previously generated intermediate version of the automatic driving information (for the time intervals, interval segments or interval groups of a trip made by the vehicle) against a set of the contextual heuristic rules, as mentioned above for 1107 in FIG. 11. The above described contextual heuristic rules for determining when to add or subtract time intervals or interval groups to (or convert non-automatic-driving time intervals or automatic-driving time intervals within, or retain as automatic-driving time intervals within) the automatic driving information and how much to add or subtract (or convert) may be applied less liberally or aggressively than the previous subtractive and/or additive heuristic rules were applied in order to ensure that it is likely that only automatic-driving time intervals that were incorrectly trimmed are added back (or converted) or that only non-automatic-driving time intervals that were added back are trimmed (or converted). However, some errors in the classification of the time intervals may still exist after this point. Nevertheless, the processing of the contextual heuristic rules generally improves the overall percent accuracy of the automatic driving information. Additionally, subsequent processing of other heuristic rules generally improves the percent accuracy even more.

In process 1400, the automatic driving detection system 127 makes another set of passes through the sequential vehicle operation data or the previously generated intermediate version of the automatic driving information to process some of the contextual heuristic rules that have been determined to be appropriate for a particular make or model of vehicle or type of automatic driving feature. Thus, any one or more of the above described contextual heuristic rules, and others that may be developed, may be used in the process 1400. In some embodiments, more than one of the same contextual heuristic rule (using different values for the specified operational ranges delineated therein) may be used. Since some of the contextual heuristic rules are subtractive and some are additive, the order of processing of these heuristic rules can make a difference in the classification of some of the time intervals in the resulting automatic driving information.

In some embodiments, upon starting the process 1400 (at 1401), and as indicated by 1402, each of the next example steps 1403-1406 is processed for each time interval or interval group. Each of the example steps 1403-1404 applies one or more of the contextual heuristic rules described above. Additionally, each of the example steps 1405-1406 adds or subtracts the appropriate time intervals or interval groups if the conditions of the contextual heuristic rules have been met by the sequential vehicle operation data or the previously generated intermediate version of the automatic driving information. Additionally, in some embodiments, the process 1400 steps through each contextual heuristic rule and processes all of the interval groups for that heuristic rule before stepping to the next contextual heuristic rule, so that all of the interval groups are processed for one contextual heuristic rule at a time.

Example step 1403 represents processing of one or more of the additive contextual heuristic rules described above. In other words, if the values of the length (or duration) of a non-automatic-driving interval group is shorter than a lower limit (provided by the specified operational ranges delineated by the heuristic rules) and the lengths (or durations) of its preceding and following automatic-driving interval groups are longer than one or more upper limits (provided by the specified operational ranges), then the automatic driving detection system 127 adds (at 1405) the time intervals of the non-automatic-driving interval group as automatic-driving time intervals to the automatic driving information, as described above, thereby joining the time intervals of the non-automatic-driving interval group and of its preceding and following automatic-driving interval groups into one larger automatic-driving interval group.

Example step 1404 represents processing of one or more of the subtractive contextual heuristic rules described above. In other words, if the values of the length (or duration) of an automatic-driving interval group is shorter than a lower limit (provided by the specified operational ranges delineated by the heuristic rules) and the lengths (or durations) of its preceding and following non-automatic-driving interval groups are longer than one or more upper limits (provided by the specified operational ranges), then the automatic driving detection system 127 trims (at 1406) the time intervals of the automatic-driving interval group as non-automatic-driving time intervals from the automatic driving information, as described above, thereby joining the time intervals of the automatic-driving interval group and of its preceding and following non-automatic-driving interval groups into one larger non-automatic-driving interval group.

After processing all of the time intervals or interval groups with all of the contextual heuristic rules that are appropriate at this point, the automatic driving detection system 127 will have updated the automatic driving information to indicate whether the automatic driving feature was engaged during these time intervals by adding or subtracting these time intervals or interval groups to or from the automatic driving information or classifying (or reclassifying) these time intervals as automatic-driving time intervals or non-automatic-driving time intervals within the automatic driving information. (Alternatively, this may be considered to generate yet another subsequent or intermediate version of the automatic driving information that provides an indication that the automatic driving feature was engaged during yet another subset of the time intervals of the automatic driving information.) The automatic driving detection system 127 returns (at 1407) the resulting intermediate version of the automatic driving information to the process 1100 for further processing of subsequent heuristic rules.

Figure 15:
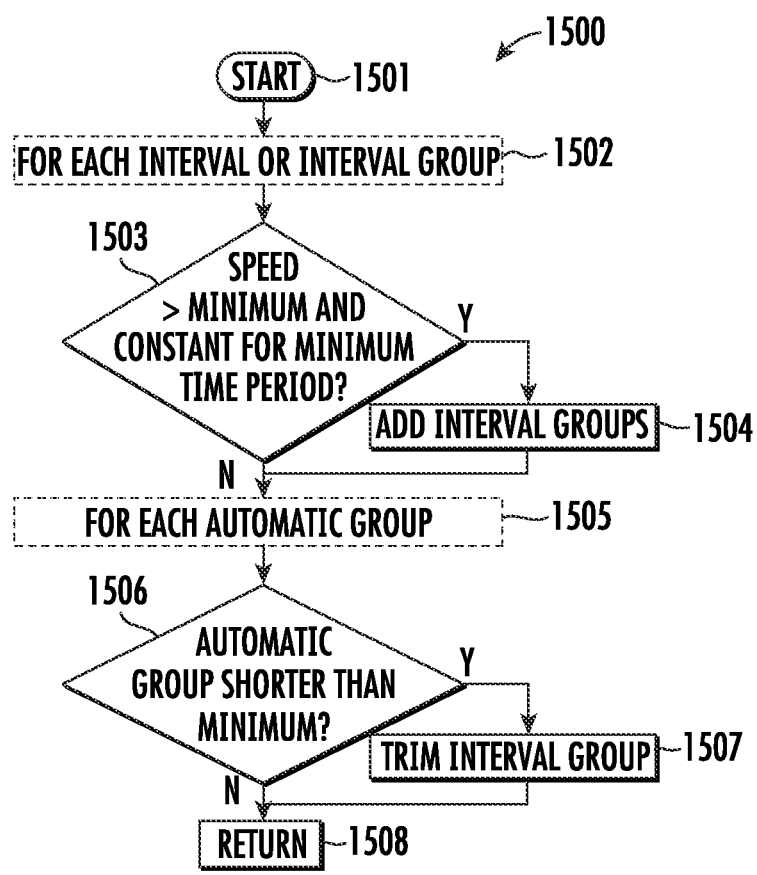

FIG. 15 shows a flowchart of an example simplified process 1500 for evaluating or filtering the sequential vehicle operation data or the previously generated intermediate version of the automatic driving information (for the time intervals, interval segments or interval groups of a trip made by the vehicle) against a set of the heuristic rules that have the highest probability of correctly indicating either engagement or disengagement of the automatic driving feature of the vehicle, as mentioned above for 1108 in FIG. 11.

These highest-probability heuristic rules may be applied more conservatively (or less liberally or aggressively) than the previous subtractive, additive and/or contextual heuristic rules were applied in order to ensure that it is highly likely that only automatic-driving time intervals that were incorrectly trimmed are added back (or converted) or that only non-automatic-driving time intervals that were added back are trimmed (or converted). However, some errors in the classification of the time intervals may still exist after this point. Nevertheless, these errors are generally minimized after this point for a relatively high overall percent accuracy of the final version of the automatic driving information.

In process 1500, the automatic driving detection system 127 makes another set of passes through the sequential vehicle operation data or the previously generated intermediate version of the automatic driving information to process some of the highest-probability heuristic rules that have been determined to be appropriate for a particular make or model of vehicle or type of automatic driving feature. Thus, any one or more of the above described highest-probability heuristic rules, and others that may be developed, may be used in the process 1500. In some embodiments, more than one of the same highest-probability heuristic rule (using different values for the specified operational ranges delineated therein) may be used. Since some of the highest-probability heuristic rules are subtractive and some are additive, the order of processing of these heuristic rules can make a difference in the classification of some of the time intervals in the resulting automatic driving information.

Additionally, in some embodiments, the process 1500 steps through each time interval or interval group and processes all of the heuristic rules for that time interval before stepping to the next time interval or interval group, so that all of the heuristic rules are processed for one time interval or interval group at a time. In some embodiments, the process 1500 steps through each heuristic rule and processes all of the time intervals or interval group for that heuristic rule before stepping to the next heuristic rule, so that all of the time intervals or interval groups are processed for one heuristic rule at a time.

In some embodiments, upon starting the process 1500 (at 1501), and as indicated by 1502, the next example steps 1503-1504 are processed for each time interval or interval group. Example step 1503 represents processing of one or more of the additive highest-probability heuristic rules described above. For example, the 11-sec speed plateau heuristic rule is considered to be one of the highest-probability heuristic rules. Therefore, if the value of the speed throughout a given minimum period of time (or a minimum duration of an interval segment in the specified operation range delineated by the 11-sec speed plateau heuristic rule) is relatively constant for at least the interval segment, then the automatic driving detection system 127 adds (at 1504) the appropriate time intervals or interval groups to the automatic driving information, as described above.

In some embodiments, as indicated by 1505, the next example steps 1506-1507 are processed for each automatic-driving interval group. Example step 1506 represents processing of one or more of the subtractive highest-probability heuristic rules described above. For example, the 10-second short-auto heuristic rule is considered to be one of the highest-probability heuristic rules. Therefore, if any of the automatic-driving interval groups is shorter than the minimum period of time (or a minimum duration of an interval segment in the specified operation range delineated by the 10-second short-auto heuristic rule), then the automatic driving detection system 127 trims (at 1507) the appropriate time intervals or interval groups from the automatic driving information, as described above.

After processing all of the time intervals or interval groups with all of the highest-probability heuristic rules that are appropriate at this point, the automatic driving detection system 127 will have updated the automatic driving information to indicate whether the automatic driving feature was engaged during these time intervals by adding or subtracting these time intervals or interval groups to or from the automatic driving information or classifying (or reclassifying) these time intervals as automatic-driving time intervals or non-automatic-driving time intervals within the automatic driving information. (Alternatively, this may be considered to generate a final version of the automatic driving information, which provides an indication that the automatic driving feature was engaged during a final subset of the time intervals of the automatic driving information.) The automatic driving detection system 127 returns (at 1508) the resulting final automatic driving information to the process 1100 for a further return at 1109, as described above.

Figure 16:
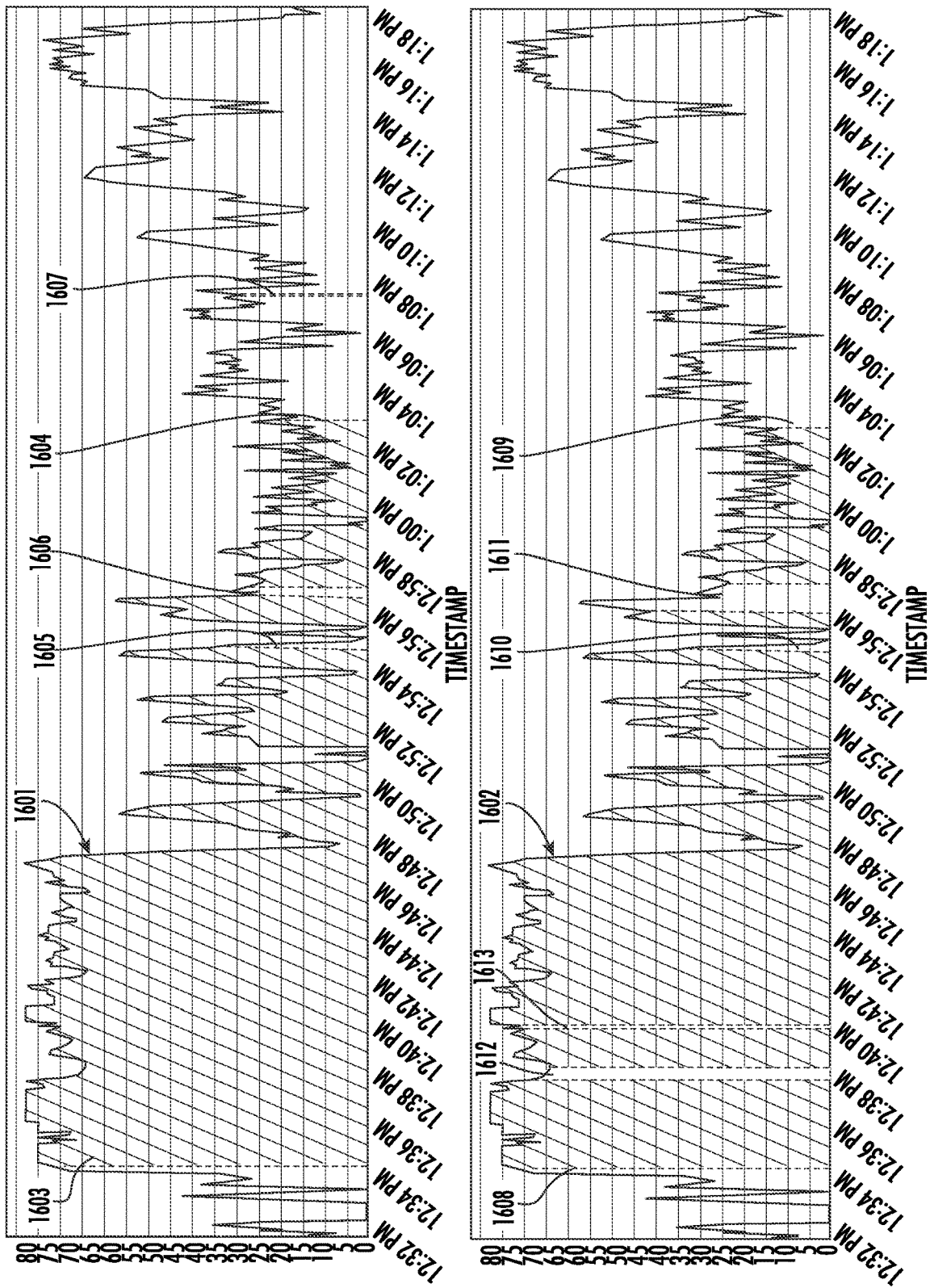
FIG. 16 shows example graphs of actual and detected automatic driving for a trip made by a vehicle, in accordance with some embodiments.

FIG. 16 shows example graphs of actual automatic driving (graph 1601) and detected automatic driving (graph 1602) for a test trip made by a vehicle between approximately 12:31 pm and 1:18 pm, in accordance with some embodiments. The actual automatic driving graph 1601 was generated using direct or explicit automatic driving test data obtained by installing a monitoring unit in a test vehicle attached to one of the onboard computers thereof. The direct or explicit automatic driving test data, thus, provided an explicit indication of whether the automatic driving feature (e.g., the autopilot feature) was engaged during the test trip. The detected automatic driving graph 1602, on the other hand, was generated by performing an example implementation of the above-described automatic driving detection method by the automatic driving detection system 127. Thus, actual direct or explicit automatic driving test data could be compared with the results of the analysis according to an example set of the heuristic rules to determine the accuracy of the automatic driving detection method.

As shown by the actual automatic driving graph 1601, the automatic driving feature was engaged most of the time between points 1603 and 1604, except for two short non-automatic driving sections at 1605 and 1606. Additionally, the automatic driving feature was engaged briefly again at 1607.

As shown by the detected automatic driving graph 1602, the analysis according to the example set of the heuristic rules detected that the automatic driving feature was engaged starting at 1608 (slightly before the actual start at 1603) and was disengaged for the remainder of the trip at 1609 (slightly before the actual end at 1604). Additionally, the two short non-automatic driving sections at 1605 and 1606 were detected, albeit as being slightly larger, as shown at 1610 and 1611, respectively. In addition, the brief engagement at 1607 was not detected. Furthermore, two small non-automatic driving sections were incorrectly detected at 1612 and 1613.

The result of the analysis provided an accuracy of about 97% in correctly detecting automatic driving mode and an accuracy of about 98% in correctly detecting non-automatic driving mode for an overall accuracy of about 97.4% for this test trip; thereby demonstrating the usefulness and applicability of the system and method described herein for detecting when the vehicle 103 is engaged in automatic driving and/or non-automatic driving.

Figure 17:
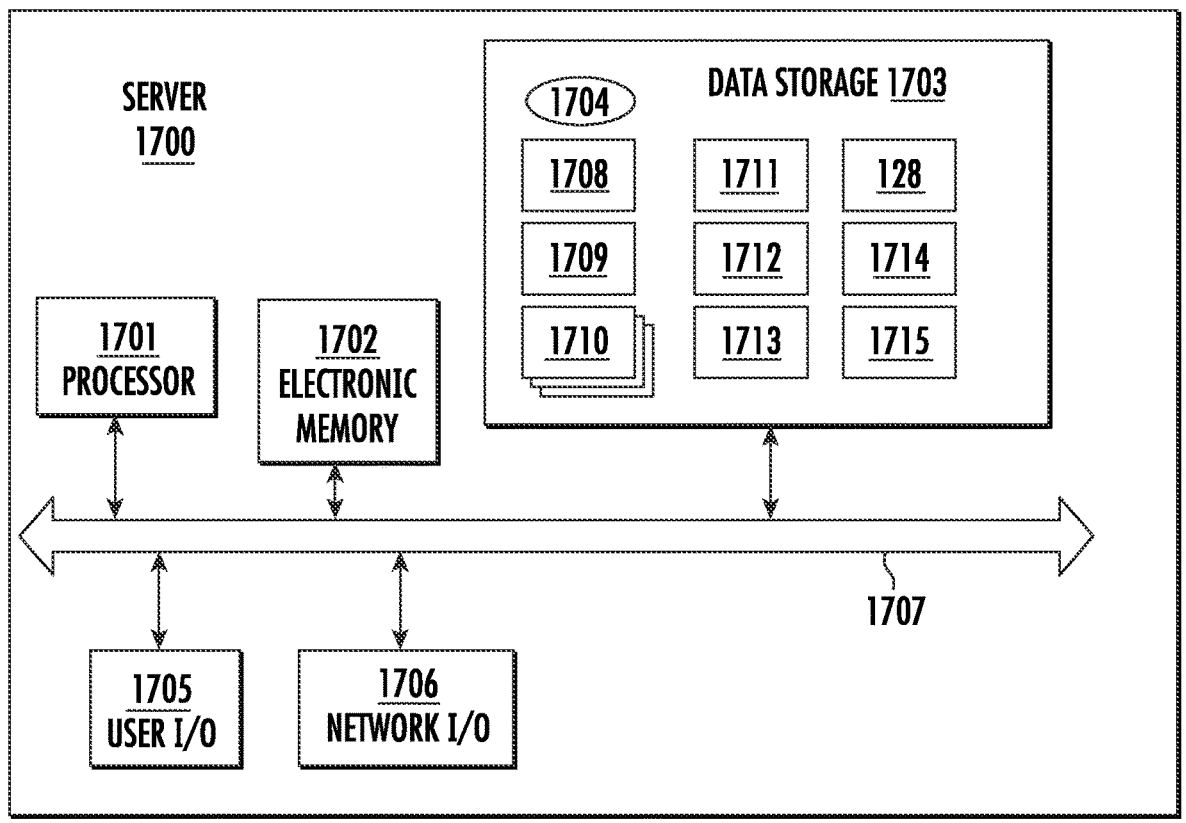
FIG. 17 is a simplified schematic diagram of a computer system, in accordance with some embodiments.

FIG. 17 is a simplified schematic diagram showing an example computer system 1700 for use in the automatic driving detection system 127, in accordance with some embodiments. Other embodiments may use other components and combinations of components. For example, the computer system 1700 may represent one or more physical computer devices or servers, such as web servers, rack-mounted computers, network storage devices, desktop computers, laptop/notebook computers, smart phones, etc., depending on the complexity of the implementation of the automatic driving detection system 127. In some embodiments implemented at least partially in a cloud network potentially with data synchronized across multiple geolocations, the computer system 1700 may be referred to as one or more cloud servers. In some embodiments, the functions of the computer system 1700 are enabled in a single computer device. In more complex implementations, some of the functions of the computing system are distributed across multiple computer devices, whether within a single server farm facility or multiple physical locations. In some embodiments, the computer system 1700 functions as a single virtual machine.

In some embodiments where the computer system 1700 represents multiple computer devices, some of the functions of the computer system 1700 are implemented in some of the computer devices, while other functions are implemented in other computer devices. For example, various portions of the automatic driving detection system 127 can be implemented on the same computer device or separate computer devices. In the illustrated embodiment, the computer system 1700 generally includes at least one processor 1701, a main electronic memory 1702, a data storage 1703, a user I/O 1705, and a network I/O 1706, among other components not shown for simplicity, connected or coupled together by a data communication subsystem 1707.

The processor 1701 represents one or more central processing units on one or more PCBs (printed circuit boards) in one or more housings or enclosures. In some embodiments, the processor 1701 represents multiple microprocessor units in multiple computer devices at multiple physical locations interconnected by one or more data channels. When executing computer-executable instructions for performing the above described functions of the automatic driving detection system 127 in cooperation with the main electronic memory 1702, the processor 1701 becomes a special purpose computer for performing the functions of the instructions.

The main electronic memory 1702 represents one or more RAM modules on one or more PCBs in one or more housings or enclosures. In some embodiments, the main electronic memory 1702 represents multiple memory module units in multiple computer devices at multiple physical locations. In operation with the processor 1701, the main electronic memory 1702 stores the computer-executable instructions executed by, and data processed or generated by, the processor 1701 to perform the above described functions of the automatic driving detection system 127.

The data storage 1703 represents or comprises any appropriate number or combination of internal or external physical mass storage devices, such as hard drives, optical drives, network-attached storage (NAS) devices, flash drives, solid state drives, etc. In some embodiments, the data storage 1703 represents multiple mass storage devices in multiple computer devices at multiple physical locations. The data storage 1703 generally provides persistent storage (e.g., in a non-transitory computer-readable or machine-readable medium 1704) for the programs (e.g., computer-executable instructions) and data used in operation of the processor 1701 and the main electronic memory 1702.

In some embodiments, the programs and data in the data storage 1703 include, but are not limited to, a receiver 1708 for receiving an input file, such as the received primary operation data for the vehicle operation data 128 for a trip and vehicle being processed; the vehicle operation data 128; the heuristic rules 1709, including the specified operational ranges (or conditions) delineated thereby; heuristic rule routines 1710, e.g., for the example simplified processes 1100-1500, for processing the vehicle operation data 128 against the heuristic rules, as described above; the automatic driving information 1711; a reading routine 1712 for reading information from the data storage 1703 into the main electronic memory 1702; a storing routine 1713 for storing received files and information onto the data storage 1703; a network communication services program 1714 for sending and receiving network communication packets through the network 102; a gateway services program 1715 for serving as a gateway to communicate information between servers and users; among other programs and data. Under control of these programs and using this data, the processor 1701, in cooperation with the main electronic memory 1702, performs the above described functions for the automatic driving detection system 127.

The user I/O 1705 represents one or more appropriate user interface devices, such as keyboards, pointing devices, displays, etc. In some embodiments, the user I/O 1705 represents multiple user interface devices for multiple computer devices at multiple physical locations. A system administrator, for example, may use these devices to access, setup and control the computer system 1700.

The network I/O 1706 represents any appropriate networking devices, such as network adapters, etc. for network communications by the automatic driving detection system 127. In some embodiments, the network I/O 1706 represents multiple such networking devices for multiple computer devices at multiple physical locations for communicating through multiple data channels.

The data communication subsystem 1707 represents any appropriate communication hardware for connecting the other components in a single unit or in a distributed manner on one or more PCBs, within one or more housings or enclosures, within one or more rack assemblies, within one or more geographical locations, etc.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
obtaining, by a computer system, heuristic rules that define a likelihood of an automatic driving feature having been engaged as a function of sequential vehicle performance;
providing sequential vehicle operation data related to a trip made by a vehicle that has the automatic driving feature, the sequential vehicle operation data including an indication of operation of the vehicle during a sequence of time intervals of the trip, and the sequential vehicle operation data not including an explicit indication of whether the automatic driving feature was engaged during any time intervals of the sequence of time intervals; and
generating, by the computer system, automatic driving information for the vehicle by evaluating the sequential vehicle operation data against the heuristic rules, the automatic driving information providing an indication of whether the automatic driving feature was engaged during a subset of the time intervals; and
wherein:
the sequential vehicle operation data includes primary operation data that includes received primary operation data received from sensors within the vehicle that detect physical operation of the vehicle.

2. The method of claim 1, wherein the generating of the automatic driving information further comprises:
initializing, by the computer system, the automatic driving information to indicate that the automatic driving feature was engaged during all of the time intervals;
identifying, by the computer system, a first portion of the time intervals for which the sequential vehicle operation data indicate operation of the vehicle within first specified operational ranges delineated by the heuristic rules, the first specified operational ranges being indicative of disengagement of the automatic driving feature; and
updating, by the computer system, the automatic driving information to indicate that the automatic driving feature was not engaged during the first portion of the time intervals.

3. The method of claim 2, wherein:
the first portion of the time intervals includes multiple interval segments;
for each interval segment of the multiple interval segments, the heuristic rules define the interval segment, a preceding interval group that precedes the interval segment, and a following interval group that follows the interval segment; and
for each interval segment of the multiple interval segments, the updating of the automatic driving information further comprises updating the automatic driving information to indicate that the automatic driving feature was not engaged during the interval segment, the preceding interval group, and the following interval group.

4. The method of claim 2, wherein the generating of the automatic driving information further comprises:
identifying, by the computer system, a second portion of the time intervals for which the sequential vehicle operation data indicate operation of the vehicle within second specified operational ranges delineated by the heuristic rules, the second specified operational ranges being indicative of engagement of the automatic driving feature; and
updating, by the computer system, the automatic driving information to indicate that the automatic driving feature was engaged during the second portion of the time intervals.

5. The method of claim 4, wherein the generating of the automatic driving information further comprises:
identifying, by the computer system, first groups of the time intervals for which the automatic driving information indicates that the automatic driving feature was not engaged;
identifying, by the computer system, second groups of the time intervals for which the automatic driving information indicates that the automatic driving feature was engaged, the first groups and the second groups alternating with each other within the automatic driving information;
identifying, by the computer system, at least one group of the first groups that is immediately after a preceding group of the second groups and is immediately before a subsequent group of the second groups;
determining, by the computer system, that a length of the at least one group of the first groups, a length of the preceding group of the second groups, and a length of the subsequent group of the second groups are within third specified operational ranges delineated by the heuristic rules, the third specified operational ranges being indicative of engagement of the automatic driving feature during the time intervals of the at least one group of the first groups; and
updating, by the computer system, the automatic driving information to indicate that the automatic driving feature was engaged during the time intervals of the at least one group of the first groups, the time intervals of the at least one group of the first groups becoming part of the second groups.

6. The method of claim 5, wherein the generating of the automatic driving information further comprises:
identifying, by the computer system, at least one group of the second groups that is immediately after a preceding group of the first groups and is immediately before a subsequent group of the first groups;
determining, by the computer system, that a length of the at least one group of the second groups, a length of the preceding group of the first groups, and a length of the subsequent group of the first groups are within fourth specified operational ranges delineated by the heuristic rules, the fourth specified operational ranges being indicative of disengagement of the automatic driving feature during the time intervals of the at least one group of the second groups; and
updating, by the computer system, the automatic driving information to indicate that the automatic driving feature was not engaged during the time intervals of the at least one group of the second groups, the time intervals of the at least one group of the second groups becoming part of the first groups.

7. The method of claim 6, wherein the generating of the automatic driving information further comprises:
- identifying, by the computer system, a third portion of the time intervals for which the sequential vehicle operation data indicate operation of the vehicle at a constant speed within fifth specified operational ranges delineated by the heuristic rules, the fifth specified operational ranges being indicative of engagement of the automatic driving feature; and
- updating, by the computer system, the automatic driving information to indicate that the automatic driving feature was engaged during the third portion of the time intervals.

8. The method of claim 7, wherein the generating of the automatic driving information further comprises:
- determining, by the computer system, whether any of the second groups of the time intervals has a length that is shorter than a minimum length delineated by the heuristic rules; and
- updating, by the computer system, the automatic driving information to indicate that the automatic driving feature was not engaged during any of the second groups of the time intervals that has the length that is shorter than the minimum length delineated by the heuristic rules.

9. The method of claim 8, wherein the generating of the automatic driving information further comprises:
- before the identifying of the first portion of the time intervals, updating, by the computer system, the automatic driving information to indicate that the automatic driving feature was not engaged during a beginning portion of the time intervals and an ending portion of the time intervals.

10. The method of claim 1, wherein:
- the sequential vehicle operation data further includes secondary operation data;
- the secondary operation data is generated by the computer system from the primary operation data; and
- the secondary operation data includes at least one of: an acceleration of the vehicle, a jerk of the vehicle, a rate of change of a detected heading of the vehicle, or a rate of change of a detected power consumption of the vehicle.

11. The method of claim 10, wherein:
- the primary operation data further includes generated primary operation data;
- the received primary operation data is generated by the vehicle and received by the computer system for a first set of the time intervals of the trip; and
- the generated primary operation data is generated by the computer system from the received primary operation data for a second set of the time intervals of the trip.

12. The method of claim 1, further comprising:
- applying the automatic driving information to a risk assessment system to produce an insurance premium price for the vehicle based at least partially on how often the automatic driving feature has been engaged when the vehicle has been operated.

13. The method of claim 1, wherein:
- the primary operation data includes a detected speed of the vehicle.

14. The method of claim 1, wherein:
- the primary operation data includes a detected heading of the vehicle.

15. The method of claim 1, wherein:
- the primary operation data includes a detected power consumption of the vehicle.

\* \* \* \* \*